United States Patent [19]
Watanabe et al.

[11] Patent Number: 5,567,920
[45] Date of Patent: Oct. 22, 1996

[54] POSITION READING APPARATUS AND KEY BOARD APPARATUS

[75] Inventors: Toshiaki Watanabe; Shinji Saeki; Yoshiyuki Morita, all of Tokyo, Japan

[73] Assignee: Seiko Instruments Inc., Tokyo, Japan

[21] Appl. No.: 140,073

[22] PCT Filed: Feb. 25, 1993

[86] PCT No.: PCT/JP93/00230

§ 371 Date: Dec. 29, 1993

§ 102(e) Date: Dec. 29, 1993

[87] PCT Pub. No.: WO93/18448

PCT Pub. Date: Sep. 16, 1993

[30] Foreign Application Priority Data

| Mar. 2, 1992 | [JP] | Japan | 4-044930 |
| Mar. 19, 1992 | [JP] | Japan | 4-063922 |
| May 12, 1992 | [JP] | Japan | 4-119260 |

[51] Int. Cl.$^6$ ............................................. G08C 21/00
[52] U.S. Cl. ......................... 178/18; 178/19; 178/20
[58] Field of Search .................................. 178/18, 19, 20

[56] References Cited

U.S. PATENT DOCUMENTS

| 4,878,553 | 12/1989 | Yamanami et al. | 178/18 |
| 4,926,010 | 5/1990 | Citron | 178/18 |
| 4,959,805 | 9/1990 | Ohouchi et al. | 178/18 |
| 4,988,837 | 1/1991 | Murakami et al. | 178/19 |
| 5,028,745 | 7/1991 | Yamanami et al. | 178/19 |

FOREIGN PATENT DOCUMENTS

| 0556852 | 8/1993 | European Pat. Off. . |
| 63-33216 | 7/1988 | Japan . |
| 248724 | 2/1990 | Japan . |
| 3189717 | 8/1991 | Japan . |
| 424720 | 1/1992 | Japan . |
| 224716 | 1/1992 | Japan . |
| 47721 | 1/1992 | Japan . |

OTHER PUBLICATIONS

European Search Report dated Jul. 28, 1994, European application No. 93904347.7.

*Primary Examiner*—Stephen Chin
*Assistant Examiner*—Vijay Shankar
*Attorney, Agent, or Firm*—Spensley Horn Jubas & Lubitz

[57] ABSTRACT

A position reading apparatus and keyboard apparatus using a feedback loop for inputting positional information into an external device. A pointer having a resonant circuit is used to establish a feedback loop having as part of the feedback loop a first coupling device a second coupling device, an amplifier and the resonant circuit. When the resonant circuit approaches the first and second coupling devices electromagnetic coupling is established between the position pointer and the first and second coupling device. As a result, oscillation occurs at a resonant frequency of the resonant circuit establishing an oscillation signal. The oscillation signal information determines the position of the pointer. Switches are used to alter the resonant frequency of the resonant circuit.

35 Claims, 35 Drawing Sheets

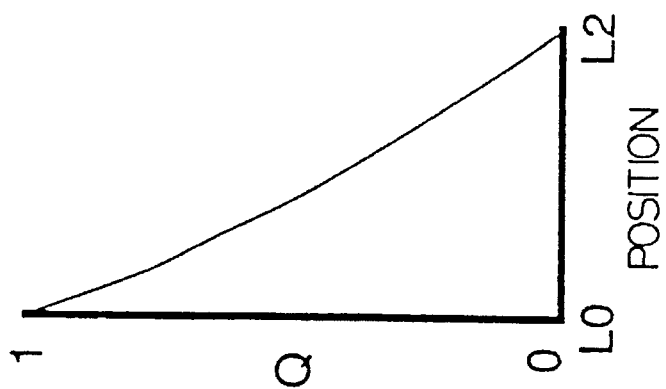
FIG. 11G
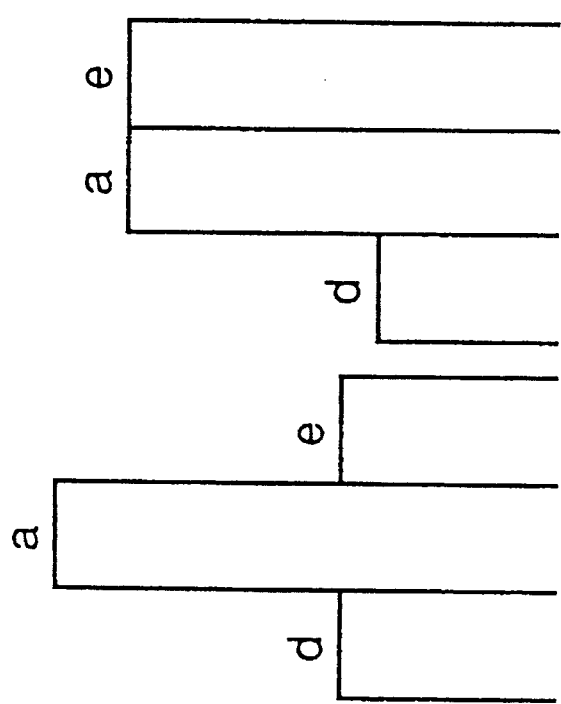
FIG. 11F
FIG. 11E
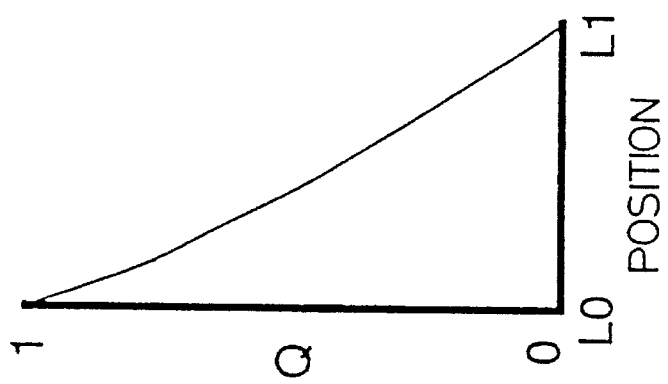
FIG. 11D

F I G. 1 9 A
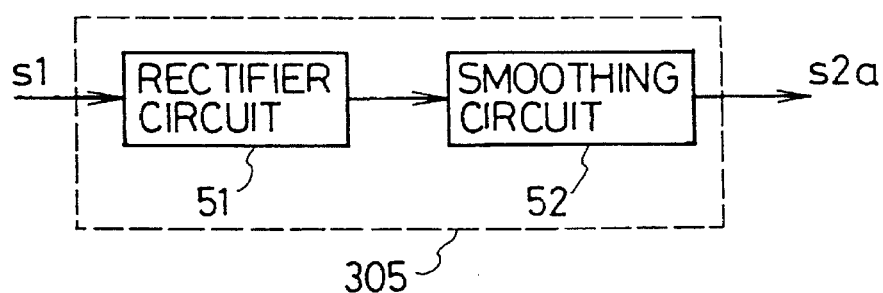
F I G. 1 9 B
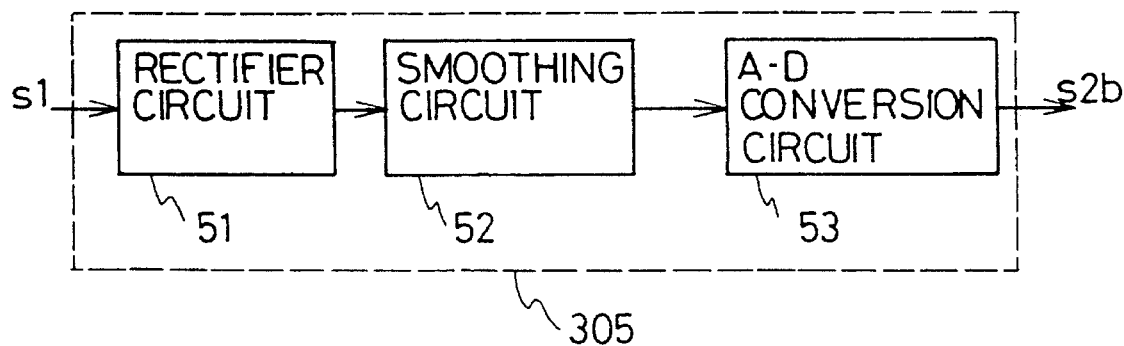

FIG. 20A
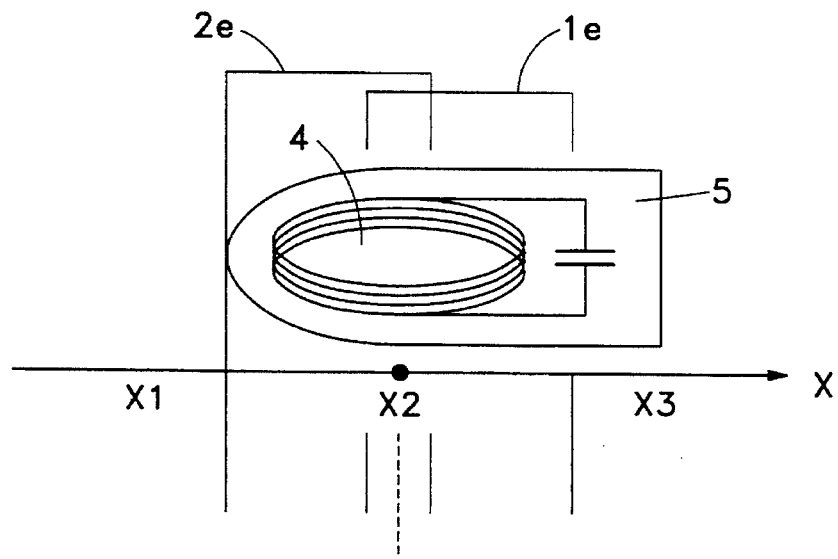
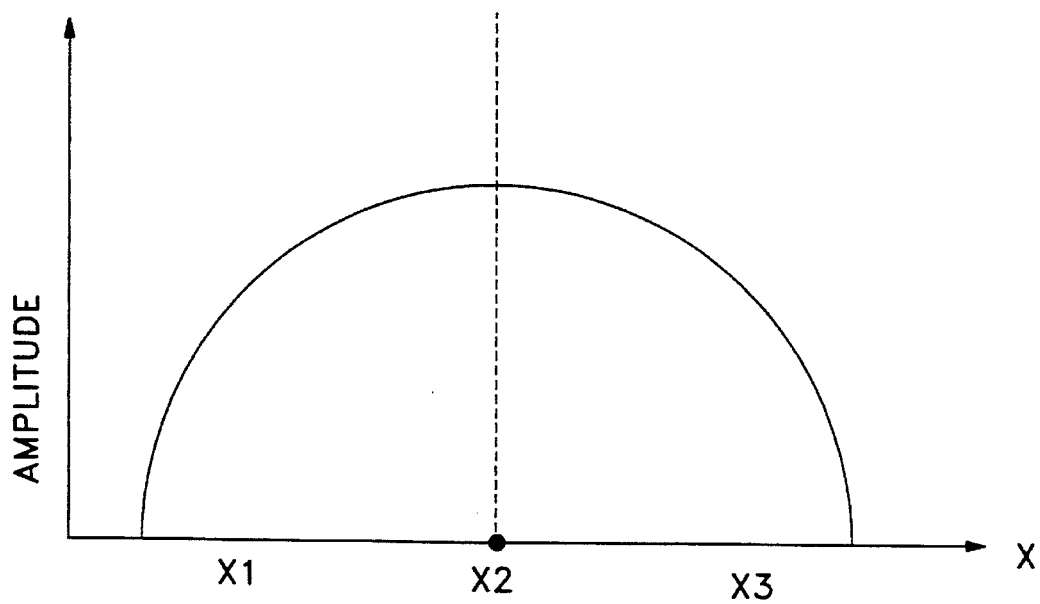
FIG. 20B

DETECTING
SENSE LINE

DETECTING
SENSE LINE

FIG. 31
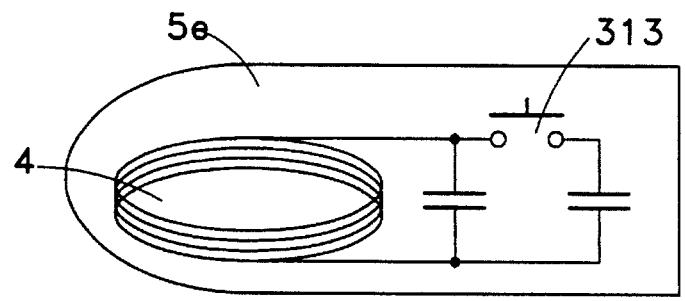
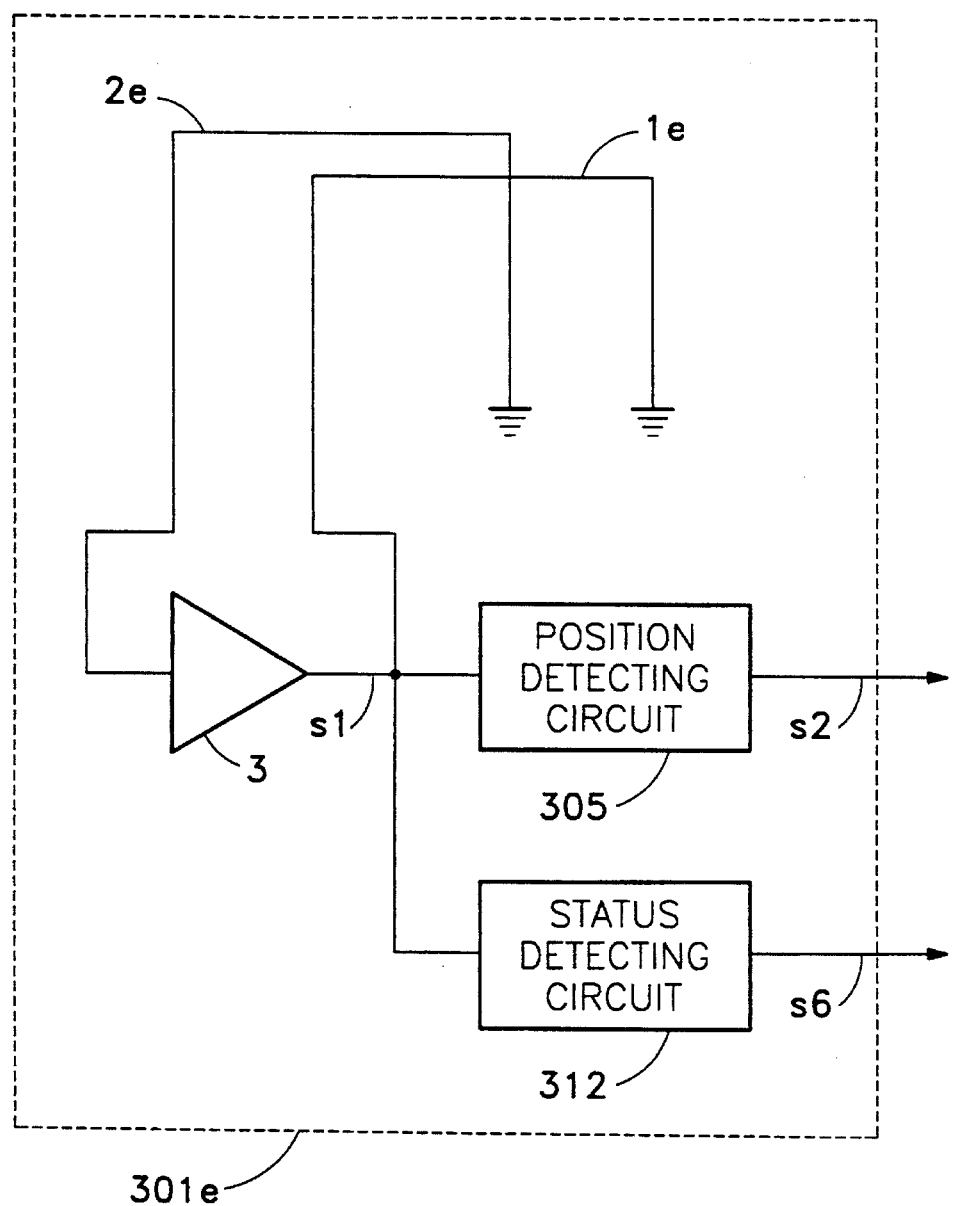

POSITION READING APPARATUS AND KEY BOARD APPARATUS

TECHNICAL FIELD

The present invention relates to a position reading apparatus for inputting position information into an external device such as computers, and specifically relates to a wireless position reading apparatus in which a body of a detecting device and a position pointer do not need connecting with a signal wire.

Further, the present invention relates to a key board apparatus which outputs switch information to a host system such as a computer, and specifically relates to a key board apparatus applying an oscillation phenomenon.

BACKGROUND ART

FIG. 35 is a block diagram of a conventional position reading apparatus. First of all, referring to this drawing there will be described operation for detecting a position in the conventional position reading apparatus.

The apparatus has a structure that exciting lines 903 and sense lines 902 are laid orthogonally, and each exciting line 903 is sequentially selected by being coupled to a first scanning circuit 908 in turn and each sense line 902 is sequentially selected by being coupled to a second scanning circuit 909 in turn. As the first scanning circuit 908 is supplied with an exciting signal s906 from an exciting circuit 915, the exciting line selected by this circuit generates an a.c. electromagnetic field. A position pointer 906 includes a resonant circuit (hidden from the Figure) which resonants with a frequency of the exciting signal s906. Therefore, when the position pointer is put on the sense lines, induction signals s901 generate on the sense lines 902 because of the coupling among the exciting lines 903, the position pointer 906 and the sense lines 902. The second scanning circuit 909 selects each of the sense lines sequentially and thereby the induction signal s901 is guided to a signal processing circuit 904 and is converted into an amplitude signal s905. Further, the amplitude signal is inputted into a position detecting circuit 905 and then the position is calculated from a distribution state as to the induction signal s901 at an intersection point of each exciting line and each sense line.

It is necessary to select a plurality of the sense lines in order to obtain the distribution state as to the induction signal s901. In such a conventional position reading apparatus as explained above, calculating the position of one point requires performing selecting operations in matrix in a way that a plurality of the sense lines are selected while each of the exciting lines is selected. For instance, if the five exciting lines and the five sense lines are to be selected respectively, the position of a point is calculated by performing twenty five times of selecting operations in total because the five sense lines are selected whenever one of the exciting lines is selected.

Next, referring to FIGS. 36A and 36B, there will be described an operation for detecting a state of switches and so on provided for the position pointer in the conventional position reading apparatus.

As shown in FIG. 36A, the position pointer 906 has a construction that the position pointer 906 includes a resonant circuit 907 and the resonant circuit 907 is connected in parallel to a switching circuit 913 in which the switch and a second capacitor are connected in series. Then, when the switch is pushed, a resonance frequency slightly changes.

Therefore, as shown in FIG. 36B, a phase of the induction signal s901 is slightly different between when the switch is on and when the switch is off. A state of the switching circuit 913 can be detected by detecting this phase change $\phi$.

Further when a number of switches are provided on the position pointer and many status are required or when the condition settings are required to extend in such the conventional position reading apparatus, for example, by providing a pressure detecting function with the position pointer, such requirements are realized in a manner mentioned below. Detection accuracy is ensured by providing the main body with a detecting circuit capable of detecting a slight change in phase accurately and also stably. At the same time, in the process of manufacturing the position pointer, the resonance frequency of the resonant circuit is accurately adjusted and parts of high stability are used so that even after the adjustment the detection accuracy is highly stable against environmental changes such as temperature change and time passage.

In the conventional position reading apparatus, it is necessary that an a.c. electromagnetic field of a predetermined frequency is always generated from the exciting lines. Generation of the a.c. electromagnetic field is required all the time for detecting that the position pointer is placed, even if the position pointer does not exist in the vicinity of the sense liens, that is, even when position detection is not necessary. Therefore, an exclusive exciting circuit is necessary for generating the a.c. electromagnetic field.

Further, there is a problem that a position can not be calculated at high speed because the lines required to be selected in matrix as explained above in order to calculate the position of a point.

Moreover, as shown in FIG. 37, in the sense lines laid near a periphery of a body of a detecting device, a direct coupling between the exciting line and the sense line is generated in portions A and B. As a result, the induction signal is generated even if the position pointer does not exist. This fact means that induction signal components which are not dependent on the position pointed by the position pointer are added to the sense lines near the periphery of the body of the detecting device, which cause a problem that accuracy of position detection deteriorates around the periphery.

Detecting a state of the position pointer, for example, a state of switches, uses a phase difference resulting from a slight difference between the frequency of the exciting signal and the resonance frequency of the resonant circuit, therefore the switching circuit in the position pointer and a phase detecting circuit in the body of the detecting device require very precise frequency setting. Further, the phase difference is required to be generated in each switching circuit in order to detect states of a plurality of the switches, but a range in which phase difference are generated is limited. Therefore, the conventional position reading apparatus can not be constructed so as to be capable of detecting the states of so many switches. Though sixteen or more switches are demanded in the market, it can not be realized in the conventional apparatus.

A first object of the present invention is to realize a wireless position reading apparatus which does not require the body of the detecting device and the position pointer to be connected with a signal wire and in which a circuit can be more simplified by eliminating the exciting circuit compared with the conventional apparatus.

A second object of the present invention is to realize the position reading apparatus capable of calculating a position with high speed in addition to the above first object.

A third object of the present invention is to realize the position reading apparatus in which a peripheral accuracy does not deteriorate in addition to the above first and the second objects.

Further, a fourth object of the present invention is to realize the position reading apparatus which can detect a status of a position pointer with a circuit that does not particularly require a precise setting and which can easily detect a plurality of statuses in addition to the above the first to the third objects.

Furthermore, a fifth object of the present invention is to provide, by applying the invention to a key board apparatus, a key board apparatus in which a key board operates without power supply and transfers the switch information without contact and further which does not require a space for the large connector in the host system.

DISCLOSURE OF INVENTION

The inventive position reading apparatus has the following construction as the first construction. The present invention includes a main body and a position pointer having a resonant circuit which compose a position reading apparatus. The main body is composed of an amplifier, a first coupling means connected to an output of the amplifier, a second coupling means connected to an input of the amplifier, and a position detecting means. The resonant circuit is electromagnetically coupled to the first and the second coupling means when the position pointer approaches the main body of the position reading apparatus, and thereby forms a positive feedback loop with the amplifier and the first and the second coupling means, and composes a frequency oscillator which oscillates at a resonance frequency of the resonant circuit. The position detecting means obtains position information on the position pointer from amplitude information on an oscillating signal generated by the positive feedback loop.

Further, the inventive position reading apparatus has the following construction as the second construction. The first coupling means includes a first sense line group composed of a plurality of first sense lines which are parallel to one of an x and a y rectangular coordinate axis and which are also arranged at equivalent intervals, and a first scanning circuit which is a circuit for selecting each of the first sense lines sequentially and which is connected to the output of the amplifier. The second coupling means includes a second sense line group composed of a plurality of second sense lines which are parallel to another of the x and the y rectangular coordinate axis and which are also arranged at equivalent intervals, and a second scanning circuit which is a circuit for selecting each of the second sense lines sequentially and which is connected to the input of the amplifier. The position detecting means obtains the position information on the position pointer from the amplitude information on the oscillating signal obtained by scanning the first and the second scanning circuit.

Further, the inventive position reading apparatus includes a status setting means for changing the resonance frequency of the resonant circuit and a status detecting means for detecting a status set by the status setting means from frequency information on the oscillation as the third construction.

Moreover, the inventive position reading apparatus has the following construction as the fourth construction. An automatic gain control circuit (hereinafter referred to as "an AGC circuit") is provided for controlling a gain of the amplifier. The position detecting means obtains the position information on the position pointer from the amplitude information of the oscillation which is obtained from the control signal generated by the AGC circuit or the input signal of the amplifier.

Furthermore, to improve the invention, the present invention is composed of a body of a detecting device and a position pointer including a resonant circuit. The body of a detecting device includes an amplifier, a first sense line which is connected to an output of the amplifier and which is in a shape of a loop, and a second sense line which is connected to an input of the amplifier and which is in a shape of a loop. The inventive position reading apparatus has below construction as the fifth construction. The first and the second sense line are laid with a part of the loops overlapped so that electromagnetic coupling between both sense lines is canceled. When the resonant circuit approaches the first and the second sense line and is electromagnetically coupled to both lines, the amplifier, the first and the second sense line and the resonant circuit form a positive feedback loop and thereby a frequency oscillator is formed; and the frequency oscillator generates an oscillating signal. Then, the inventive apparatus obtains position information on a position pointed by the position pointer from amplitude information on an oscillating signal.

The present invention has further composed of below three elements newly provided: a first and a second sense line group in which a plurality of the first and the second sense lines disclosed in the above fifth construction are laid respectively; a first and a second scanning circuit connected to the first and the second sense line group respectively for selecting one sense line from each of the first and the second sense line group respectively; and an excitation/sense switching circuit for coupling each of the first and the second scanning circuit to each of the input and the output of the amplifier alternately. Then, the inventive position reading apparatus has the following construction as the sixth construction. When the resonant circuit approaches the two sense lines selected from the first and the second sense line group respectively and is electromagnetically coupled to both lines, the amplifier, the two selected sense lines and the resonant circuit form a positive feedback loop and thereby a frequency oscillator is formed; and the frequency oscillator generates an oscillating signal. Then, the inventive apparatus obtains the position information on the position pointed by the position pointer from the amplitude information on the oscillating signal.

The present invention has further composed of the following three elements newly provided: a first and a second sense line group in which a plurality of the first and the second sense lines disclosed in the above fifth construction are laid respectively; a first scanning circuit connected to both sense line groups for selecting a sense line from the sense line groups and coupling the selected sense line to the output of the amplifier; and the second scanning circuit connected to both sense line groups also for selecting a sense line from the sense line groups and coupling the selected sense line to the input of the amplifier. The present position reading apparatus has the following construction as the seventh construction. When the resonant circuit approaches the two sense lines selected from the first and the second sense line group and is electromagnetically coupled to both lines, the amplifier, the selected two sense lines and the resonant circuit form a positive feedback loop and thereby a frequency oscillator is formed; and the frequency oscillator generates an oscillating signal. Then, the inventive apparatus obtains the position information on the position pointed by the position pointer from the amplitude information on the oscillating signal.

Further, the present invention has a construction that the fifth to seventh constructions are provided with additional two means as the eighth construction: a status setting means provided in the position pointer for changing a resonance frequency of the resonant circuit; and a status detecting means provided in the body of the detecting device for detecting the status set by the status setting means from frequency information on the oscillating signal.

Further, the present invention has the following construction as the ninth construction. In the fifth to the eighth constructions, the body of the detecting device is provided with an AGC circuit for controlling a gain of the amplifier. The position reading apparatus obtains position information on the position pointed by the position pointer from the amplitude information on the oscillating signal which is obtained from a control signal outputted by the AGC circuit or an input signal of the amplifier.

The inventive key board apparatus applied the basic structure of the invention has a plurality of switches and which transfers predetermined data when the switch is pushed. The key boards apparatus is composed of a key board detecting device and a key board: the key board detecting device includes an amplifier, a first coil coupled to an output of the amplifier, a second coil coupled to an input of the amplifier and a frequency discriminating circuit; and the key board has a parallel resonant circuit, including a plurality of series circuits each of which is composed of the switch and a capacitor and a third coil. The key board apparatus has a construction that the parallel resonant circuit forms a positive feedback loop with the resonant circuit, the first coil and the second coil by having electromagnetic coupling with both the first coil and the second coil, and thereby forms an oscillating circuit, and that the frequency discriminating circuit obtains the switch information from frequency information on an oscillation generated by the positive feedback loop. Further, the key board apparatus has an another construction that the key board detecting device has an AGC circuit for controlling a gain of the amplifier and that the AGC circuit gives a control signal to the amplifier so that an amplitude of an oscillating signal at the output of the amplifier is constant.

In the first construction of the inventive position reading apparatus, the first and the second coupling means are apart from the resonant circuit, namely, they are not electromagnetically coupled to each other, feedback is not formed between the input and the output of the amplifier and no oscillation occurs. However, if the distance between the first and the second coupling means and the resonant circuit becomes smaller and thereby electromagnetic coupling is generated between them, the positive feedback loop is formed, which includes the output of the amplifier, the first coupling means, the resonant circuit, the second coupling means, and the input of the amplifier as components of a route. Thereby, the oscillation is generated at the resonance frequency of the resonant circuit. The oscillating amplitude which appears in this positive feedback loop changes according to a feedback amount which depends on the distance between the first and the second coupling means and the resonant circuit. In other words, the smaller the distance becomes, the more the feedback amount increases and thereby the larger oscillating amplitude is obtained; as the distance becomes larger, the feedback amount decreases and thereby the oscillating amplitude becomes smaller. Therefore, the position detecting means can obtain the position information on the position pointer provided with the resonant circuit from the oscillation amplitude.

Further, in the second construction of the inventive position reading apparatus the following function is obtained when the first coupling means has the first sense line group and the first scanning circuit and the second coupling means has the second sense line group and the second scanning circuit: The resonant circuit is coupled to both a sense line selected sequentially by the first scanning circuit and a sense line selected sequentially by the second scanning circuit, and thereby forms the positive feedback loop. For instance, the maximum oscillating amplitude can be obtained when the sense line selected by the first scanning circuit is just under the resonant circuit and the sense line selected by the second scanning circuit is also just under the resonant circuit; and as the sense line selected goes away from the resonant circuit, the oscillating amplitude becomes smaller. Therefore, the position detecting means can obtain the position information on the position pointer from the amplitude information on an oscillating signal obtained by scanning the first and the second scanning circuit.

Further, in the third construction of the inventive position reading apparatus there is provided the status settings means for changing the resonance frequency of the resonant circuit and the resonance frequency of the resonant circuit is changed by the status setting means. Then, the oscillating frequency appearing in the positive feedback loop also changes accordingly. Therefore, the status detecting means can detect frequency information on the oscillating frequency and therewith detect the condition set by the status setting means In the fourth construction of the inventive position reading apparatus which the AGC circuit for controlling the gain of the amplifier is provided, the amplifier is set so as to have the gain large enough for the frequency oscillator to oscillate when the resonant circuit is not coupled to the first and the second coupling means. Then, the AGC circuit controls the gain of the amplifier and restricts an output amplitude when the resonant circuit approaches the first and the second coupling means and the oscillation begins. By such a manner, the oscillation is stabilized and the output amplitude of the amplifier becomes constant afterwards. If the resonant circuit approaches the first and the second coupling means more, the control signal generated by the AGC circuit and the input signal of the amplifier change according to the distance between the resonant circuit and the first and the second coupling means. Accordingly, the position detecting means can obtain the position information on the position pointer from the amplitude information on the oscillation which is obtained from the control signal generated by the AGC circuit or the input signal of the amplifier.

In the inventive position reading apparatus according to the fifth construction, when the resonant circuit of the position pointer approaches the first and the second sense line, electromagnetic coupling arises between the above three. As a result, a positive feedback loop is formed by these three and the amplifier and thereby a frequency oscillator is formed, and then the frequency oscillator generates the oscillating signal. As the amplitude of the oscillating signal includes the information on the position pointed by the position pointer, the oscillating signal is inputted into a position detecting circuit and detects the position pointed by the position pointer from the amplitude of the oscillating signal.

In the inventive position reading apparatus according to the sixth and seventh constructions, each line of the first and the second sense line group is selected sequentially and the amplitude of the oscillating signal of each selecting condition is comparatively operated, and thereby the position pointed by the position pointer is detected. Therefore, the position reading apparatus has a large range within which the detection of a pointed position is available.

In the inventive position reading apparatus according to the eighth construction, when the resonant circuit of the position pointer approaches the first and the second sense line, the oscillating signal is generated as it is in the first construction and the pointed position is detected. In this case, if the status setting means of the position pointer is operated and thereby the resonance frequency of the resonant circuit changes, the frequency of the oscillating signal changes accordingly. The status detecting circuit distinguishes between different conditions of the status setting means from the frequency of the oscillating signal.

In the inventive position reading apparatus according to the ninth construction, the gain of the positive feedback loop is controlled by the pointed position of the position pointer. As a gain control signal includes the information on the position pointed by the position pointer, the pointed position of the position pointer can be detected from the information.

In the inventive key board apparatus, when the third coil does not exist over the first and the second coil or when any switches are not closed, that is, when the first coil and the second coil are not magnetically coupled, feedback does not arise between the input and the output of the amplifier and therefore an oscillation is not generated. However, when the third coil approaches the first and the second coil and is electromagnetically coupled to both coils while the switch is closed and the parallel resonant circuit is constructed, the feedback loop is constructed, which includes the output of the amplifier, the first coil, the parallel resonant circuit, the second coil and the input of the amplifier as elements of a route, and there is generated the oscillation at a resonance frequency of the parallel resonant circuit. Then, if the resonance frequency of the parallel resonant circuit is changed by the switch, according to the change an oscillating frequency also changes similarly. Then, the frequency discriminating circuit detects the frequency information of the oscillating frequency and detects the information on the pushed switches.

Further, in the inventive key board apparatus, as the key board detecting device is provided with the AGC circuit for controlling the gain of the amplifier, a stable oscillating state can be obtained with a wide range of the frequency, and more switch information can be obtained compared the conventional apparatus.

In the present invention, the position reading apparatus is constructed so that the coupling means such as sense lines and the resonant circuit provided in the position pointer approach each other and are electromagnetically coupled and thereby the oscillating circuit caused by the positive feedback loop is constructed and that the position pointed by the position pointer is detected from the amplitude information of the oscillating signal. Therefore, it is possible to realize the position reading apparatus which can detect the pointed position without connecting the body of the detecting device and the position pointer with a signal wire.

Further, the present invention has an effect that a function of a status setting means can be easily expanded, for instance, increasing the number of switches and providing a pressure detecting function, instead of the switches, for the status setting means because the resonant frequency of the resonant circuit in the position pointer can be set arbitrarily. Further, this invention has an effect that by providing an AGC circuit, the oscillating signal of the positive feedback loop becomes stable and it is possible to extend an extent of distance in which detection of the position pointer is available further more.

Further, in the improved invention, a plurality of the sense lines are laid with a part of the sense lines, the respective two adjacent sense lines among the sense lines are scanned sequentially, and the pointed position is detected with the oscillating signal which is generated by the coupling between the sense lines selected in the above manner. Therefore, the detection of one pointed position does not require scanning in matrix as it is done in the conventional position reading apparatus, but requires scanning only in the detecting direction. Accordingly, there can be realized the position reading apparatus which can detect the pointed position at high speed with less frequency of scanning.

Further, the sense lines are laid in the above manner, direct coupling between the sense lines does not arise around the detecting range though it arises in the conventional position reading apparatus. Therefore, there can be realized the position reading apparatus the detection accuracy of which does not deteriorate even around the detecting range.

According to the inventive key board apparatus applying the basic construction of the present invention, the oscillation circuit resulting from the positive feedback loop is formed when the resonant circuit provided in the key board and the two coils provided in the key board detecting device are electromagnetically coupled, and thereby the pushed switch is detected from the oscillating frequency information. Therefore, the present invention can provide the key board apparatus in which the key board can operate without power source and also can transfer the switch information without contact, and which is highly reliable because conventional problems such as contact failure in the contact of the connector are resolved.

Moreover, the present invention can provided the key board apparatus which contributes to miniaturization of the host system because the host system in the present invention does not require a large space for the connector.

BRIEF DESCRIPTION OF THE DRAWINGS

FIGS. 19A and 19B are block diagrams of the position detecting circuit in the principle construction of FIG. 17.

FIGS. 20A and 20B are correspondence explanatory diagrams showing a relation between the pointed position and the amplitude of the oscillating signal in th principle construction of FIG. 17.

FIG. 31 is a block diagram showing the seventh embodiment of the present invention.

BEST MODE FOR CARRYING OUT OF THE INVENTION

Figure 1:
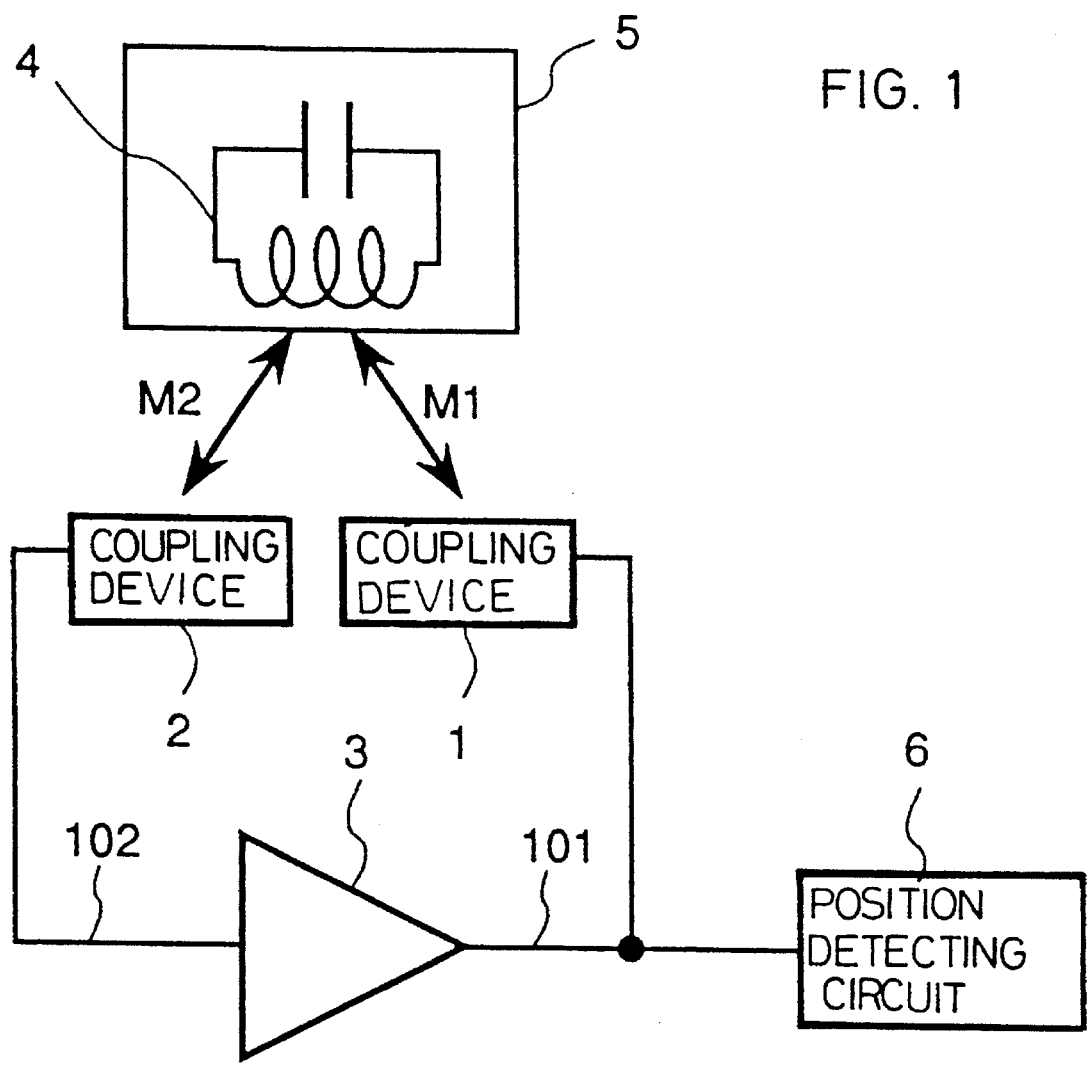
FIG. 1 shows a basic principle of the position reading apparatus disclosed in the present invention.

Referring to the drawings, there are shown embodiments of the present invention.

FIG. 1 shows a basic principle of the present invention. In the FIG. 1, 3 is an amplifier; 1 is a first coupling means connected to an output of the amplifier 3; 2 is a second coupling means connected to an input of the amplifier 3; 4 is a resonant circuit which is electromagnetically coupled to both the first coupling means 1 and the second coupling means 2; 5 is a position pointer having the resonant circuit 4; 101 is an oscillating signal outputted from the amplifier 3; 102 is an input signal inputted into the amplifier 3; 6 is a position detecting means for detecting a position information on the position pointer 5 from an amplitude of the oscillating signal 101; M1 is electromagnetic coupling between the first coupling means 1 and the resonant circuit 4; and M2 is electromagnetic coupling between the second coupling means 2 and the resonant circuit 4.

In FIG. 1, when the position pointer 5 is away from the first and the second coupling means 1 and 2 and no electromagnetic coupling exists between the resonant circuit 4 and the first and the second coupling means 1 and 2, a feedback is not formed and oscillation does not occur.

However, when the position pointer 5 is in the vicinity of the first and the second coupling means 1 and 2 and thereby the electromagnetic coupling M1 and electromagnetic coupling M2 occur between the resonant circuit 4 and the first and the second coupling means 1 and 2, there is formed a positive feedback loop which includes, as components of a route, the output of the amplifier 3, the first coupling means 1, the electromagnetic coupling M1, the resonant circuit 4, the electromagnetic coupling M2, the second coupling means 2, and the input of the amplifier 3; and thereby there occurs the oscillation at a resonance frequency of the resonant circuit 4. The oscillation is excited by noise made by amplifier 3, natural noise and so on, and is a well-known phenomenon in this kind of oscillation action.

If a distance between the resonant circuit 4 and the first and the second coupling means 1 and 2 becomes much smaller, the oscillating frequency does not change; however a feedback amount changes depending on the distance. In other words, the smaller the distance becomes, the further the feedback amount increases and thereby the larger oscillating amplitude can be obtained; on the other hand, the larger the distance becomes, the further the feedback amount decreases and thereby the smaller the oscillating amplitude becomes. In such a way, at the output of the amplifier 3 is obtained the oscillating signal 101 appropriate for the position of the position pointer 5, and the position detecting means can obtain the position information from the amplitude of the oscillating signal 101.

Any type of coupling means can be applied as the first and the second coupling means as far as the feedback loop is not directly formed through the first and the second coupling means when they are not electromagnetically coupled to the resonant circuit. Moreover, the position information can be also obtained from the input signal 102 of the amplifier 3 though an absolute value of the amplitude is small.

Next, the first embodiment of the present invention will be explained referring to FIGS. 2 to 6.

Figure 2:
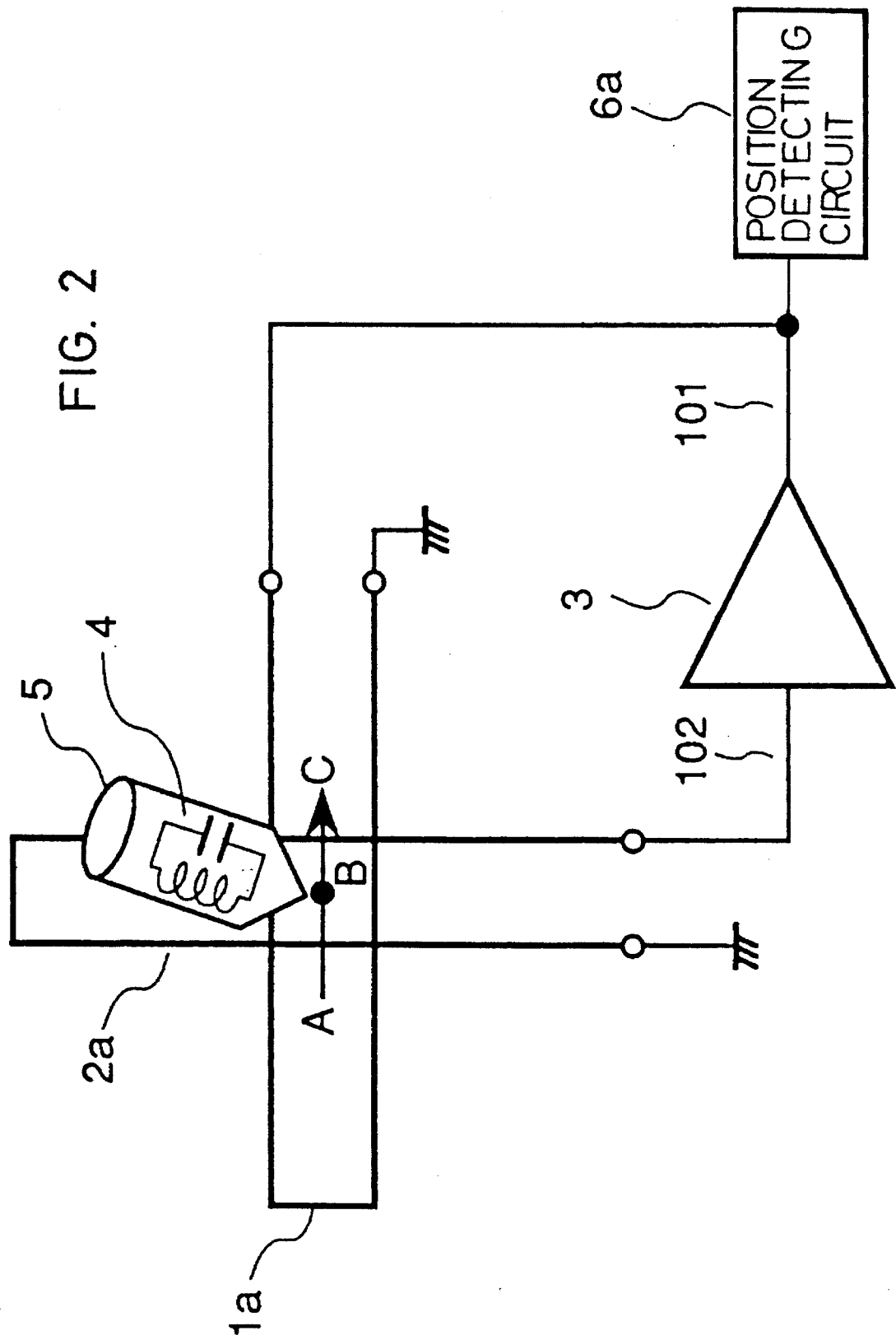
FIG. 2 is a block diagram showing the first embodiment of the inventive position reading apparatus.

FIG. 2 is a block diagram of this embodiment. In this Figure, 1a is a first sense line, 2a is a second sense line, 3 is the amplifier, 4 is the resonant circuit, 5 is the position pointer, 6a is the position detecting means, 101 is the oscillating signal, 102 is the input signal, and A, B and C are positions pointed by the position pointer 5 respectively.

Figure 3:
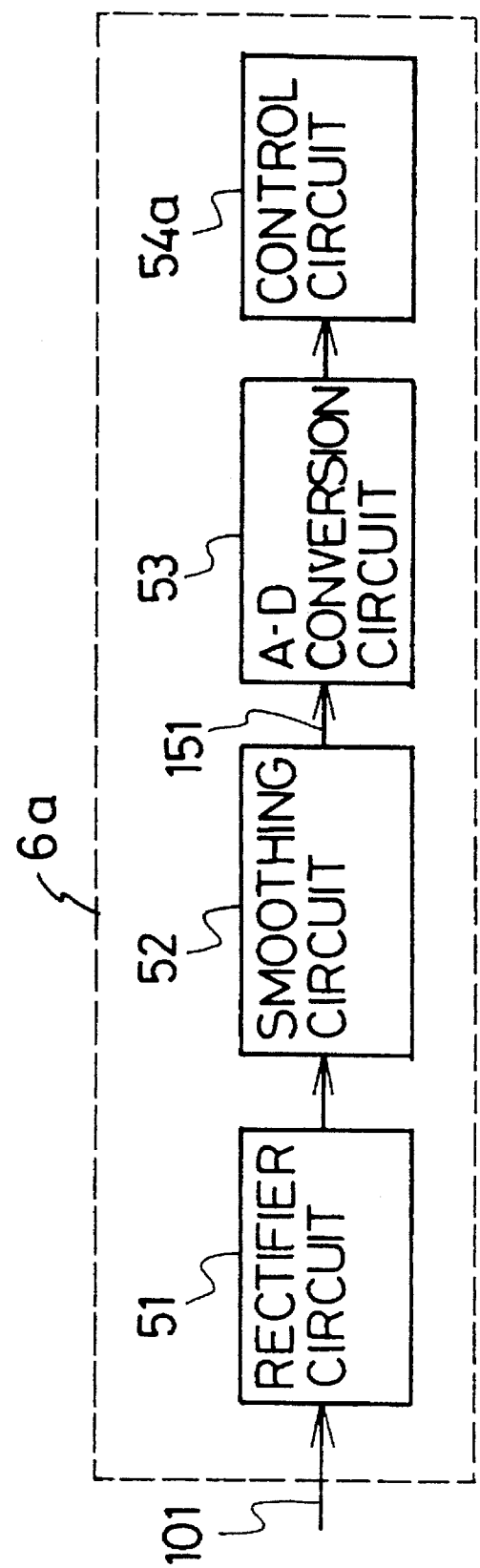
FIG. 3 is a block diagram showing the position detecting means 6a disclosed in the first embodiment of the present invention.

FIG. 3 is a block diagram showing the position detecting means 6a. In the position detecting means, 51 is a rectifier circuit, 52 is a smoothing circuit, 53 is an A–D conversion circuit, 54a is a control circuit composed of a general CPU, 101 is the oscillating signal, and 151 is the oscillating signal before A–D conversion.

Figure 4:
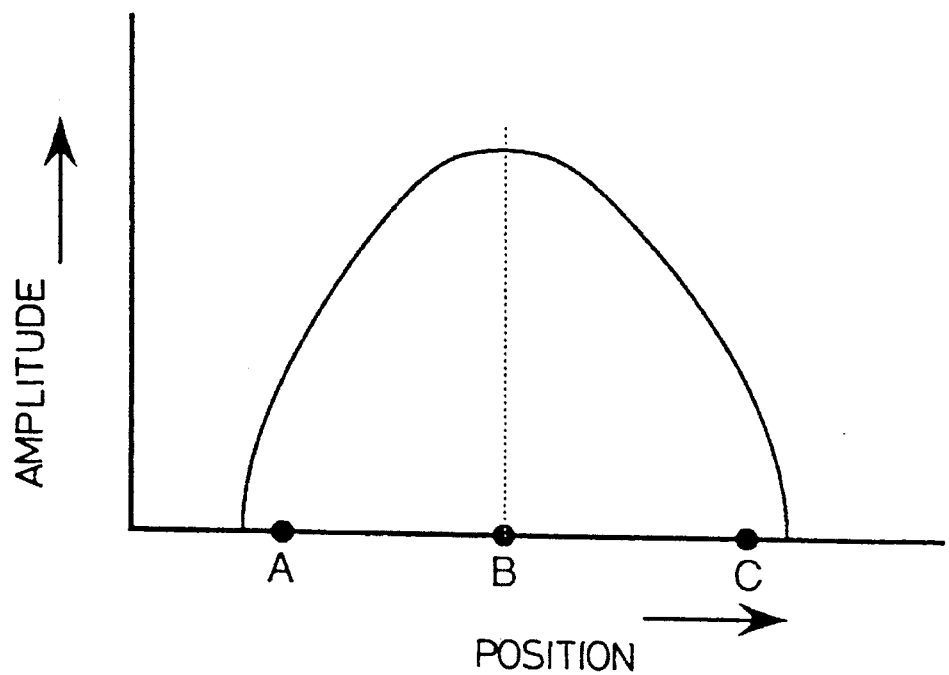
FIG. 4 shows an example of changes in amplitude of the oscillating signal 101 shown in FIG. 3.

FIG. 4 is a graph showing an example of amplitude changes of the oscillating signal 151 shown in FIG. 3. A vertical axis represents the amplitude of the oscillating signal 151, and an axis of abscissas represents the position of the position pointer 5 shown in FIG. 2. A, B and C correspond to A, B and C shown in FIG. 2 respectively.

Figure 5:
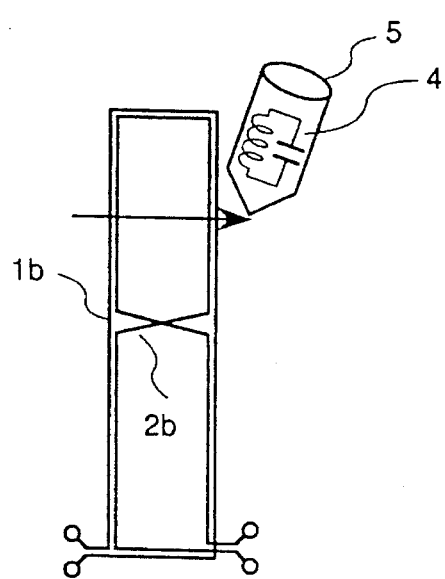
FIG. 5 shows the second structural example of the first sense line 1a and the second sense line 2a shown in FIG. 2.

FIG. 5 is a second structural example of the first sense line 1a and the second sense line 2a shown in FIG. 2. 1b is the first sense line, 2b is the second sense line, 5 is the position pointer and 4 is the resonant circuit.

Figure 6:
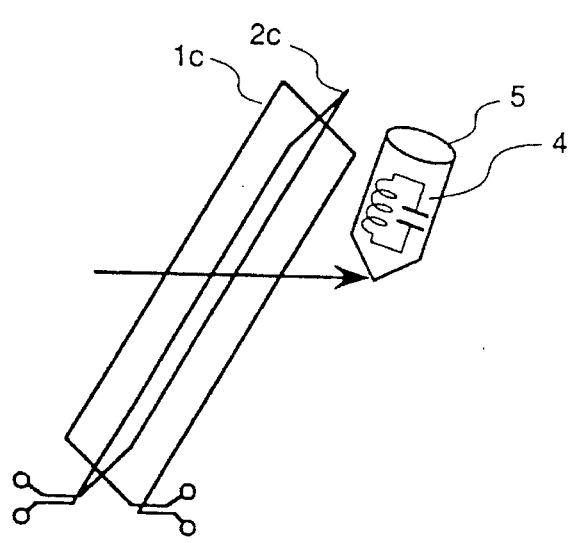
FIG. 6 shows the third structural example of the first sense line 1a and the second sense line 2a shown in FIG. 2.

FIG. 6 is a third structural example of the first and the second sense line 1a and 2a shown in FIG. 2. 1c is the first sense line, 2c is the second sense line, 5 is the position pointer and 4 is the resonant circuit.

An operation of this embodiment will be described below.

In FIG. 2, the first and the second sense line 1a and 2a correspond to the first and the second coupling means 1 and 2 shown in FIG. 1, the basic principle diagram respectively. The first sense line 1a and the second sense line 2a are arranged orthogonally on the level; the first sense line 1a is coupled to the output of the amplifier 3 and the second sense line 2a is coupled to the input of the amplifier 3. When the first sense line 1a and the second sense line 2a are orthogonal to each other, if the position pointer 5 does not exist in the vicinity of them, each of them is not electromagnetically coupled to the resonant circuit, so that the feedback is not formed, neither does the oscillation occur.

However, if the position pointer 5 is brought close to a cross-point of the first sense line 1a and the second sense line 2a, the resonant circuit 4 is electromagnetically coupled to both the first sense line 1a and the second sense line 2a, and thereby the positive feedback loop is formed. This causes the oscillation to occur and the oscillating signal 101 can be obtained.

In the position detecting means 6a, that is, FIG. 3, the oscillating signal 101 is rectified by the rectifier circuit 51, smoothed by the smoothing circuit 52, digitized by the A–D conversion circuit 53, and processed by the control circuit 54a.

FIG. 4 shows an example of amplitude changes of the oscillating signal 151 shown in FIG. 3, that is, the oscillating signal before the A–D conversion which are observed when the position pointer 5 is moved, for instance, from the position A to the position C on condition that a height from each of the sense lines to the position pointer 5 is constant in FIG. 2. In FIG. 4, the amplitude shown a symmetrical change. In other words, the amplitude increases when the position pointer is moved from the position A to the position B, decreases from the position B to the position C, and becomes maximum at the position B which is a center of the cross-point of each sense line. Therefore, in FIG. 3 the control circuit 54a can obtain the distance from the position B to the position pointer 5 from the amplitude of the oscillating signal and a table provided beforehand in the control circuit 54a for showing the relation between the amplitude and the distance.

The amplifier 3 can be realized with a well-known operational amplifier and so on, and either of an inverted type and a non-inverted type amplifier can be applicable as far as it can form the positive feedback loop by making use of a direction at which the sense line winds up and respective connection of two ends of the sense line. The coupling means must meet the conditions that they are not coupled to the resonant circuit when the resonant circuit does not exist in the vicinity of them and that each of them is coupled to the resonant circuit when the resonant circuit is in the vicinity of them. Such coupling means can have not only the structure composed of the first sense line 1a and the second sense line 2a shown in FIG. 2 but also such a structure as shown in FIG. 5 that one of the sense lines are inverted midway or such a structure as shown in FIG. 6 that both sense lines are crossed three-dimensionally.

Next, referring to FIGS. 7 to 11, there will be described an embodiment that each of a first and a second coupling means is composed of a plurality of sense lines and a scanning circuit as a second embodiment of the present invention.

Figure 7:
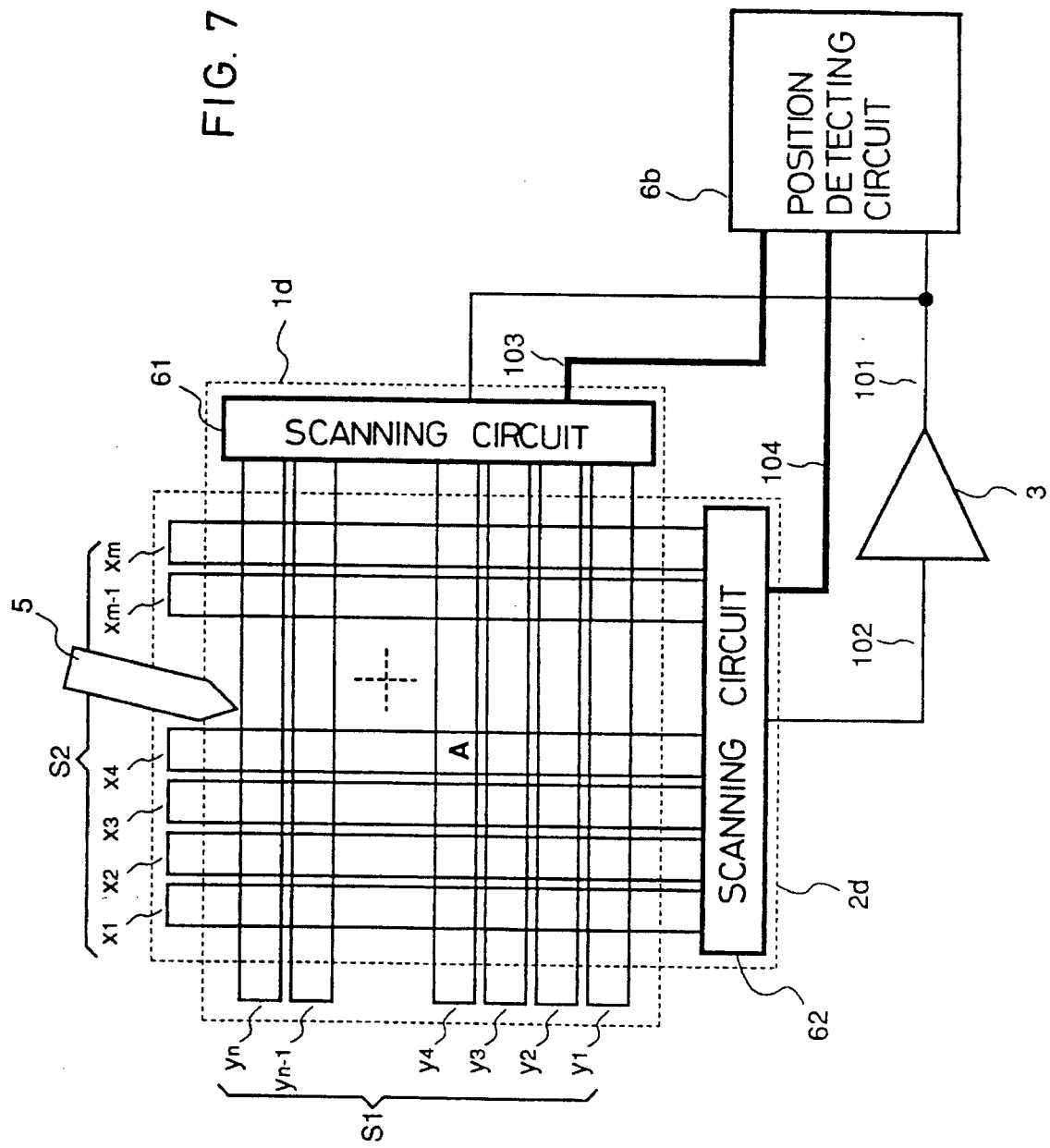
FIG. 7 is a block diagram showing the second embodiment of the inventive position reading apparatus.

FIG. 7 is a block diagram of this embodiment. In this Figure, 5 is a position pointer; 1d is a first coupling means, 2d is the second coupling means; 3 is an amplifier, 6b is a position detecting means; S1 is a first sense line group including sense lines y1 to yn; 61 is a first scanning circuit coupling to an output of the amplifier 3 for selecting each line of the first sense line group S1 sequentially; S2 is a second sense line group including sense lines x1 to xm; 62 is a second scanning circuit coupled to an input of the amplifier 3 for selecting each line of the second sense line group S2; 101 is an oscillating signal; 102 is an input signal; 103 is a selection signal for selecting the first sense line group S1; and 104 is a selection signal for selecting the second sense line group S2.

The position pointer 5 has a resonant circuit as well as that shown in FIG. 2 though the resonant circuit does not appear in the FIG. 7.

Figure 8:
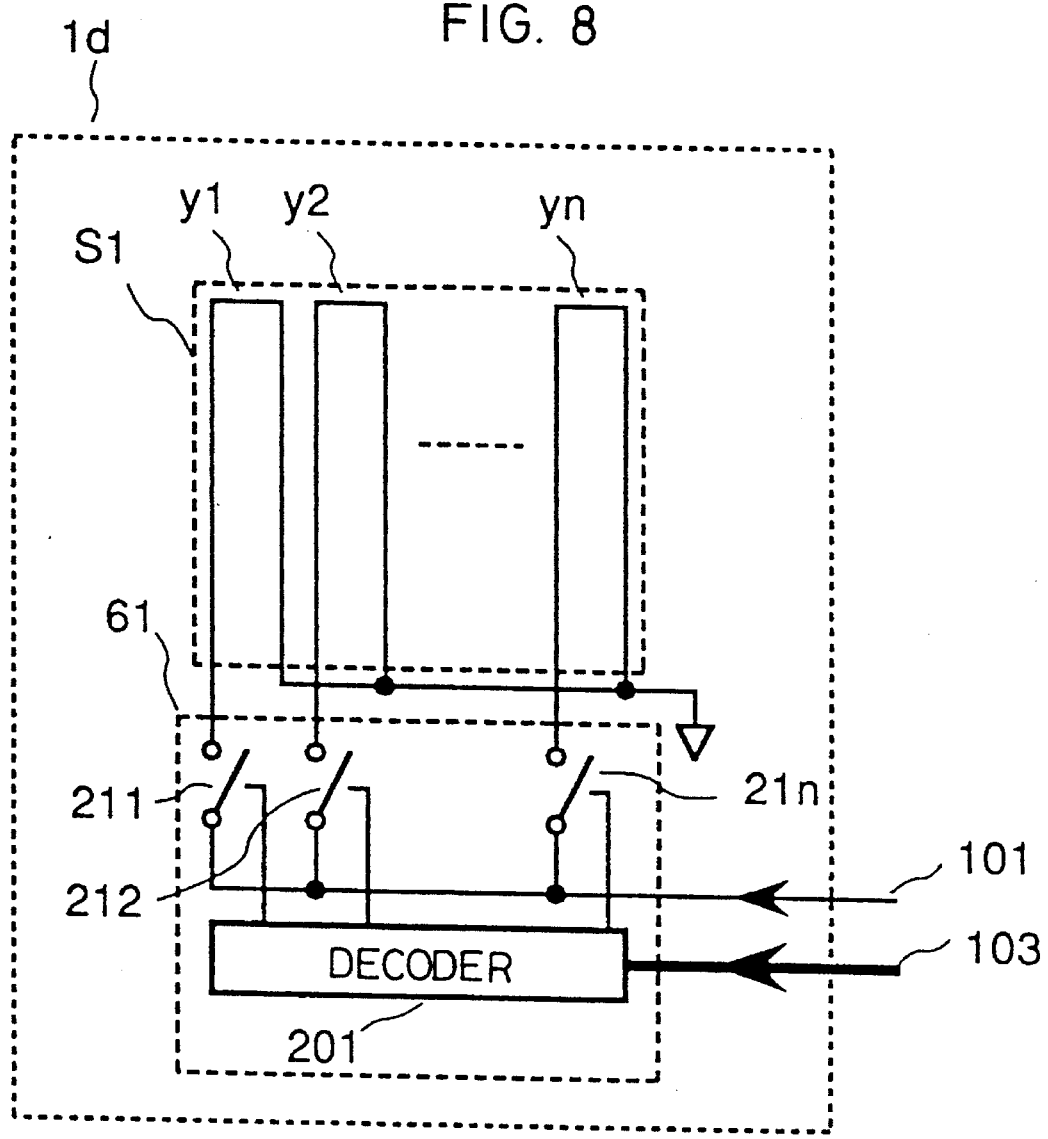
FIG. 8 is a block diagram of the first coupling means 1d disclosed in the second embodiment of the present invention.

FIG. 8 is a structural example of the first coupling means 1d. S1 is the first sense line group; 61 is the first scanning circuit; 201 is a decoder; 211 to 21n are analog switches; 101 is the oscillating signal generated from the output of the amplifier 3; 103 is the selection signal outputted from the position detecting means 6b. Though a detailed drawing of the second coupling means 2d is not shown, the second coupling means 2d has the same structure as that of the first coupling means 1d, and is different from the first coupling means 1d in that it is coupled to the input of the amplifier 3 while the first coupling means 1d is coupled to the output of the amplifier 3.

Figure 9:
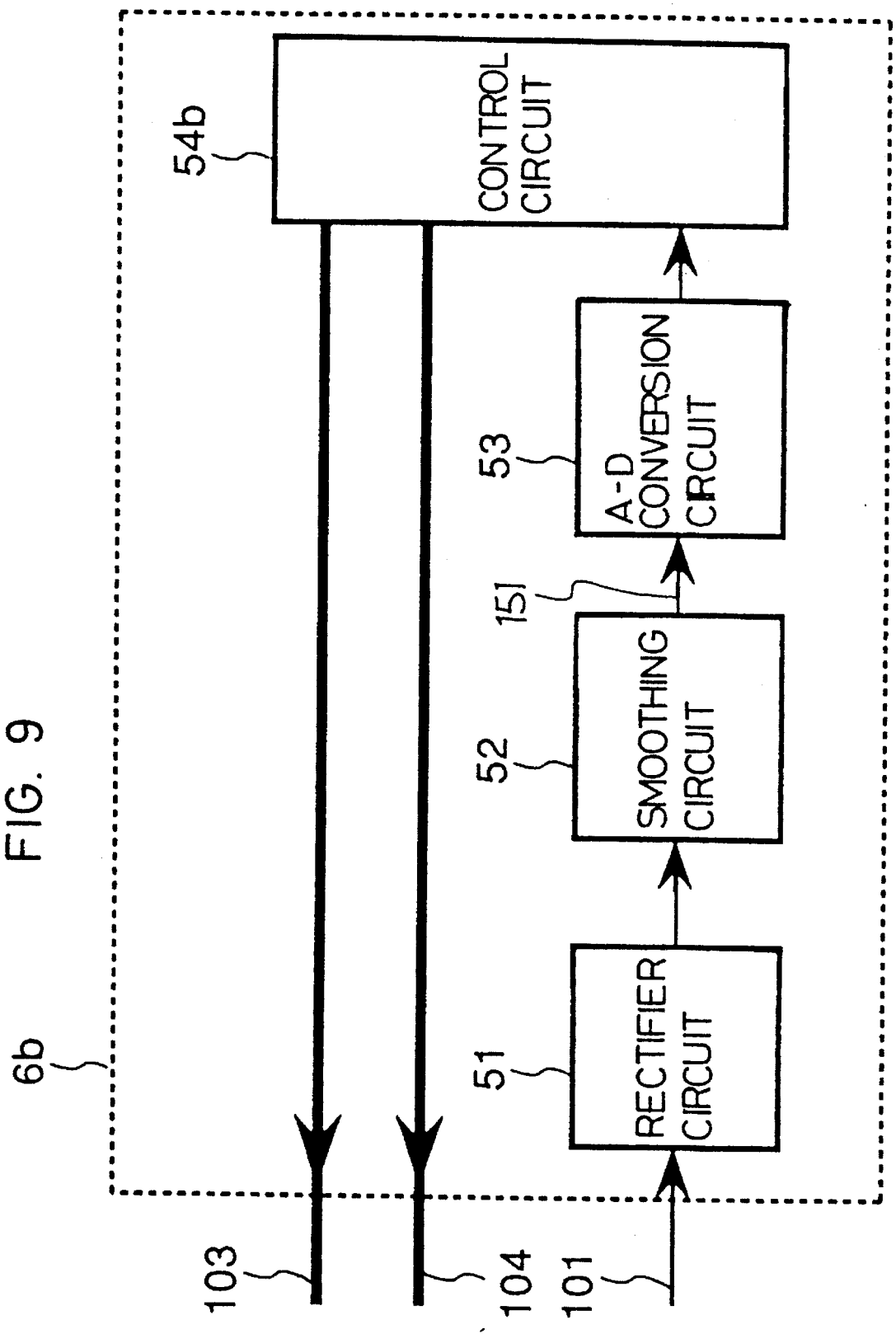
FIG. 9 is a block diagram of the position detecting means 6b disclosed in the second embodiment of the present invention.

FIG. 9 is a structural example of the position detecting means 6b. 51 is a rectifier circuit; 52 is a smoothing circuit;

53 is an A–D conversion circuit; and 54b is a control circuit composed of a general CPU.

Figure 10:
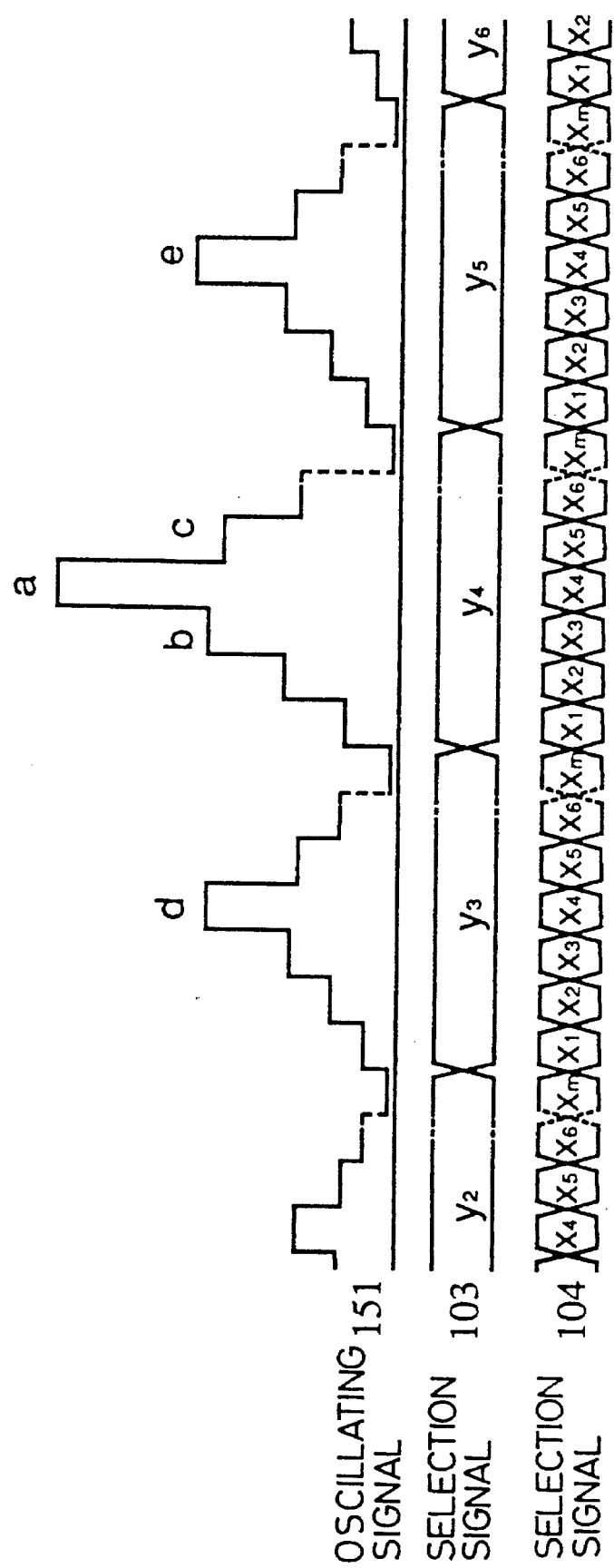
FIG. 10 is a wave form chart of the oscillation signal disclosed in the second embodiment of the present invention.

FIG. 10 is a waveform diagram showing the oscillating signal and FIGS. 11A to 11G are explanatory diagrams for calculating a coordinate. The operation of this embodiment will be explained. The following is explanation of the case the position pointer 5 is located where the sense line x4 and the sense line y4 (a portion A in FIG. 7).

The first scanning circuit 61, first of all, selects the sense line y1 of the first sense line group S1 with the selection signal 103 outputted from the position detecting means 6b. That is, in FIG. 8 the decoder 201 turns on the analog switch 211 with the selection signal 103 and connects the output of the amplifier to the first sense line y1. On the other hand, during the above operation the second scanning circuit 62 selects each sense line of the second sense line group S2 in such sequence as x1, x2, . . . and xm with the selection signal 104 outputted from the position detecting means 6b. After all of the second sense line group is scanned, the first scanning circuit 61 selects the sense line y2 of the first sense line group S1 with the selection signal 103 outputted from the position detecting means 6b and concurrently the second scanning circuit 62 selects each sense line of the second sense line group S2 in such sequence as x1, x2, . . . and xm with the selection signal 104 outputted from the position detecting means 6b. From now on such scanning is repeated. Finally, the first scanning circuit 61 selects the sense line yn of the first sense line group S1 and concurrently the second scanning circuit 62 selects each sense line of the second sense line group S2 in such sequence as x1, x2, . . . xm.

The position detecting means 6b shapes waveforms of the oscillating signals 101 obtained by selecting each of the second sense line group S2 sequentially at the rectifier circuit 51 and the smoothing circuit 55 shown in FIG. 9, and digitizes amplitudes of the waveforms sequentially at the A–D conversion circuit 53, and further processes the digitized signals sequentially at the control circuit 54b.

Referring to FIG. 10, the amplitude of the oscillating signal 101 is described in detail. FIG. 10 is a diagram showing the waveform which is obtained when the position pointer 5 is located over the portion A in FIG. 7, and shows the selection signals 103 and 104 inputted into the first scanning circuit 61 and the second scanning circuit 62 respectively and an oscillating signal before being A–D converted at the position detecting means 6b (the signal 151 in FIG. 9).

A signal "a" is the oscillating signal which is obtained when the scanning circuit selects the portion A, that is, the first sense line y4 and the second sense line x4, and is the largest signal among the signals which are generated while all the sense lines are scanned. The reason for the above is that a degree of coupling between the resonant circuit of the position pointer 5 and the sense line y4 becomes maximal when the first scanning circuit selects the sense line y4 which is the closest to the position pointer 5 among the first sense line group S1, that a degree of coupling between the resonant circuit of the position pointer 5 and the sense line x4 becomes maximal when the second scanning circuit selects the sense line x4 which is the closest to the position pointer 5 among the second sense line group S2, and that a maximum amount of feedback can be obtained when both of the couplings become maximal.

Signals "b" and "c" are the oscillating signals which are obtained when a portion on either side of the portion A respectively, that is, when the first sense line y4 and the second sense line x3 are selected and when the first sense line y4 and the second sense line x5 are selected respectively. In these cases, the degree of coupling between the resonant circuit of the position pointer 5 and the first sense line y4 is as large as that in the case of selecting the portion A. However, the oscillating signals "b" and "c" are smaller in amplitude than the oscillating signal "a" as the distance between the position pointer 5 and the selected second sense line is larger than that in the case of selecting the portion A.

Further, signals "d" and "e" are the oscillating signals which are obtained when portions below and above the portion A respectively, that is, when the first sense line y3 and the second sense line x4 are selected and the first sense line y5 and the second sense line x4 are selected respectively. In these cases, the degree of coupling between the resonant circuit of the position pointer 5 and the second sense line x4 is as large as that in the case of selecting the portion A. However, the oscillating signals "d" and "e" are smaller than in amplitude than the oscillating signal "a" as the distance between the position pointer 5 and the selected first sense line is larger that in the case of selecting the portion A.

The oscillating signals "a" to "e" have been explained above. The amplitude of other oscillating signals also depends on a relation between the positions of the sense lines which are selected from the first sense line group S1 and the second sense line group S2 respectively and the position of the position pointer 5.

Further, as mentioned in the above first embodiment, because the first sense line group S1 and the second sense line group S2 are perpendicular to each other, fundamentally the two groups S1 and S2 are not electromagnetically coupled and the oscillation does not occur when the position pointer 5 does not exist near the first and second coupling means. Therefore, as explained above, the amplitude of the oscillating signal can be determined by the relation between the positions of the sense lines which are selected from the first sense line group S1 and the second sense line group S2 respectively and the position of the position pointer 5. The following is explanation of methods for calculating a coordinate by paying attention to some of the five oscillating signals "" to "e" mentioned above.

Figures 11A, 11B, 11C:
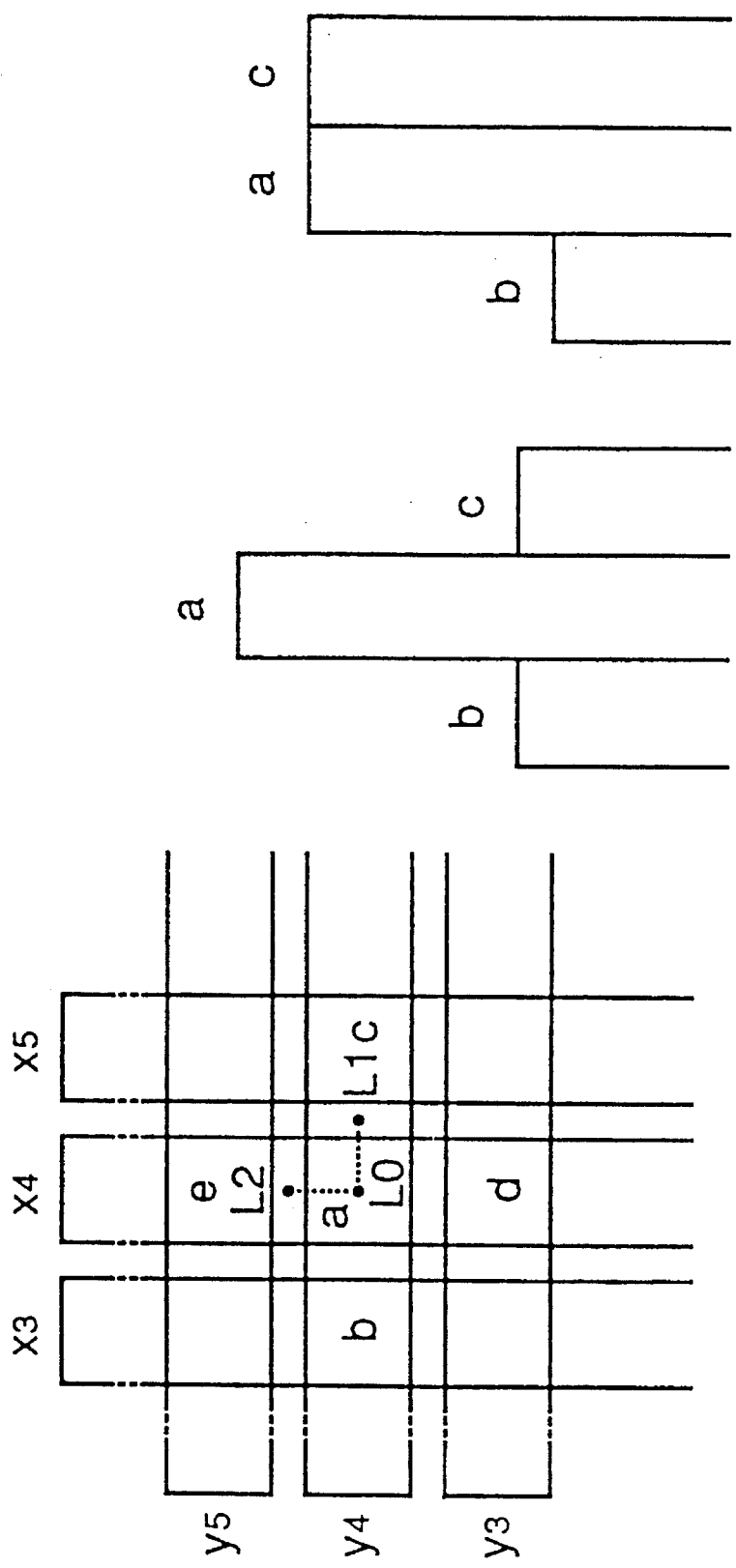
FIGS. 11A to 11C are explanatory diagrams for coordinate calculation in the second embodiment.

As a first case, referring to FIGS. 11A to 11D there will be described a method for calculating an x-coordinate by paying attention to the oscillating signals "a", "b" and "c" FIG. 11A is an enlarged view of an area around-the portion A shown in FIG. 7. Suppose the position pointer 5 travels along a center of a width of the sense line y4 from the center of the width of the sense line x4, L0 to a middle position between the sense lines x4 and x5, L1. FIGS. 11B and 11C show the oscillating signals "a", "b" and "c" which are generated when the position pointer 5 is located on L0 and L1 respectively.

First of all, explanation will be given for a case that the position pointer 5 is located on L0 shown in FIG. 11B. As mentioned above, the oscillating signals "a", "b" and "c" are signals which are generated when the sense line x4, x3 and x5 are selected respectively while the sense line y4 is selected. In this case, the oscillating signal "a" has the largest amplitude, and the oscillating signals "b" and "c" are equivalent in amplitude because the sense lines x3 and x5 are equally separate from the position pointer 5.

Secondly, explanation will be given for the case that the position pointer 5 is located on L1 shown in FIG. 11C. In this case, the oscillating signals "a" and "c" are equivalent in amplitude because the sense lines x4 and x5 are equally separate from the position pointer 5. Then, the coordinate can be calculated by applying the method proposed by the present applicant (the Japanese Patent Provisional Publication No. 96411/80). Namely, calculation defined by the below expression is done based on the oscillating signal.

$$Q=(V_P-V_{P+1})/(V_P-V_{P-1}) \quad \text{(expression-1)},$$

where $V_{P+1} > V_{P-1}$

FIG. 11D shows a change in value of Q expressed by the (expression-1) which results from moving the position pointer 5 from L0 to L1 by substituting the oscillating signal "a" for $V_P$, the oscillating signal "b" for $V_{P-1}$, and the oscillating signal "c" for $V_{P+1}$ respectively. It is obvious from the above explanation that Q=1 when the position pointer 5 is located on L0 and that Q=0 when the position pointer 5 is located on L1. Further, when the position pointer 5 is located between L0 and L1, Q takes the value 0<Q<1; and there is one-to-one correspondence between each of values representing the positions between L0 and L1 mentioned above and the Q. Therefore, by finding experimentally the characteristics of Q beforehand, it is possible to calculate Q from the oscillating signals "a", "b" and "c" and find from the Q the detailed position of the position pointer 5 between L0 and L1 on the sense line. Further, the x-coordinate can be found from the Q and the position of the sense line A which detects the oscillating signal "a". The details of the method for calculating the coordinate is omitted in the present specification as it is disclosed in the Japanese Patent Provisional Publication No. 96411/80.

Next, as a second case, referring to FIGS. 11A and 11D to 11G there will be described a method for calculating a y-coordinate by paying attention to the oscillating signals "a", "d" and "e". The y-coordinate can be explained in a similar way as well as the above x-coordinate. Suppose in FIG. 11A the position pointer 5 travels along a center of a width of the sense line x4 from the center of the width of the sense line y4, L0 to a middle position between the sense lines y4 and y5, L2. FIGS. 11E and 11F show the oscillating signals "a", "d" and "e" which are generated when the position pointer 5 is located on L0 and L2 respectively.

First of all, explanation will be given for a case that the position pointer 5 is located on L0 shown in FIG. 11E. As mentioned above, the oscillating signals "a", "d" and "e" are signals which are generated when the sense line x4 is selected while the sense lines y4, y3 and y5 are selected respectively. In this case, the oscillating signal "a" has the largest amplitude, and the oscillating signals "d" and "e" are equivalent in amplitude because the sense lines y3 and y5 are equally separate from the position pointer 5.

Secondly, there will be explained a case that the position pointer 5 is located in L2 shown in FIG. 11F. In this case, the oscillating signals "a" and "e" are equivalent in amplitude because the sense lines y4 and y5 are equally separate from the position pointer 5.

Therefore, like the above-mentioned case of the x-coordinate, FIG. 11G shows the characteristics of Q in the case of moving the position pointer 5 from L0 to L2, which are found by the (expression-1) when the oscillating signals "a", "d" and "e" are substituted for $V_P$, $V_{P-1}$ and $V_{P+1}$ respectively. Then, there is obtained the almost same characteristics as those in the case of the x-coordinate shown in FIG. 11D, and the y-coordinate can be obtained by use of the characteristics of Q as well as the x-coordinate. The above processings are done in the control circuit 54b (shown in FIG. 9) composed of a general CPU.

Next, referring to FIGS. 12 and 13, as a third embodiment of the present invention, there will be described an embodiment which are provided with a status setting means and a status detecting means.

Figure 12:
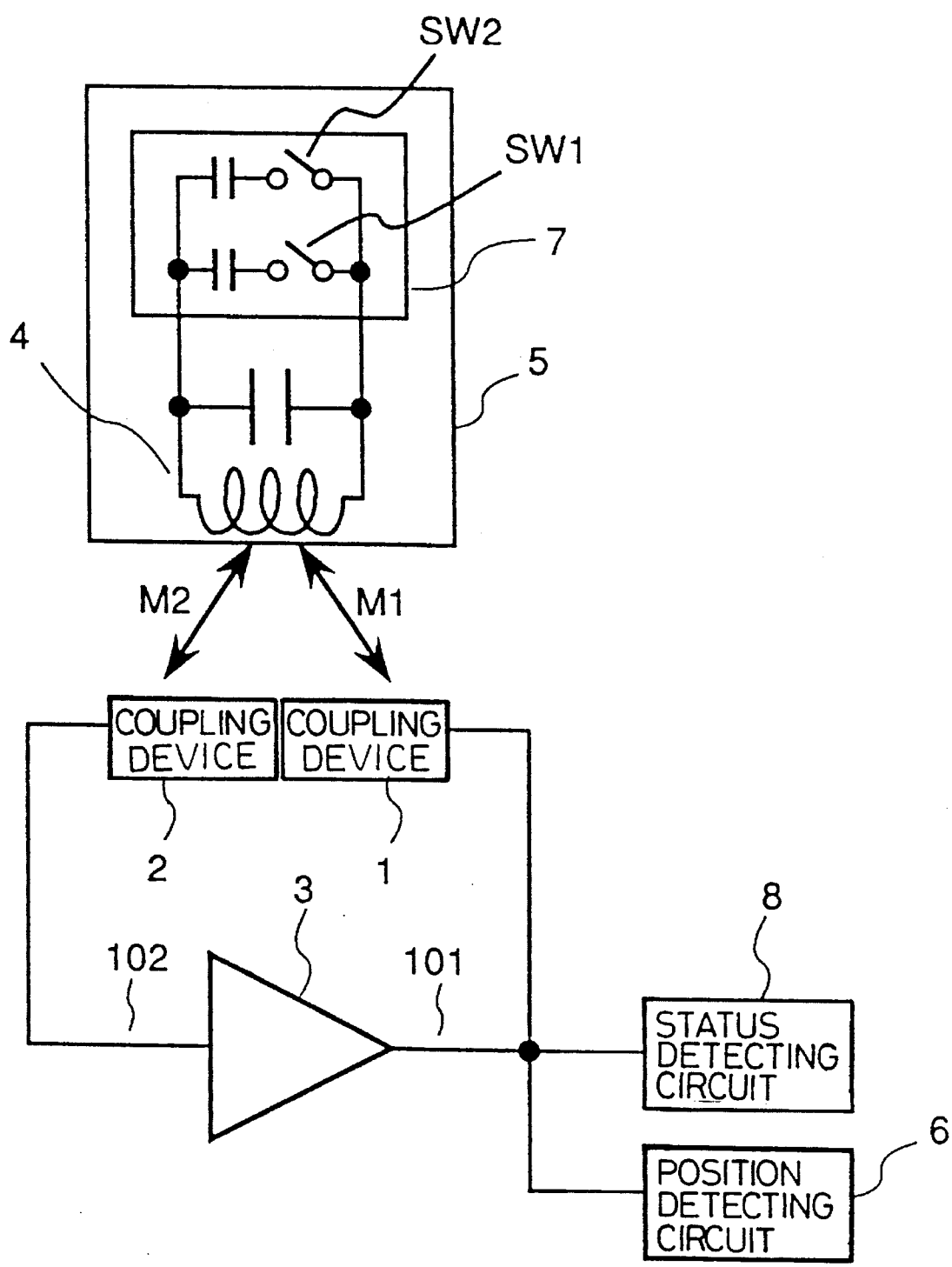
FIG. 12 is a block diagram showing the third embodiment of the inventive position reading apparatus.

FIG. 12 is a block diagram of this embodiment. In FIG. 12, 3 is an amplifier, 1 is a first coupling means, 2 is a second coupling means, 4 is a resonant circuit, 5 is a position pointer, 6 is a position detecting means, 101 is an oscillating signal, 102 is an input signal, M1 and M2 are electromagnetic coupling between the first and second coupling means and the resonant circuit 4, 7 is the status setting means for changing a resonance frequency of the resonant circuit 4, SW1 is a first switch, SW2 is a second switch, and 8 is status detecting means for detecting a condition set by the status setting means 7 from the oscillating signal 101.

Figure 13:
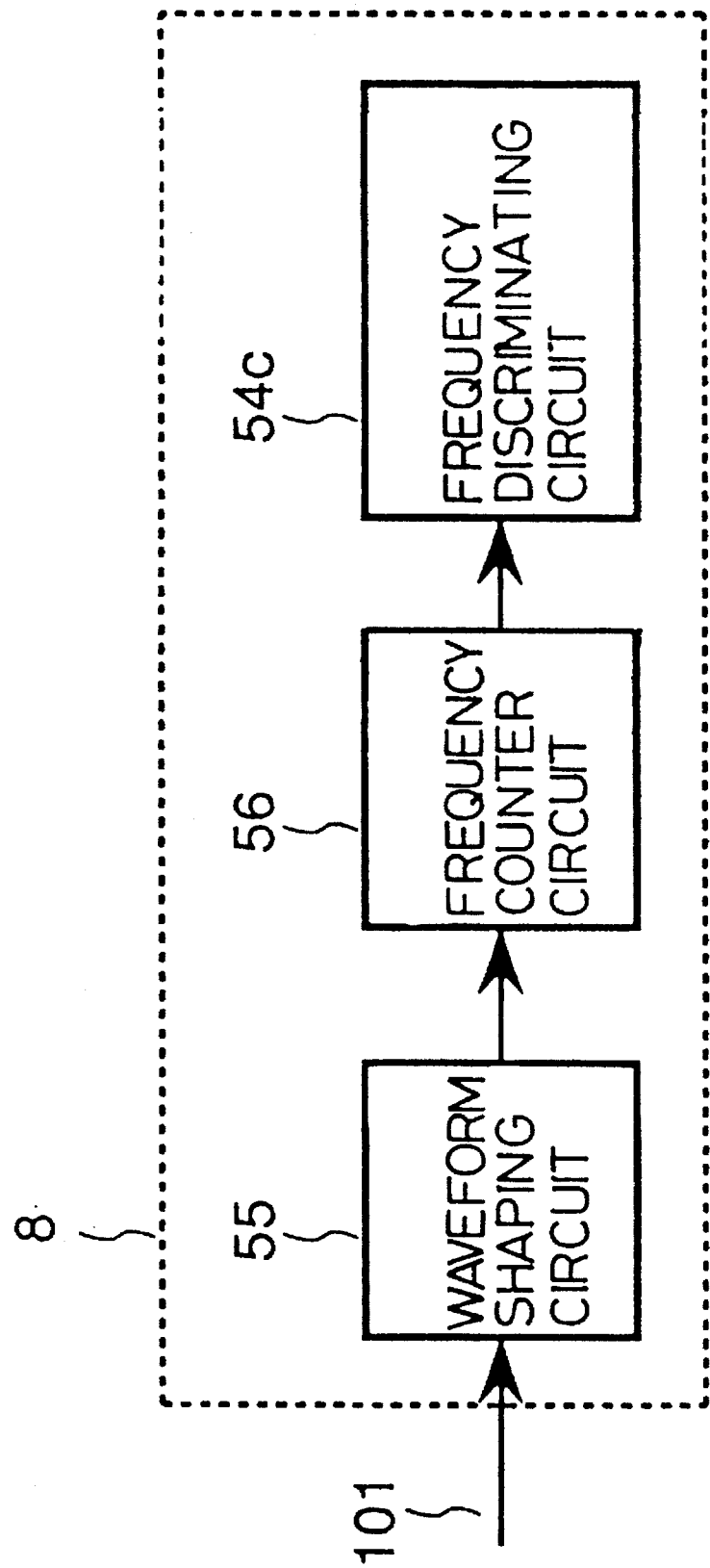
FIG. 13 is a block diagram of the status detecting means 8 disclosed in the third embodiment of the present invention.

FIG. 13 is a block diagram showing the status detecting means 8. In this Figure, 55 is waveform shaping circuit, 56 is a frequency counter circuit, and 54c is a frequency discriminating circuit composed of a general CPU.

There will be described operation of this embodiment. In FIG. 12, the resonant circuit 4 is set with three different resonance frequencies: 300 kHz in the case where the first and the second switch SW1 and SW2 are off, 280 kHz in the case where the first switch SW1 is on, and 260 kHz in the case where the second switch SW2 is on. Therefore, according to the above-mentioned fundamental principle, an output of the amplifier 3 obtains the oscillating signal 101 of 300 kHz when the first and the second switch SW1 and SW2 are off, that of 280 kHz when the first switch SW1 is on, and that of 260 kHz when the second switch is on respectively. Then, the oscillating signal 101 is outputted to the status detecting means 8.

In FIG. 13, the waveform shaping circuit 55 waveform-shapes the oscillating signal 101, frequency counter circuit 56 counts the frequency of the oscillating signal, and the frequency discriminating circuit 54c determines whether the obtained frequency is 300 kHz, 280 kHz, or 260 kHz; and thereby setting conditions of the first switch SW1 and the second switch SW2 can be detected.

Further, on discriminating the frequency, it is possible to absorb fluctuation in a resonance frequency caused by change in temperature and irregularity of specific value of parts if respective ranges for discrimination are determined. For instance, if the frequency is between 270 kHz and 290 kHz, the first switch SW1 is on.

Though this embodiment gives an instance that two switches are mounted on the position pointer 5, the oscillating frequency, that is, the resonance frequency can be set at an arbitrary value within a range in which phase characteristics and gain of the amplifier 3 are guaranteed, for example, between 100 kHz and 1 MHz. Thereby, it is also possible to mount switches more than two on the position pointer 5 and discriminate the frequency with them. For instance, a frequency range between 300 kHz and 500 kHz is equally divided into ten ranges and a switch is allocated to each of the divided ranges every 20 kHz, and thereby ten switches can be allocated in total. Such an allocation of the frequency can be set by taking into consideration range of fluctuation in the resonant frequency caused by change in temperature and irregularity of specific value of parts.

Further, if a plurality of position pointers are provided and predetermined frequency ranges are allocated to the respective position pointers, it is also possible to distinguish one position pointer from the others and distinguish the set condition at the same time.

This embodiment has a structure that capacitor are connected in parallel in the resonant circuit as the status setting means for changing the frequency of the resonant circuit, and the resonant frequency lowers when the switch is pressed. However, there are many means for changing the resonance frequency as the status setting means other than the switch, for instance, a means for changing the frequency continuously with a pressure sensor and so on and detecting pressure with the status detecting means. It is needless to say that other embodiments also can realize the set of the resonance frequency. Additionally, the position detecting means have any structure as far as it can detect the change in frequency, which is not limited to the structure disclosed in this embodiment. Further, as the first and second coupling means, any of what are explained above can be applied.

Next, referring to FIGS. 14 to 16, as a fourth embodiment of the present invention, there will be described an embodiment which is provided with an AGC circuit for controlling a gain of an amplifier.

Figure 14:
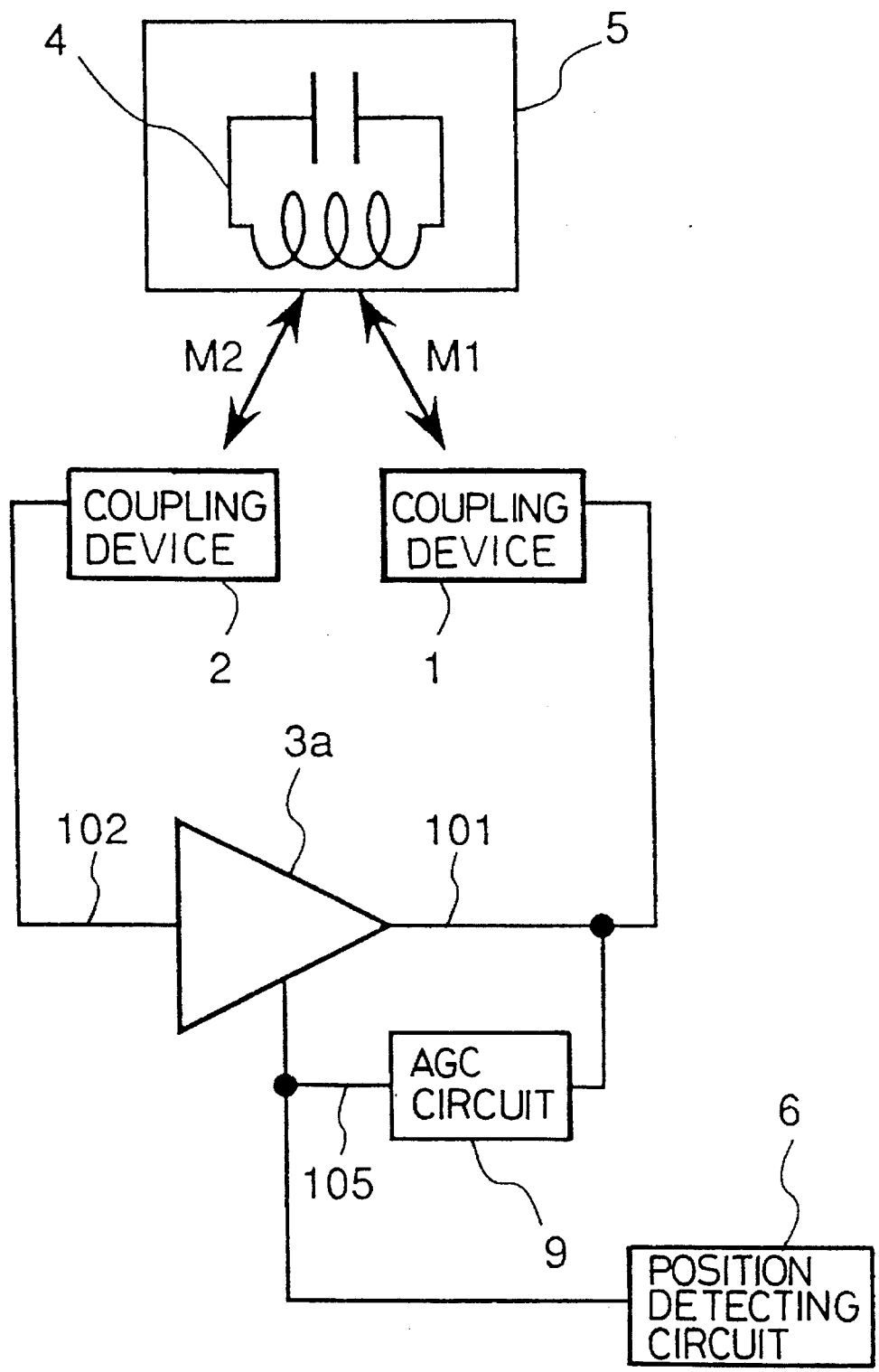
FIG. 14 is a block diagram showing the fourth embodiment of the inventive position reading apparatus.

FIG. 14 is a block diagram of this embodiment. In this Figure, 3a is the amplifier capable of controlling the gain, 1 is a first coupling means, 2 is a second coupling means, 4 is a resonant circuit, 5 is a position pointer, 6 is a position detecting means, 101 is an oscillating signal, 102 is an input signal, M1 and M2 are electromagnetic coupling between the first and the second coupling means and the resonant circuit 4 respectively, 9 is the AGC circuit for controlling the gain of the amplifier 3a, and 105 is a control signal outputted from the AGC circuit.

Figure 15:
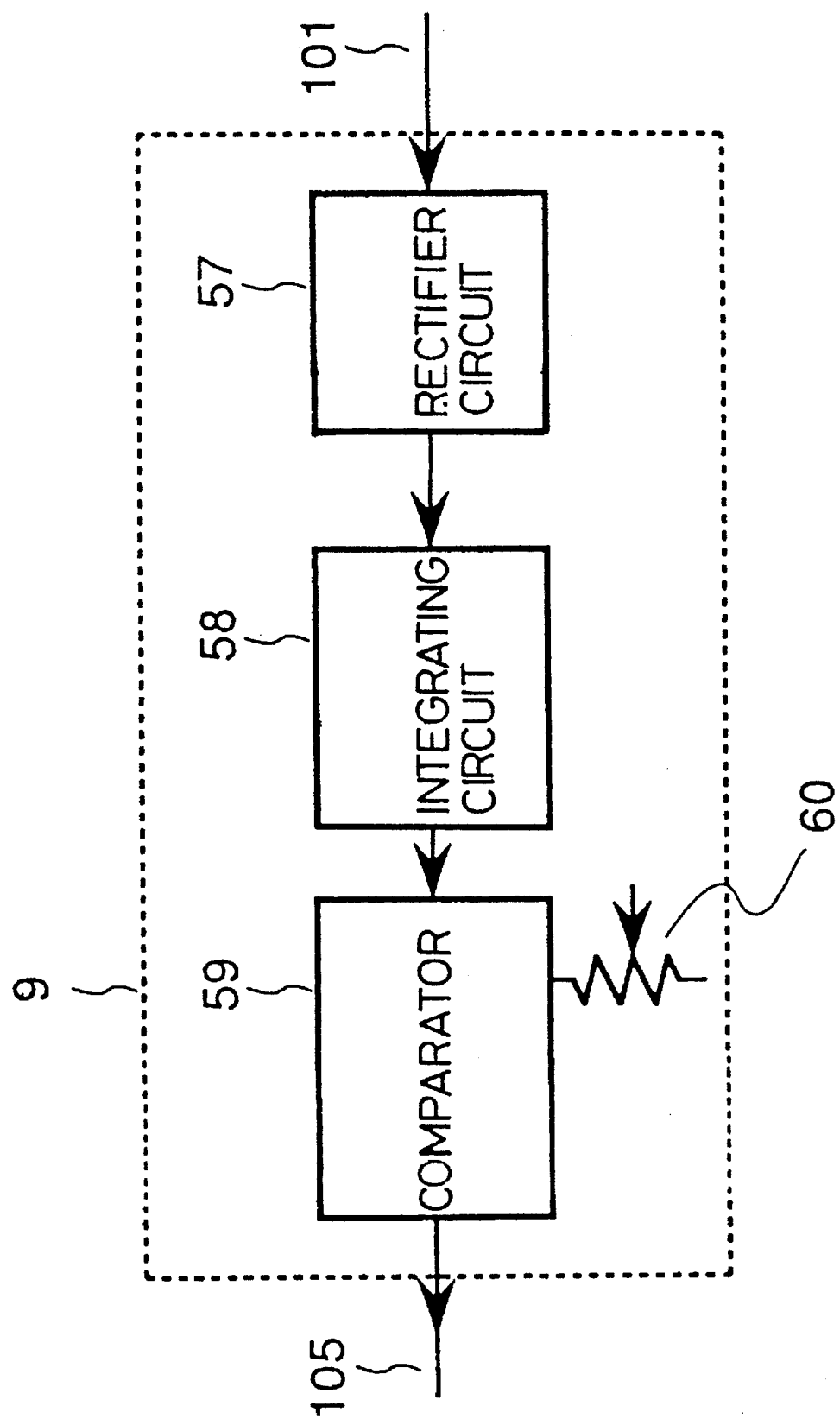
FIG. 15 is a block diagram of the AGC circuit 9 disclosed in the fourth embodiment of the present invention.

FIG. 15 is a block diagram of the AGC circuit 9. In this Figure, 57 is a rectifier circuit, 58 is an integrating circuit, 59 is a comparator, 60 is an amplitude setting means, 101 is the oscillating signal, and 105 is the control signal.

Figure 16:
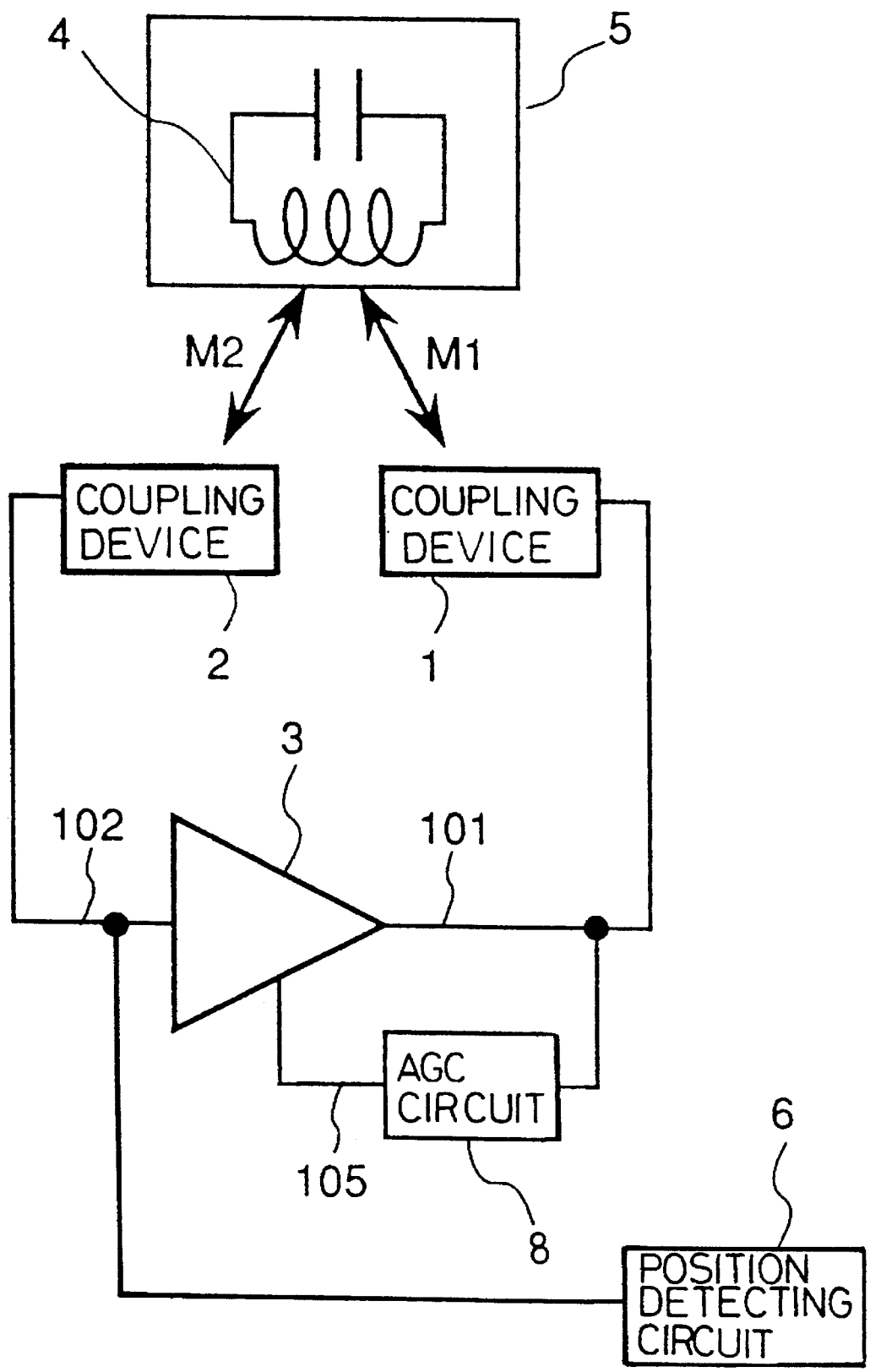
FIG. 16 is a block diagram of the case where position information is obtained from the input signal 102 in the fourth embodiment of the present invention.

FIG. 16 is a structure example in the case of obtaining position information from the input signal 102.

Operation of this embodiment will be explained below. In FIG. 14, while the resonant circuit 4 is not coupled to either the first or the second coupling means 1 and 2, the gain of the amplifier 3a is sufficiently increased beforehand. Then, if the resonant circuit 4 approaches the first and the second coupling means 1 and 2 and thereby an oscillation starts, the AGC circuit 9 controls the gain of the amplifier 3a and limits an amplitude of the oscillating signal 101. In other words, in FIG. 15 the AGC circuit 9 rectifies the oscillating signal 101 at the rectifier circuit 57, integrates the rectified signal at the integrating circuit 58, and compares the amplitude of the oscillating signal 101 with the amplitude value set by the amplitude setting means 60 at the comparator 59. Thereby the control signal 105 is outputted to the amplifier 3a so that the amplitude of the oscillating signal 101 remains the amplitude which is set at the amplitude value set by the amplitude setting means 60.

If a distance between the resonant circuit 4 and the first and the second coupling means 1 and 2 becomes smaller, the control signal 105 outputted from the AGC circuit 9 changes in accordance with the distance, and the position detecting means 6 can obtain position information on the position pointer 5 from amplitude information on the oscillation which can be obtained from the control signal 105 outputted by the AGC circuit 9. By means of controlling with the AGC circuit 9 in the above manner, the oscillation becomes stable, the amplitude of the oscillating signal 101 becomes constant even if a position of the resonant circuit 4 changes, and the position information can be obtained from the control signal 105 generated by the AGC circuit 9.

Further, the position information can be also obtained from the input signal 102 of the amplifier 3a in a similar way though an absolute value in small as indicated in FIG. 16. Moreover, in an combination of the status setting means and the status detecting means disclosed in the third embodiment also, it is possible to use the oscillating signal 101 the amplitude of which becomes constant and detect position more stably. The amplifier 3a disclosed in this embodiment can be realized also with a well-known amplifier such as a VCA the gain of which can be varied outside of the VCA, for instance, TL026 of T.I.

As mentioned above, in this embodiment it is possible to extend further an extent of distance in which detection of the position pointer is available and to obtain more stable oscillation by means of providing the AGC circuit for controlling the gain of the amplifier and utilizing a dynamic range of the amplifier effectively. Further, as the first and the second coupling means, any of those which are explained in the above-mentioned embodiments can be employed.

Figure 17:
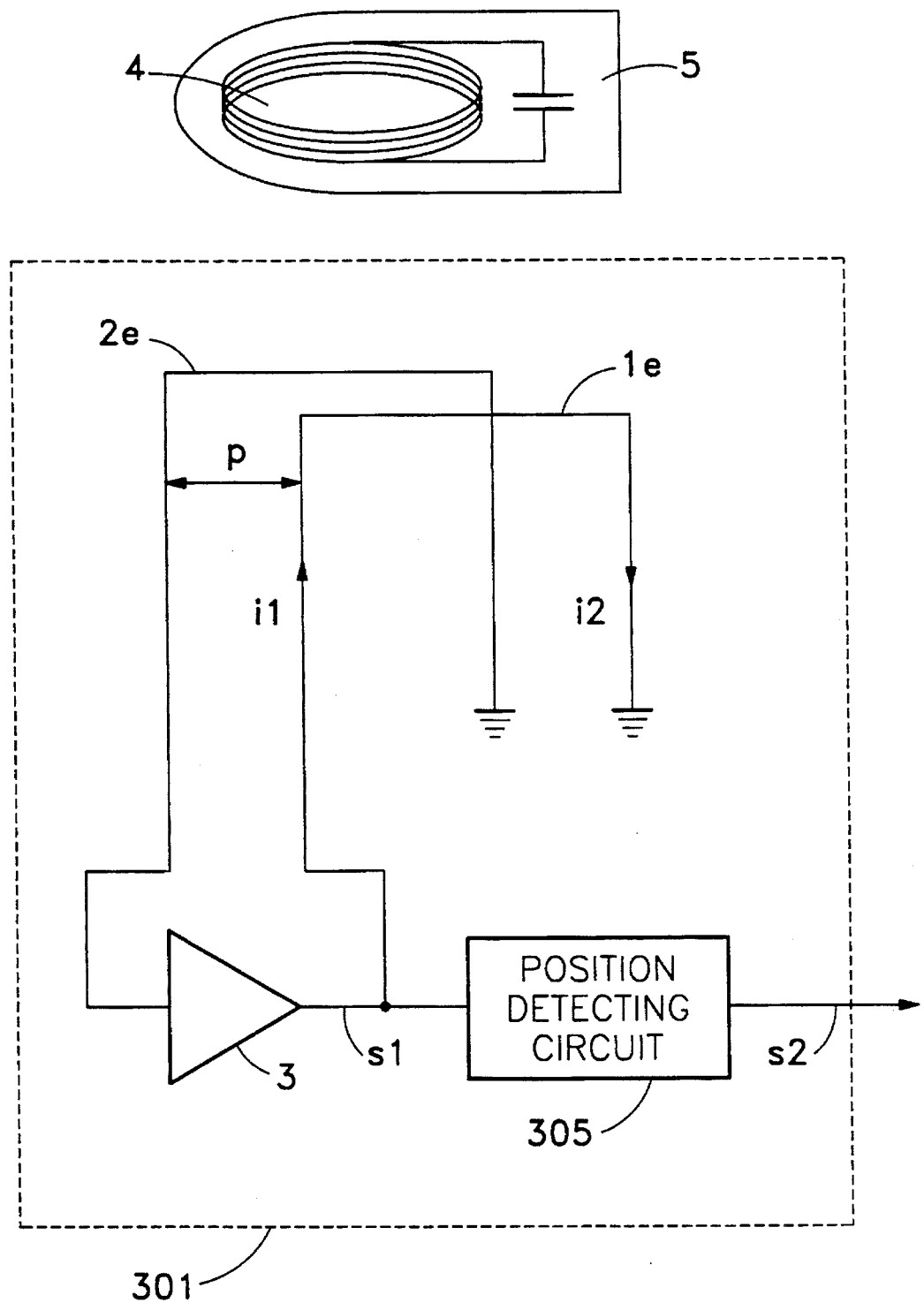
FIG. 17 is a principle block diagram of the position reading apparatus which improves the present invention.

Next, a principle construction of an improved invention will be explained referring to FIGS. 17 to 21. FIG. 17 is a principle block diagram for explaining the principle of position detection of the present invention.

A position pointer 5 is used for pointing a position to be inputted and is provided with a resonant circuit 4. A resonance frequency of the resonant circuit 4 is elected by taking into account functions of an amplifier and intensity of electromagnetic coupling which are mentioned below and is set at a few hundreds kHz.

A body of a detecting device 301 is provided with a first sense line 1e, a second sense line 2e, an amplifier 3, and a position detecting circuit 305.

The first and the second sense line 1e and 2e are, for example, wires laid in a shape of a loop on a printed board, and are laid with a part of the loops overlapped. A laying interval p between the two sense lines is selected so that an effect of direct electromagnetic coupling between the two sense lines is canceled. For instance, the first and the second sense line are laid at such laying intervals p as cause following two induced currents to be induced to the second sense line 2e when an alternating current (left side current i1=right side current i2) flows through the first sense line 1e. Between the two induced currents, one is induced by the left side current i1 and the other induced current is induced by the right side current i2. The two induced currents are reverse in polarity and equivalent in intensity. The first and the second sense line are laid at the laying intervals p which enable the above conditions to be realized.

The first and the second sense line 1e and 2e constructed in the above manner are connected to an output and an input of the amplifier 3 respectively. However, in the above description, the two kinds of the sense lines are referred to as the first and the second line only in order to distinguish the two sense lines for explanation. Because the two sense lines are named the first sense line and the second sense line for explanation in the above and both sense lines are same in construction, functions of the apparatus is completely equivalent to that with the above connection even if the first sense line 1e is connected to the input of the amplifier 3 and the second sense line 2e is connected to the output of the amplifier 3.

The electromagnetic coupling among the first and the second sense line 1e and 2e, and the resonant circuit 4, and polarity and gain of the input and the output of the amplifier 3 include conditions for the construction of the inventive apparatus. Therefore, these values are properly selected to design the apparatus. First of all, when the resonant circuit 4 is close to the first and the second sense line 1e and 2e, it is necessary to set phase relation of each coupling among respective elements so that a closed loop circuit composed of the first sense line 1e, the resonant circuit 4, the second sense line 2e and the amplifier 3 becomes a positive feedback loop. Further, the gain of the amplifier 3 must be selected so that oscillation starts, when the gain of the closed loop circuit becomes at least one while the resonant circuit 4 is close to the first and the second sense line.

A frequency oscillator formed by the positive feedback loop is a well-known circuit, and it is a commonly well-known technology that oscillation starts, if a positive feedback loop is formed when the loop gain is at least one. In the inventive apparatus, it is necessary that the loop gain changes depending on a distance from the sense lines to the resonant circuit 4, and that when the distance becomes smaller than a predetermined value and electromagnetic coupling becomes stronger, the loop gain becomes to least one and thereby the oscillation starts.

The position detecting circuit 305 outputs a position detecting signal s2 by using amplitude information on an oscillating signal sl which arises from the positive feedback loop. In this constructional example, the position detecting circuit 305 is connected to the output of the amplifier 3.

FIGS. 19A and 19B show examples of the position detecting circuit 305. The circuit shown in FIG. 19A is composed of a rectifier circuit 51 and a smoothing circuit 52, and outputs an envelope signal of the oscillating signal sl as the position detecting signal s2a. As a state of the position detecting signal s2 is converted so that it is easy to utilize the system using position information, the position detecting circuit 305 is added with such an output circuit as a desired output can be obtained. For instance, when it is desired to obtain the position detecting signal s2 in digital value, and A–D conversion circuit 53 is provided on a stage subsequent to the smoothing circuit 52 as shown in FIG. 19B.

Next, an operation of this apparatus will be explained.

First, when the position pointer 5 does not exist in vicinity of the sense lines, the closed loop circuit is not constituted and therefore the oscillation does not arise because the first sense line 1e and the second sense line 2e are laid so that a direct electromagnetic coupling is zero.

A next step is to suppose a case that the position pointer 5 is put in the vicinity of the sense lines a shown in FIG. 20A, and moves at a constant height above a surface of the body of the detecting device and in a direction in which the sense lines adjoin, that is, in an x-direction in the Figure. In this case, the electromagnetic coupling arises among the first sense line 1e, the second sense line 2e and the resonant circuit 4 and the position feedback loop is constituted including the amplifier 3. Then, the oscillation starts and the oscillating signal s1 is generated. The oscillating signal s1 is input in the position detecting circuit 305 and is rectified and smoothed therein, and then the position detecting circuit 305 outputs the amplitude information as the position detecting signal S2.

When the position pointer moves in the X-direction of FIGS. 20A and 20B, coupling intensity among the sense lines and the resonant circuit 4 changes depending on a position of the position pointer, the gain of the closed loop circuit changes, and an amplitude of the oscillating signal s1 changes. As FIG. 20A shows, the amplitude becomes maximal when a center of a coil composing the resonant circuit 4 is at X2, a middle of a region where the first sense line 1e and the second sense line 2e cross, and becomes smaller gradually as the center of the coil moves toward portions around X2. A distribution of the amplitude in the x-direction shows a tendency as shown in FIG. 20B.

However, in this case, for the purpose of explaining the principle there are positions at which the amplitudes becomes equal in the right and the left of X2, that is, the regions X1 and X3 in the Figure, and a pointed position can not be specified to be one. However, this will lead to understanding that the amplitude of the oscillating signal sl has the position information.

As explained above, under conditions of a constant height, a constant relation is maintained between the position of the position pointer 5 and the amplitude of the oscillating signal s1, therefore the pointed position is identified from the amplitude information on the oscillating signal sl.

The above explanation referring to FIGS. 20A and 20B is for is on the case that the position pointer 5 moves in a laying direction of the sense lines while the height of the position pointer 6 is maintained constant. However, it will be easily understood that the height can be detected also when the position pointer moves in the direction of the height.

Figure 21A:
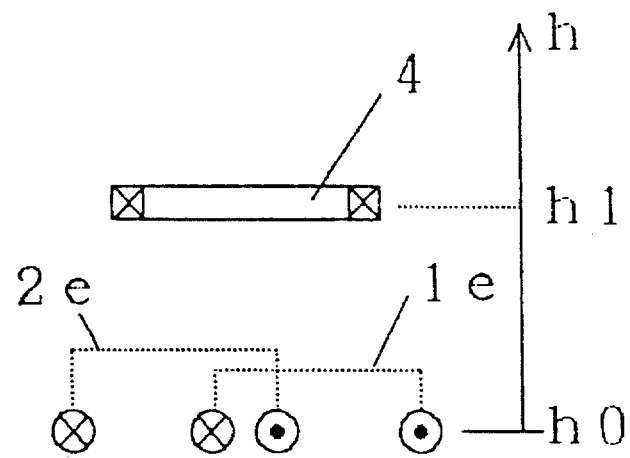
FIGS. 21A and 21B are correspondence explanatory diagrams showing relation between the pointed height and the amplitude of the oscillating signal in the principle construction of FIG. 17.
Figure 21B:
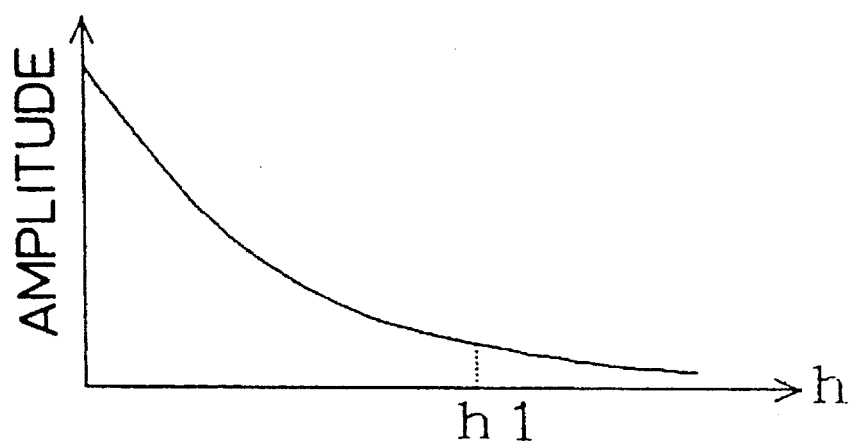

FIGS. 21A and 21B are diagrams showing a change in amplitude of the oscillating signal s1 which is observed when the position pointer 5 moves from a sense line laying surface h0 in a direction of the height h while the resonant circuit 4 is made not to move in the laying direction of the sense lines. As the amplitude changes uniformly depending on changes in the height h, a pointed height can be identified from the amplitude information on the oscillating signal s1 as well as a detection of the position in the laying direction.

There will be explained some constructional variations of the principle construction explained above.

Figure 18:
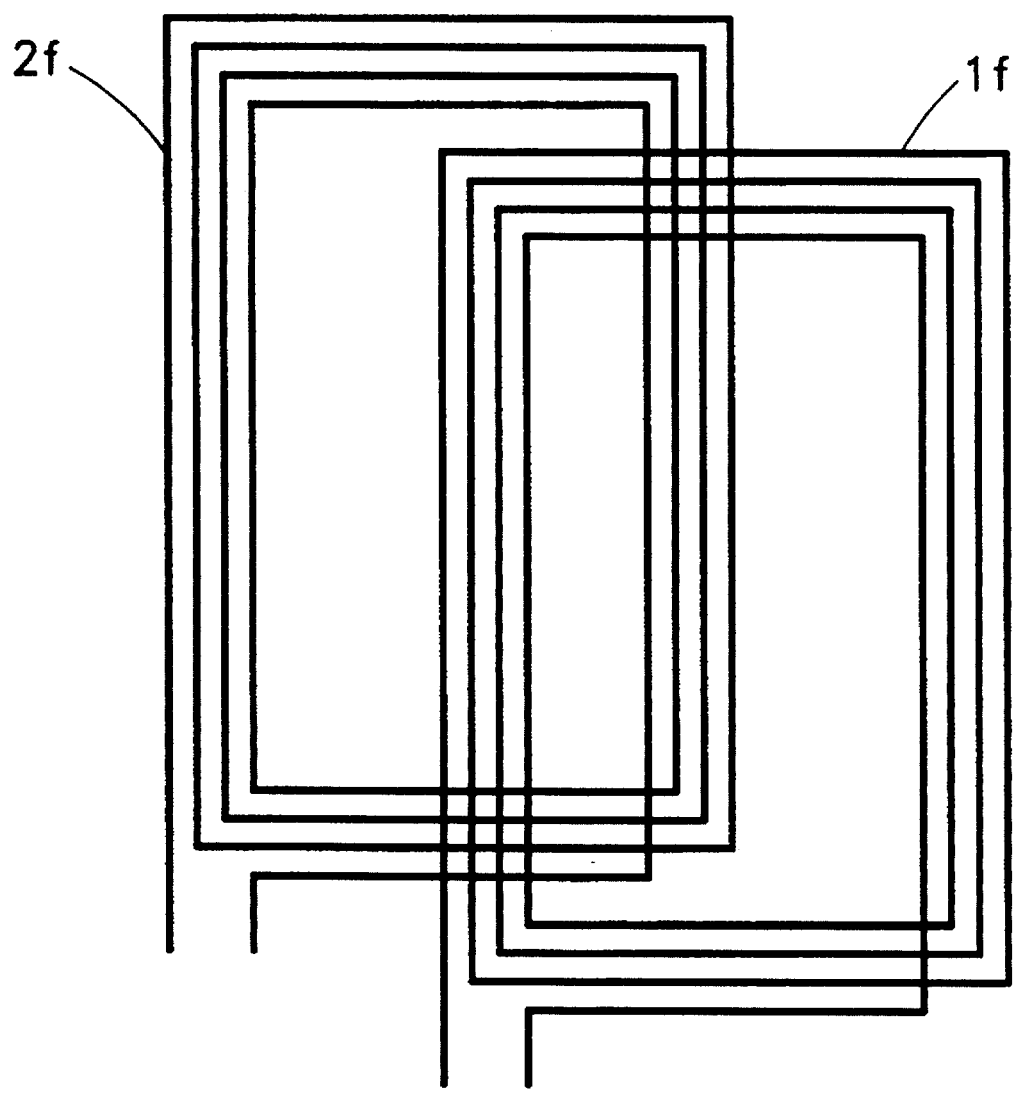
FIG. 18 is an explanatory diagram showing another constructional example of the sense lines in the principle construction of FIG. 17

First of all, though the explanation of FIG. 17 states that the first sense line 1e and the second sense line 2e are single loop lines, it is also possible to use multiple loop lines in order to intensify the electromagnetic coupling. As it will be explained below, using multiple loop lines is more practical for an actual construction as the position reading apparatus. FIG. 18 is a diagram showing the case fourfold loop lines are laid as the first sense line 1f and the second sense line 2f respectively, and in this case the first and the second sense line are also laid so that the electromagnetic coupling between the two sense lines is canceled.

Further, though in FIG. 17 the position detecting circuit 305 is connected to the output of the amplifier 3, it can be connected to other circuits as the need arises because what is required is to input the amplitude information of the oscillating signal s1 into the position detecting circuit 305. For instance, it can be connected to the input of the amplifier 3 also. However, in this case it is necessary to provide an amplifier before the rectifier circuit 51 shown in FIG. 19A because the amplitude of the oscillating signal s1 is small.

Figure 22:
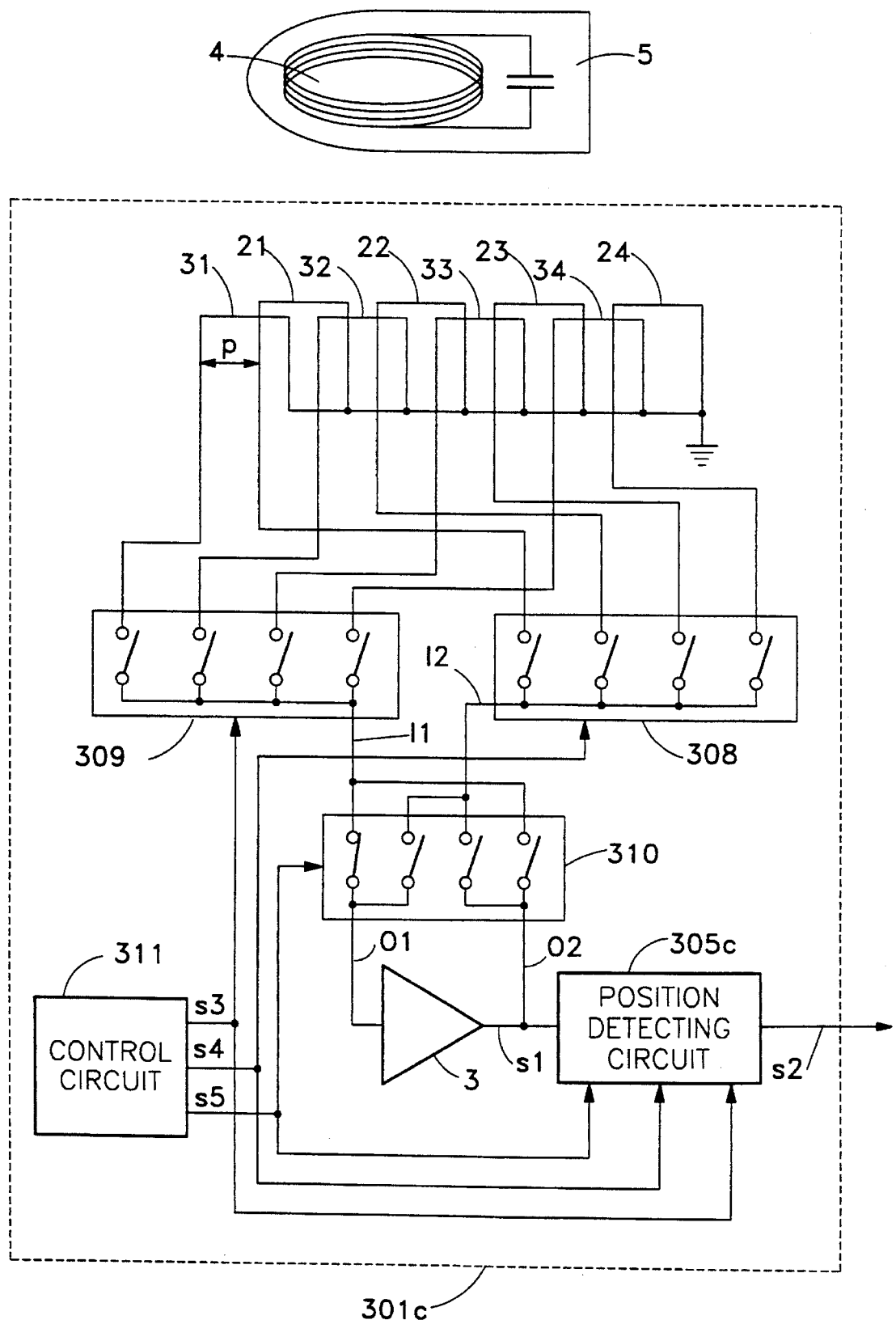
FIG. 22 is a block diagram showing the fifth embodiment of the present invention.

Next, referring to FIGS. 22 to 29A and 29B there will be described a fifth embodiment as an inventive position reading apparatus applying the principle construction. FIG. 22 is a block diagram showing the position reading apparatus according to the fifth embodiment.

in FIG. 22, 21, 22, 23 and 24 compose a first sense line group; and 31, 32, 33 and 34 composes a second sense line group. These sense line groups are laid in sense line pitches p in a position detecting direction. To brief an explanation, the explanation will be given on condition that the position is detected only in one direction (a horizontal direction in the Figure.)

The first sense line group and the second sense line group are laid with a part of loops overlapped as well as in the construction for explaining the principle. For instance, when a sense line 51 is selected as a first sense line and a sense line 31 is selected as a second sense line, electromagnetic coupling between the two sense lines is canceled.

All of one ends of the respective sense lines in both sense line groups are grounded. The other ends of the sense lines in the first sense line group are connected to a first scanning circuit 308, and the other ends of the sense liens in the second sense line group are connected to a second scanning circuit 309.

The first scanning circuit 308 and the second scanning circuit 309 are composed of a plurality of electronic switch devices such as analogue switches respectively, and one ends of the respective switch devices are connected to each other and form common terminal respectively. Actually, an analogue switch IC, CD4051 and so on can be used for this circuit. Each one of the switch devices is closed by selection signals s3 and s4 which are supplied from a control circuit 311 to be mentioned below, and then each one end of the switch devices is connected to the common terminal respectively.

The respective sense lines of the sense line groups are connected to the respective terminals of the first and the second scanning circuit 308 and 309. The common terminals are connected to an excitation/sense switching circuit 310.

For explanation to be given later, functions of these circuits are indicated in Tables 1 and 2 and explained concretely. However, these tables (as well as other tables used hereinafter) show only an example for the explanation, and the functions are not limited to those indicated in these tables. In the tables, only a sign is indicated as a name of each signal.

TABLE 1

Function Table of the First Scanning Circuit 308

| s 3 | Selected Sense Lines |
| --- | --- |
| 0 | 21 |
| 1 | 22 |
| 2 | 23 |
| 3 | 24 |

TABLE 2

Function Table of the Second Scanning Circuit 309

| s 4 | Selected Sense Lines |
| --- | --- |
| 0 | 31 |
| 1 | 32 |
| 2 | 33 |
| 3 | 34 |

The first sense line selection signal s3 and the second sense line selection signal s4 can be expressed, for example, with binary numerical values which appear on a plurality of signal wires. Therefore, by applying the binary numerical values to these signal wires, the sense line corresponding to the binary numerical value can be selected. For instance, if in Table 1, "2" is applied to the signal wires as the first sense line selection signal s3, the sense line 23 is selected.

The excitation/sense switching circuit 310 is basically a switch having two inputs and two outputs. It switches connection between the inputs and the outputs alternately so that the following two states alternate: 1) the first scanning circuit 308 is coupled to an input of an amplifier 3 while the second scanning circuit 309 is coupled to an output of the amplifier 3; and 2) the first scanning circuit 308 is coupled to the output of the amplifier 3 while the second scanning circuit 309 is coupled to the input of the amplifier 3. The circuit shown in FIG. 22 uses an analogue switch IC, CD4052. This IC is composed of two switching circuits having four inputs and one output respectively, and controls the two circuits with the selection signal of one line. In this example, each circuit uses two contacts and the contacts are connected cross, and thereby the above function is realized. Different circuits are used depending on the switching elements used, and this circuit is not a limited one.

Table 3 shows the function of this circuit.

TABLE 3

Function Table of the Excitation/Sense Switch Circuit 310

| s 5 | Input I1 is coupled to: | Input I2 is coupled to: |
| --- | --- | --- |
| 0 | O1 | O2 |
| 1 | O2 | O1 |

In FIG. 22, marks I1 and I2 represent input terminals and marks O1 and O2 represent output terminals. As shown in Table 3, when the excitation/sense switching signal s5 is logic 0, I1 is coupled to O1 and I2 is coupled to O2; further when s5 is logic 1, I1 is coupled to O2 and I2 is coupled to O1.

One of the outputs of the excitation/sense switching circuit 310, O1, is connected to the input of the amplifier 3, and the other output O2 is connected to the output of the amplifier 3.

Figure 23:
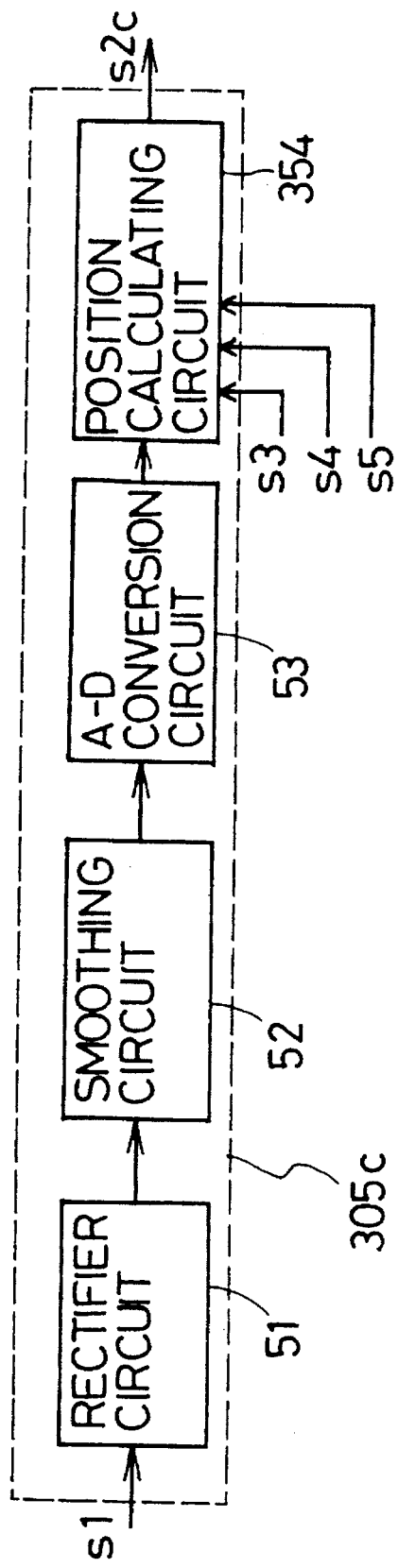
FIG. 23 is a block diagram showing the position detecting circuit disclosed in the fifth embodiment.

A position detecting circuit 305c is constructed as shown in FIG. 23 and has a construction that a position calculating circuit 354 is added to a stage subsequent to the structure for explaining the principle shown in FIG. 19B. The position calculating circuit 354 is inputted with amplitude information on an oscillating signal which is converted into an digital value at an A–D conversion circuit 53 and the selection signals s3 to s5 which are applied to the first and the second scanning circuit 308 and 309 and the excitation/sense switching circuit 310, and calculates a position pointed by a position pointer 5 from the above input.

The control circuit 311 is connected to the first scanning circuit 308, the second scanning circuit 309 and the excitation/sense switching circuit 310 respectively so that the selection signals s3 to s5 are applied to the above three circuits respectively. In this embodiment, the control circuit 311 outputs the first and the second sense line selection signal s3 and s4 so that the two adjacent lines are selected simultaneously. Further, every time the control circuit outputs the signals for selecting the sense lines, the excitation/sense switching signal s5 is inverted and each of the first and the second scanning circuit is coupled to each of the input and the output of the amplifier 3 alternately.

Next, operation will be explained.

The control circuit 311 applies the first sense line selection signal s3 to the first scanning circuit 308, the second sense line selection signal s4 to the second scanning circuit 309, and thereby selects the two adjacent sense lines among the sense line groups. At the same time, the excitation/sense switching signal s5 is applied to the excitation/sense switching circuit 310, and thereby the selected sense lines are coupled to the input and the output of the amplifier 3 respectively.

Referring to FIG. 22, there will be described a concrete example of a selection operation. For instance, the first sense line selection signal s3 and the second sense line selection signal s4 are defined as "logic 1" and at the same time, an excitation/sense switching signal s5 is defined as "logic 1." In this case, the sense lines 22 and 32 are selected according to Tables 1 and 2, and the input and the output of the excitation/sense switching circuit 310 are coupled in a manner of I1–O2 and I2–O1 according to the Table 3. Therefore, the sense line 22 is coupled to the input of the amplifier 3 and the sense line 32 is coupled to the output of the amplifier 3. For explanation to be given below, hereinafter the sense line coupled to the output of the amplifier 3 is referred to as an exciting sense line and the sense line coupled to the input of the amplifier 3 is referred to as an detecting sense line. In this case, 32 is the exciting sense line and 22 is the detecting sense line.

As the explanation of the principle, when the position pointer 5 approaches the selected sense line, a closed loop circuit is constructed with the sense lines, a resonant circuit 4 and the amplifier 3 and thereby oscillation rises. FIGS. 20A and 20B show shows a relationship between a position of the position pointer 5 and an amplitude of the oscillating signal s1 at that time. The amplitude of the oscillating signal s1 includes position information on the position indicated by the position pointer 5. Determining the position by use of this information is a position calculating principle of the inventive position detecting device.

The control circuit 311 selects the sense line as described above. This selecting operation is performed to each of the sense lines which totals a number necessary for calculating the position. Generally, the sense line are selected one by one in order of a position detecting direction or the opposite direction. This selecting operation is called "scanning." The order of scanning is not an essential problem. It is not necessary to scan in order and it is also effective to scan at random. There will be explained a case of scanning in the order of the position detecting direction.

The number of sense lines necessary for position calculation is, for instance, five in this embodiment. A value of the number is determined by considering the sense line pitch p, a diameter of a coil of a resonant circuit 4 and other parameters, and the above "five" does not have an essential meaning. As it will be described later, any number of sense lines is available as far as the number is enough for the position calculation.

Scanning operation will be explained by giving a concrete example. Table 4 is a scanning timing table showing the sense lines selected by scanning and the circuits to which the sense lines are coupled when the five sense lines are sequentially scanned with the sense line 31 as a scanning start sense line.

TABLE 4

Scanning Timing Table

| Scanning Number | s3 | s4 | s5 | Input of the Amplifier 3 is coupled to: | Output of the Amplifier 3 is coupled to: |
| --- | --- | --- | --- | --- | --- |
| 1 | 0 | 0 | 0 | 31 | 21 |
| 2 | 0 | 1 | 1 | 21 | 32 |
| 3 | 1 | 1 | 0 | 32 | 22 |
| 4 | 1 | 2 | 1 | 22 | 33 |
| 5 | 2 | 2 | 0 | 33 | 23 |

As shown in Table 4, the adjacent two sense lines are selected at each scanning, and one of the two sense lines is coupled to the input of the amplifier 3 and the other sense line is coupled to the output of the amplifier 3. This scanning process is performed five times sequentially.

One of the exciting sense lines and one of the detecting sense line are selected by once of selecting operation. As explained above, the oscillating signal sl the amplitude of which changes in size depending on a relationship of positions between the sense lines and the resonant circuit 4 is generated on the closed loop circuit composed of these sense lines, the amplifier 3 and the resonant circuit 4. Therefore, the oscillating signals s1 are inputted into the position detecting circuit 305c sequentially by selecting the sense line sequentially.

Figure 24:
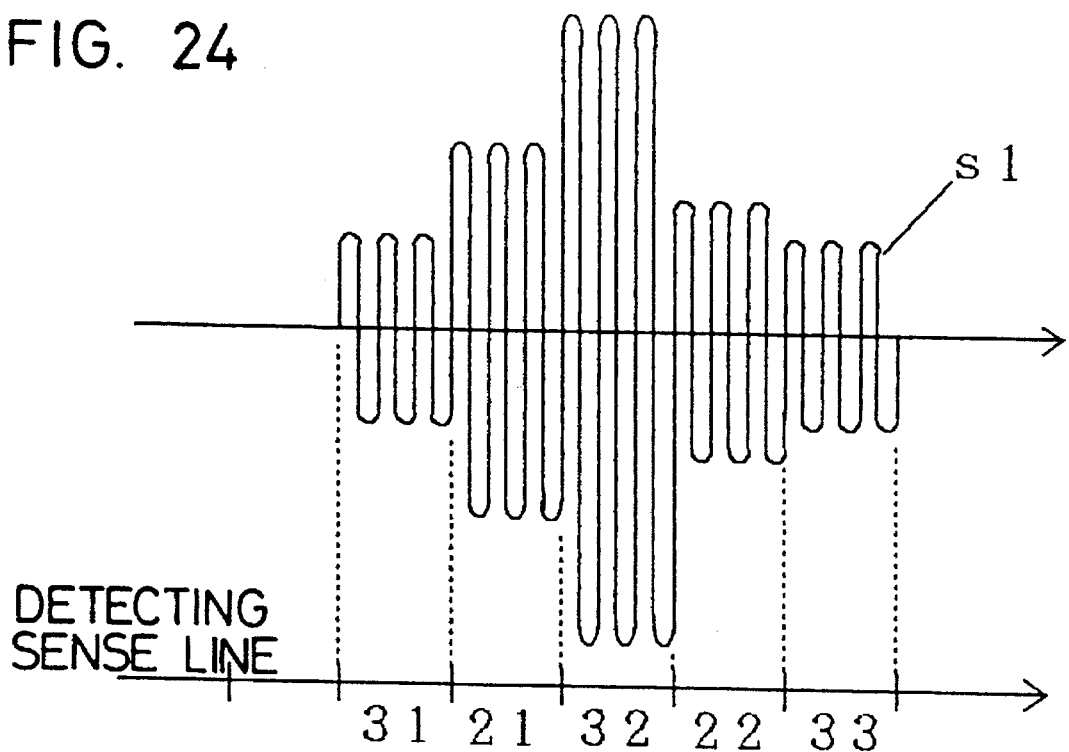
FIG. 24 is an explanatory diagram showing the oscillating signal disclosed in the fifth embodiment.

FIG. 24 shows a waveform of the oscillating signals s1 which are inputted into the position detecting circuit 305c. In the example illustrated, the oscillating signal of the maximum amplitude during the scanning process is generated when the sense line 32 turns into the detecting sense line. This indicates that the resonant circuit 4 exists around the sense line 32.

Figure 25:
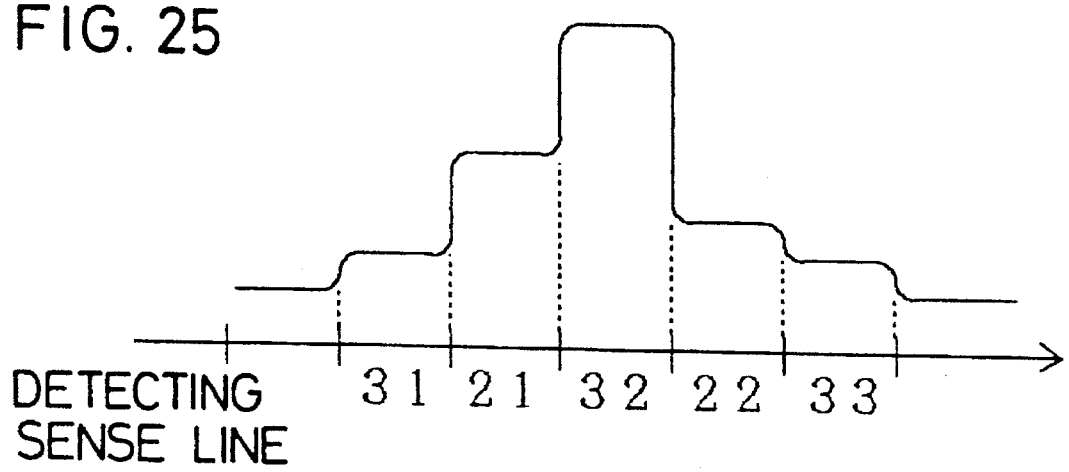
FIG. 25 is an explanatory diagram showing the amplitude of the oscillating signal disclosed in the fifth embodiment.

The oscillating signals s1 shown in FIG. 24 are rectified and smoothed in the position detecting circuit 305c and are converted into envelope signals shown in FIG. 25. Calculating the position from an envelope of an induced signal can be realized with a method disclosed by the conventional position reading apparatus. A method of calculating a position will be briefly explained according to the construction of the embodiment hereinafter.

The position detecting circuit 305c inputs the oscillating signal s1 in itself every time the sense line groups is selected. The oscillating signal s1 is converted into an envelope signal and the envelope signal is converted into a digital value by the A–D conversion circuit 53, and then the digital value is inputted into the position calculating circuit 354. The position calculating circuit 354 is also inputted with the selection signals s3, s4 and s5 which are outputted from the control circuit 311.

The position calculating circuit 354 detects the maximum signal and the two respective signals of the two sense lines on both sides of and adjacent to the sense line from which the maximum signal is generated among the envelope signals inputted sequentially. Each signal is given the following marks:

Vp . . . the maximum signal called a peak signal

Vph . . . the signal of the sense line being laid next to, in the position detecting direction, the sense line from which the maximum signal is outputted Vpl . . . the signal of the sense line being laid next to, in a direction opposite to the position detecting direction, the sense line from which the maximum signal is outputted As to the detecting sense line from which the maximum sense signal is outputted, a sense line number of it is converted into the sense line number based on the scanning start sense line, and is memorized. This sense line number is called a peak address, which is represented as Padrs. The peak address indicates an approximate position where the position pointer is placed. Thereby, the position can be detected by a unit of the sense line pitch.

The further detailed position is obtained by calculating the peak signal and the signals on both sides of the peak signal. In order to calculate these signals, first a value of Q in Expression-1 is found as follows:

$$Q=(Vp-Vph)/(Vp-Vpl) \qquad \text{(Expression 2)},$$

where Vph>Vpl

Figure 26A:
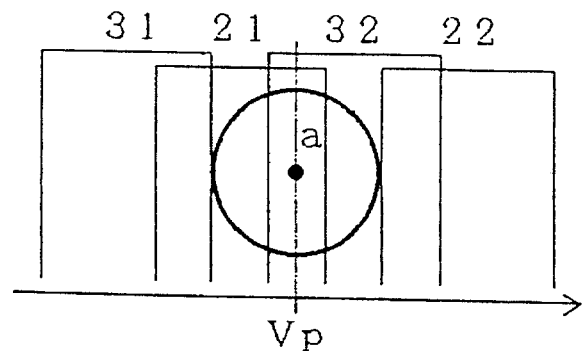
FIGS. 26A and 26B are correspondence explanatory diagrams showing the relation between the pointed position and the amplitude distribution of the oscillating signal disclosed in the fifth embodiment.
Figure 26B:
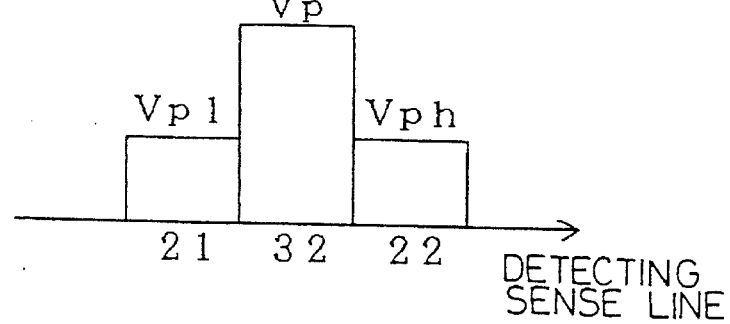

The value of Q has a characteristic mentioned below. A first step is to consider a case that, as shown in FIGS. 26A and 26B, the coil of the resonant circuit 4 is placed at a center of a crossing position of the sense lines 21 and 32, a point "a". When the sense lines 32 and 21 are selected as the exciting sense line and the detecting sense line respectively, the maximum oscillation signal among the scanning process is generated on the closed loop circuit as shown in FIG. 20B, and the peak signal Vp is inputted into the position calculating circuit 354. The position calculating circuit 354 has been already inputted with the first and the second sense line selection signals s3, s4 and the excitation/sense switching signal s5, so that the sense line 21 is identified as the detecting sense line from these signals. Then, the sense line 21 is converted into a number which is based on a reference sense line number 0 for the sense line 31, and the number is memorized as the peak address Padrs. The peak address in this case is Padrs=1.

21 is the exciting sense line and 31 is the detecting sense line at the selecting operation one time before the selecting operation at which the maximum oscillating signal is generated. In this case, the oscillating signal smaller than Vp is generated in the closed loop circuit, and Vpl is inputted into the position calculating circuit 354. On the other hand, at the selecting operation one time after the selecting operation at which the maximum oscillating signal is generated, similarly 22 is the exciting sense line and 32 is the detecting sense line and Vph is generated on the closed loop circuit. When the coil of the resonant circuit 4 is placed on the point "a", effects of electromagnetic coupling are equal between at the selecting operation one time before and at that one time after, and a ratio of the two signals becomes Vph=Vpl. Therefore, Q=1 according to Expression-2.

Figure 27A:
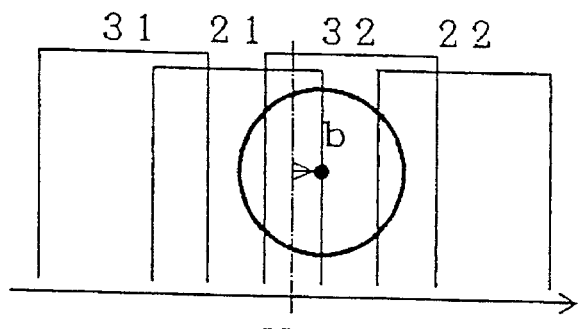
FIGS. 27A and 27B are correspondence explanatory diagrams showing the relation between the pointed position and the amplitude distribution of the oscillating signal disclosed in the fifth embodiment.
Figure 27B:
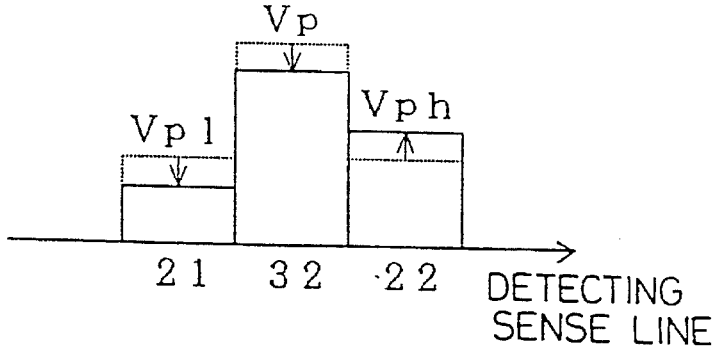

Next, when the coil of the resonant circuit 4 moves in the position detecting direction as shown in FIGS. 27A and 27B among couplings between the sense lines, the coupling between the sense lines 31 and 21 and the coupling between the sense lines 21 and 32 becomes smaller than the above, and contrarily the coupling between the sense lines 32 and 22 becomes larger. As a result, Vp and Vpl become smaller and Vph becomes larger, and Q in Expression-2 takes a value smaller than 1.

Figure 28A:
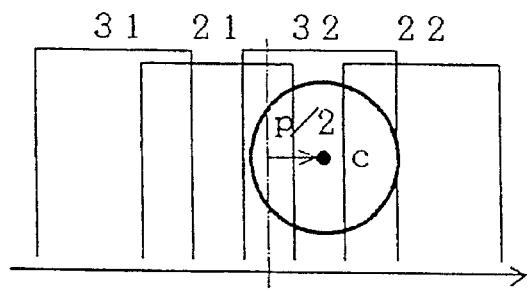
FIGS. 28A and 28B are correspondence explanatory diagrams showing the relation between the pointed position and the amplitude distribution of the oscillating signal disclosed in the fifth embodiment.
Figure 28B:
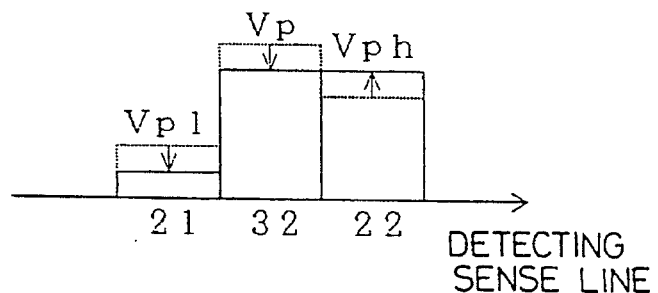

When the coil moves further to a position in FIGS. 28A and 28B, namely, moves a half of the sense line pitch from the position in FIGS. 26A and 26B, the value of Q becomes minimal. In this case, the effects of the coupling 21–32 and the coupling 32–22 becomes equal, Vp=VPh, and Q =0.

When the coil moves left from the position in FIGS. 26A and 26B Q is obtained by Expression-2 in which Vph and Vpl are exchanged. In this case, increases and decreases in Q show the same tendency as the above.

Figure 29A:
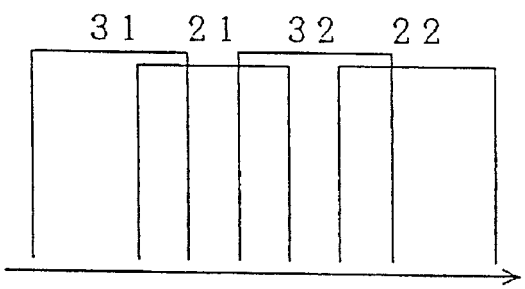
FIGS. 29A and 29B are correspondence explanatory diagrams showing the relation between the pointed position and the value Q in the fifth embodiment.
Figure 29B:
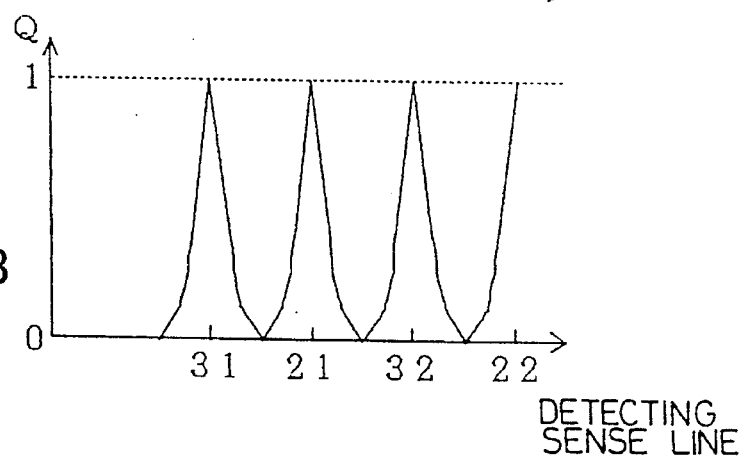

Q is a value which takes a value between 1 and 0 every half sense line pitch as shown in FIGS. 29A and 29B becomes a value corresponding, one by one, to each of the detailed positions between the sense lines. If characteristics of this Q is found by an experiment in advance, the detailed position between the sense lines can be obtained by finding Q from the amplitude of the oscillating signal.

The position pointed by the position pointer 5 can be obtained by performing addition and substraction as the above-mentioned approximate position according to the peak address and the detailed position obtained here. Expressions-3 and 4 are position calculating expressions:

Pointed Position=Padrs×p+f(Q)   (Expression-3), where Vph>VPl
otherwise,

Pointed Position=Padrs×p−f(Q)   (Expression-4), where Vph<Vpl.
Explanation as to the marks will be given below again.
Pards: Peak address
p: sense line pitch
f(Q): detailed position between the sense lines corresponding to Q In such a manner mentioned above, the position pointed by the position pointer is obtained.

As to this embodiment also, there will be added explanation of some constructional variation.

First of all, the structure shown in FIG. 22 is provided with the four first sense lines and the four second sense lines respectively, but the number of the sense lines can be varied arbitrarily depending on a position detecting range when designing the system. In the present invention, the range available for detection is not limited, and this principle can be realized in a vast range of the position reading apparatus from the small apparatus called a tablet to the large apparatus called a digitizer.

Further, though the position detecting direction is only one, a horizontal direction in FIG. 25, which is for simplifying the explanation, practically the system is constructed as a two-dimensional position reading apparatus by arranging sense line groups orthogonally both in X and Y directions. It is easily understood to develop the structure explained here in the two-dimensional position reading apparatus. In this case, some constructional variations can be supposed, for instance, the two amplifiers are provided separately in X and Y directions, or one amplifier is provided to be used in common. However, these variations are not essential subjects of the present invention but are only design items, so that these variations can be selected arbitrarily for design depending when necessary.

The effect of the present invention becomes remarkable when the present invention is constructed as the two-dimensional position reading apparatus. In the position reading apparatus according to this embodiment, the sense lines are scanned individually in each position detecting direction. In order to detect the position of the X—Y two-dimensions, it is necessary to scan only ten times in total, five times in the X-direction and five times in the Y-direction. In the conventional position reading apparatus, it is necessary to scan as many as twenty-five times in total, that is, five time five (5×5) in matrix. The present invention enables decreasing a number of times to scan substantially and accelerating the position calculation.

Further, a relation between the two sense lines selected at one time of scanning is equivalent at any point in a detecting area, and the electromagnetic coupling between the two sense lines is canceled. In the conventional position reading apparatus, the electromagnetic coupling arises directly between the two sense lines selected near a periphery of a detecting device. However, in the present invention, as such direct coupling does not arise, there is no defect that accuracy of position detecting deteriorates.

Figure 30:
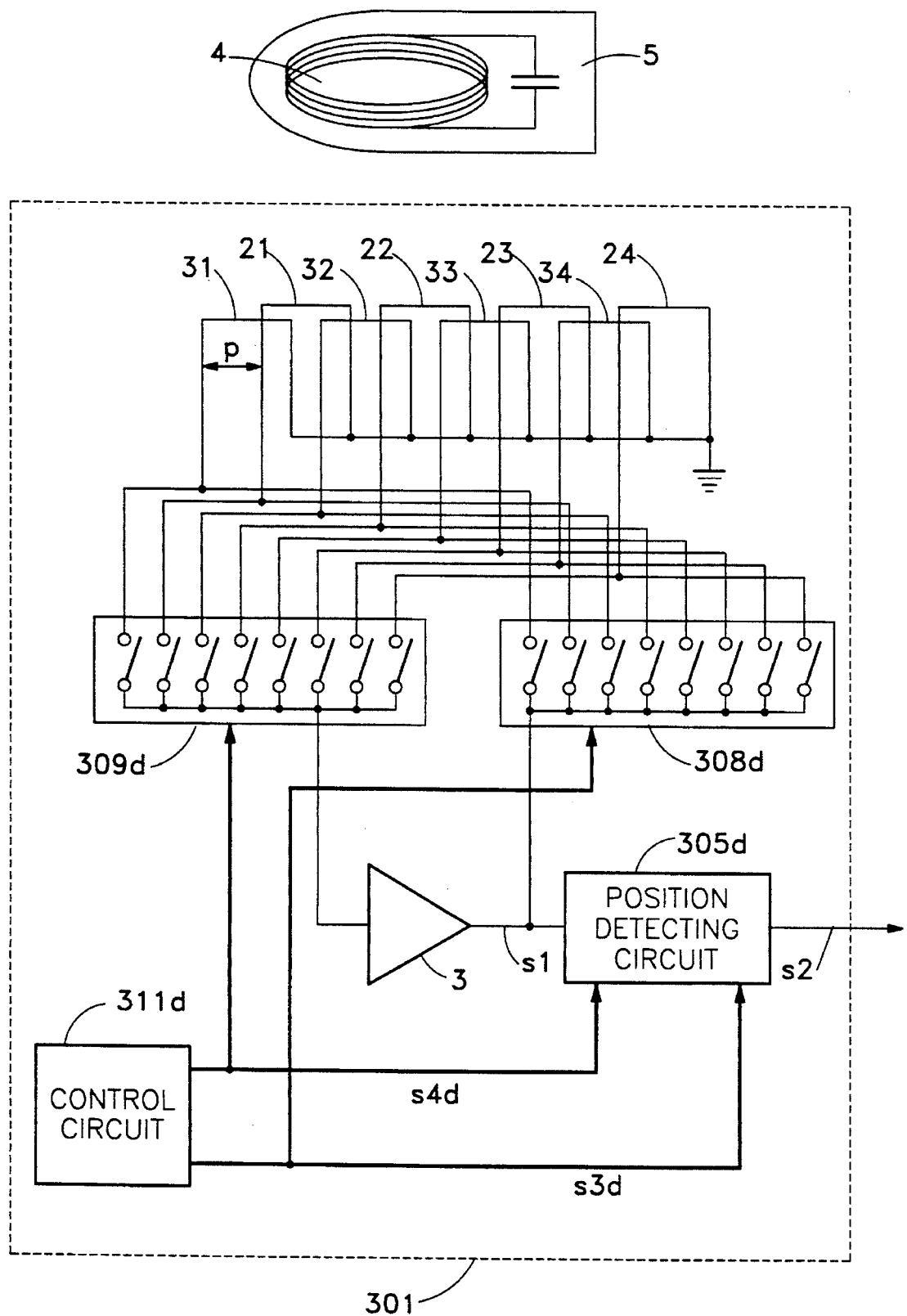
FIG. 30 is a block diagram showing the sixth embodiment of the present invention.

Next, a sixth embodiment of the present invention is explained referring to FIG. 30. FIG. 30 is a block diagram showing a position reading apparatus according to the sixth embodiment.

This embodiment is different from the fifth embodiment in a first scanning circuit 308d, a second scanning circuit 309d, and coupling between a sense line group and these circuits. The sense line group is not divided into two groups as it is in the fifth embodiment. The excitation/sense switching circuit 310 disclosed in the fifth embodiment is not provided. A position detecting circuit 305d and a control circuit 311d are also partially different from those in the fifth embodiment. Other parts of this embodiment is the same as those of the fifth embodiment.

The first scanning circuit 308d and the second scanning circuit 309d are electronic switching devices similar to those of the fifth embodiment and include more circuits. Respective sense lines are connected both to the first and the second scanning circuit 308d, 309d in parallel.

The control circuit 311d is connected to the first and the second scanning circuits 308d, 309d so as to apply a first sense line selection signal s3d to the first scanning circuit 308d and apply a second sense line selection signal s4d to the second scanning circuit 309d.

The position detecting circuits 305d is connected so as to be inputted with an oscillating signal s1 and also the first and the second sense line selection signal s3d, s4d.

Next, there will be described operation of this embodiment.

The control circuit 311d applies the first and the second sense line selection signal s3d, s4d to the first and the second scanning circuit 308d, 309d respectively, and scans the sense lines. The scanning is performed as well as in the fifth embodiment by selecting the two sense lines adjacent and coupling one sense line to an input of an amplifier 3 and the other sense line to an output of the amplifier 3. Table 5 is a timing table showing a timing of scanning in this embodiment. Like Table 4 in the fifth embodiments, this table also shows the timing of scanning the five sense lines sequentially with the sense line 31 as a scanning start sense line.

TABLE 5

Scanning Timing Table

| Scanning Number | s3d | s4d | Input of the Amplifier 3 is coupled to: | Output of the Amplifier 3 is coupled to: |
|---|---|---|---|---|
| 1 | 1 | 0 | 31 | 21 |
| 2 | 2 | 1 | 21 | 32 |
| 3 | 3 | 2 | 32 | 22 |
| 4 | 4 | 3 | 22 | 33 |
| 5 | 5 | 4 | 33 | 23 |

When the position pointer 5 is placed near the sense line group and the sense lines are scanned in accordance with Table 5, the oscillating signal s1 according to a position pointed by the position pointer 5 is generated as well as in the fifth embodiment. Hereafter, the position pointed by the position pointer can be calculated from the amplitude information on the oscillating signal s1 as well as in the fifth embodiment.

Though this embodiment also has constructional variations like the fifth embodiment, explanation of it is omitted as it is redundant.

Next, referring to FIGS. 31 and 32 there will be described a seventh embodiment of the present invention. This embodiment is related to an apparatus that a status setting means is provided in a position pointer and a state of the position pointer is detected by a body of a detecting device. The status setting means is, for example, a push-button switch. By pushing the switch, instructions for position input are given and command information is outputted to an external device.

Figure 32:
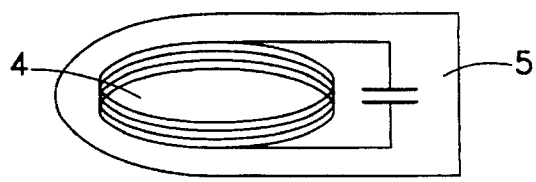
FIG. 32 is a block diagram showing the status detecting circuit disclosed in the seventh embodiment.

FIGS. 31 and 32 are block diagrams showing a position reading apparatus according to the seventh embodiment. This embodiment is similar to one for explaining the principle of the improved construction.

As shown in FIG. 31, a resonant circuit 4 is connected to a switching circuit 313 in parallel in a position pointer 5e. In this embodiment, the switching circuit 313 is a series circuit composed of a switch and a capacitor, and a resonant frequency of the resonant circuit 4 changes by closing the switch. Though this embodiment is provided with only one switching circuit 313, it is also possible that a plurality of switching circuits are provided and a different resonance frequency is determined by closing each of the switching circuits. A feature of the present invention is a capability of providing a number of the switching circuits, but it will be described later.

On the other hand, a body of a detecting device 1e is newly provided with a status detecting circuit 312, which is connected to an output of an amplifier 3. The status detecting circuit 312 is constructed as shown in FIG. 32, and is composed of a waveform shaping circuit 351, a frequency counter 322 and a frequency discriminating circuit 353. The waveform shaping circuit 321 converts oscillating signals s1 which are sinwave signals into a rectangular wave so that the frequency counter can count them. The frequency counter counts the oscillating signals which are converted into the rectangular wave. The frequency discriminating circuit 323 is a circuit for comparing a count value with a reference value memorized and discriminating a status of the switch circuit.

Next, operation of this embodiment will be explained.

The position pointer 5e resonates at a frequency f1 when the switching circuit 313 is open, and at a frequency f2 when the switching circuit 313 is closed.

If the position pointer 5e approaches to a sense line while the switch is open, a closed loop circuit is constructed and starts to oscillate at the frequency f1. The oscillating signals s1 are inputted into the status detecting circuit 312, and at first are converted into the rectangular wave by the waveform shaping circuit 321 and then counted by the frequency counter 322.

As the frequency discriminating circuit 323 memorizes a reference value used for discriminating between the frequencies f1 and f2, the circuit compares the reference value and the frequency count value to be inputted, and thereby recognizes whether the switch is open or closed. In this case, the switch is recognized to be open. When the switch is closed, the signal is processed in a similar manner.

Processing performed in this embodiment is only to detect the frequency of the oscillating signal which changes according to a status of the switch in the position pointer and to discriminate the frequency by comparing it with the reference value. Therefore, even if the position pointer 5e is provided with a number of the switching circuits, the status detecting circuit 312 can easily discriminate the status of the switching circuits if each of the switching circuits has a different resonance frequency. The conventional position reading apparatus requires a highly accurate discriminating circuit, because a frequency of a resonant circuit is slightly shifted by operating a switch and the slight shift is discriminated. On the other hand, the discriminating circuit does not require such high accuracy in this embodiment, because this embodiment can be constructed so that the frequency changes comparably by a large extent.

In this embodiment, the construction with the frequency counter is given as an example of the construction of the status detecting circuit 312. However, various circuits other than the above circuit can be thought out if it is understandable to use frequency information on the oscillating signal. For instance, to measure a period of the oscillating signal, or to discriminate the frequency after converting the frequency information into voltage information by a f/V converter.

In this embodiment, the status setting means is explained by taking the circuit with the switch for instance, but there can be other various constructions. For instance, a construction that a pressure detecting device is used instead of the switch and a frequency is continuously changed by pressing pressure. Further, not only a construction with a mechanical switch but also various status setting means can be thought out, for example, a construction with a electronic switch which is controlled by touching the position pointer, and a construction that a frequency is continuously changed according to a position to be touched.

Moreover, this embodiment is constructed by applying the status setting means and the status detecting circuit to an explanatory diagram of the principle construction. However, it is also obvious that these means can be applied also to the fifth and sixth embodiment. In this case, the frequency of the oscillating signal is detecting while scanning, and because the frequency does not change depending on scanning condition, the frequency can be detected by determining a proper timing. Actually, it is advantageous in an aspect of S/N to detect the frequency of a peak signal.

Next, there will be described a eighth embodiment referring to FIGS. 33 and 34. First, a construction will be explained.

Figure 33:
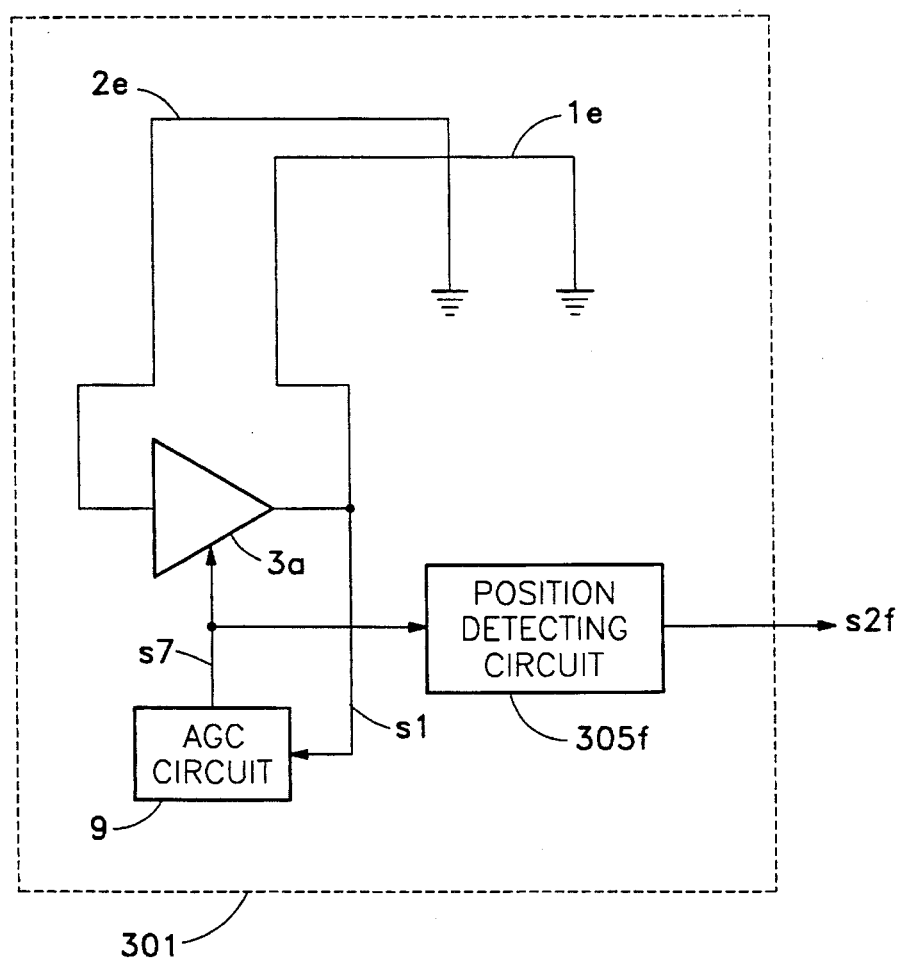
FIG. 33 is a block diagram showing the eighth embodiment of the present invention.
Figure 34:
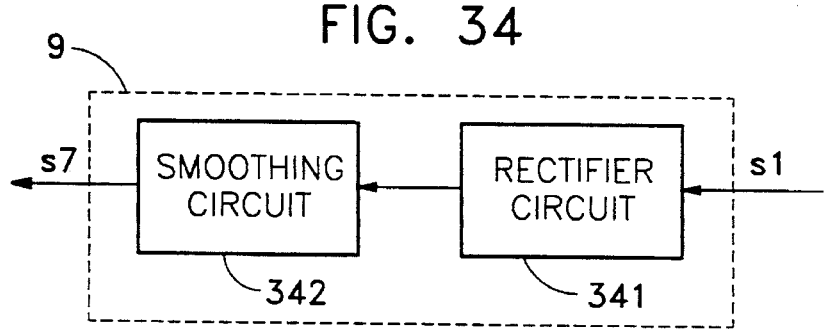
FIG. 34 is a block diagram showing the AGC circuit of the eighth embodiment.
Figure 35:
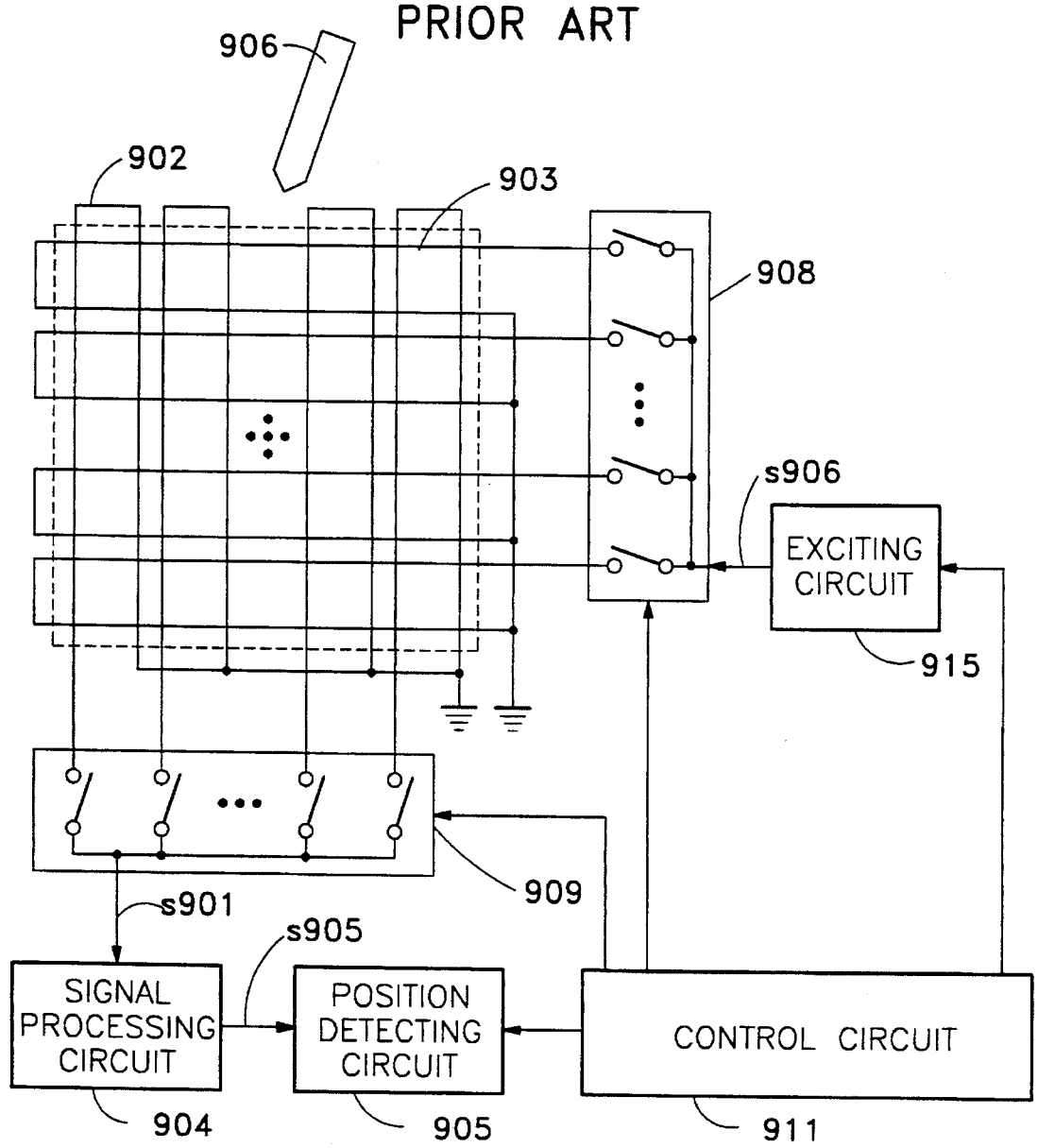
FIG. 35 is a block diagram showing the conventional position reading apparatus.
Figure 36A:
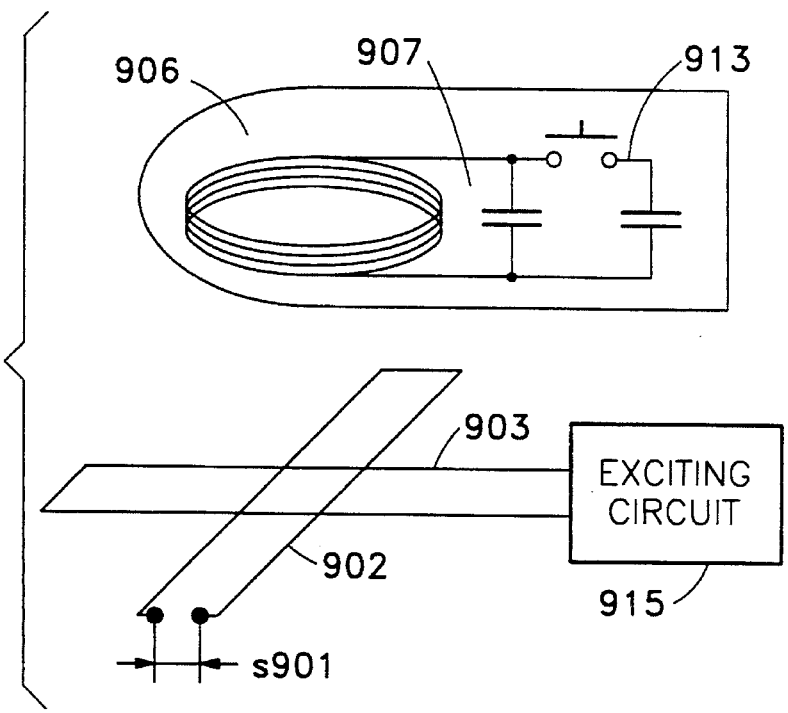
FIGS. 36A and 36B are explanatory diagrams showing the status detection by the conventional position reading apparatus.
Figure 36B:
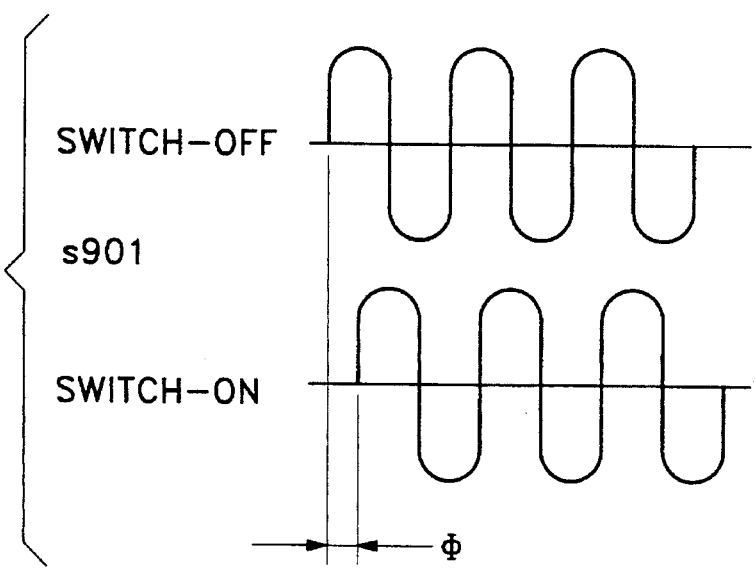
Figure 37:
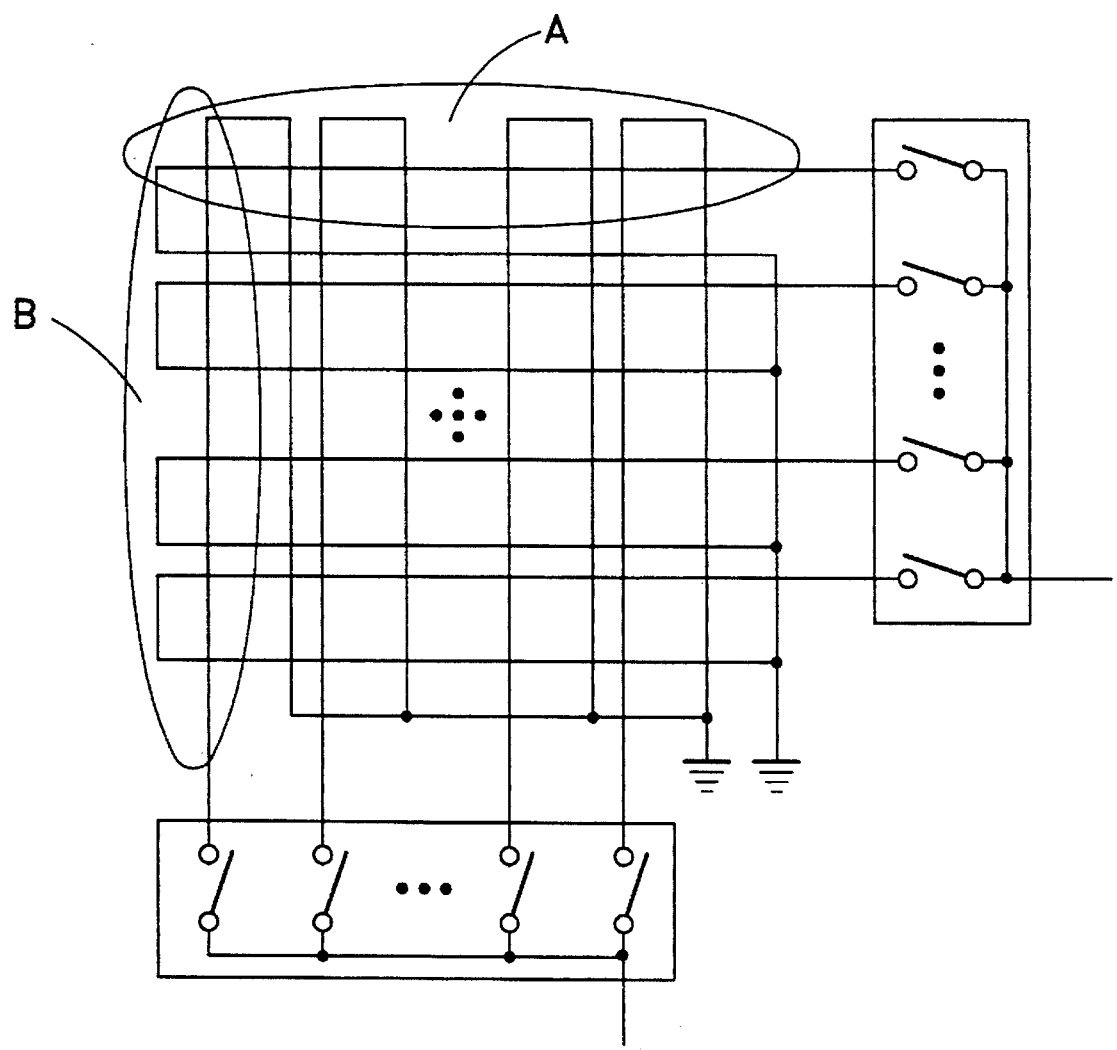
FIG. 37 is an explanatory diagrams indicating the problem of the conventional position reading apparatus.

As shown in FIG. 33, an amplifier 3a is newly provided with an AGC circuit 9. The AGC circuit 9 is inputted with an oscillating signal s1 and controls a gain of the amplifier 3a according to the signal. The amplifier 3a is designed so as to output a gain control signal s7 to the amplifier 3a and to control an amplitude of the oscillating signal s1 so that it is constant at an output of the amplifier 3 all the time.

The amplifier 3a used in this embodiment is an amplifier with a variable gain and is designed so that the gain changes depending on the gain control signal s7. Various designs can be drafted for these circuits depending on what circuit is applied as the amplifier 3a and what signal is outputted as the gain control signal s7. In this embodiment, a voltage-controlled amplifier (VCA) is adopted as the amplifier 3a, and the gain is controlled with the gain control signal s7 which is d.c. voltage. Further, characteristics of the control is predetermined so that the gain becomes high when the gain control signal s7 is small and the gain becomes low when the gain control signal s7 large. For that purpose, the AGC circuit 9, which is constructed as shown in FIG. 34, rectifies and smooths the oscillating signal s1 at the rectifier circuit 341 and the smoothing circuit 342, and thereby outputs d.c. voltage according to the amplitude of the oscillating signal.

Next, there will be explained operation of the apparatus.

As shown in FIG. 20 used for explaining the principle, the amplitude of the oscillating signal s1 has a feature that it changes depending on a positional relationship between sense lines 1e, 2e and a resonant circuit 4. When the resonant circuit 4 is placed in a center of a cross portion of the sense lines 1e and 2e, the amplitude of the oscillating signal s1 becomes maximal; and as the resonant circuit 4 moves toward a periphery of the cross portion, the amplitude becomes smaller. The amplitude of the oscillating signal s1 changes in a way mentioned above in an absense of the AGC circuit 9.

In this embodiment, the AGC circuit 9 and the amplifier 3a function in order that fluctuation of the amplitude is made smaller at the output of the amplifier 3a.

When the resonant circuit 4 is placed on the center of the cross porition of the sense lines 1e and 2e and thereby electromagnetic coupling is intensified, a feedback amount from the output to an input of the amplifier 3a increases and the amplitude of the oscillating signal s1 also tends to increase. However, the AGC circuit 9 applies the gain control signal s7 to the amplifier 3a so as to cancel the increase in the amplitude.

On the other hand, when the resonant circuit 4 moves to the periphery of the cross portion of the sense lines 1e and 2e and thereby the electromagnetic coupling is weakened, the feedback amount from the output to the input of the amplifier 3a discreases and the amplitude of the oscillating signal s1 also tends to decrease. However, the AGC circuit 9 applies the gain control signal s7 to the amplifier 3a so as to cancel the decrease in the amplitude.

Because a magnitude of the gain control signal s7 changes depending on a position of the resonant circuit 4, a position detecting circuit 305f can detect a pointed position from the gain control signal s7. The gain control signal s7 is a signal which has been already converted into d.c. voltage, the position detecting circuit 305f in this embodiment does not require a rectifier and a smoothing circuit like the embodiment for explaining the principle. Therefore, it is possible to output the gain control signal s7 as it is as a position detecting signal s2f for the most simple construction of the position detecting circuit 305f.

As to this embodiment also, some constructional variations are developed.

First, the construction for controlling the gain is not limited the above construction. One of circuits having the same function as that of the voltage-controlled amplifier is a current-controlled amplifier. It is evident that this circuit can also realize the gain control.

Further, a requirement for an AGC characteristic is only that the gain of a closed loop circuit should be controlled as well as in this embodiment. Therefore, it is possible to design an input-output characteristic of the AGC circuit and a control signal-gain characteristic of the amplifier depending on purposes without restrictions. There can be more variations for other details.

It is evident that the AGC circuit explained in this embodiment can be realized in the systems according to the fifth to seventh embodiments.

Next, there will be described an embodiment of the inventive key board apparatus applying the basic construction of the present invention referring to FIG. 38.

Figure 38:
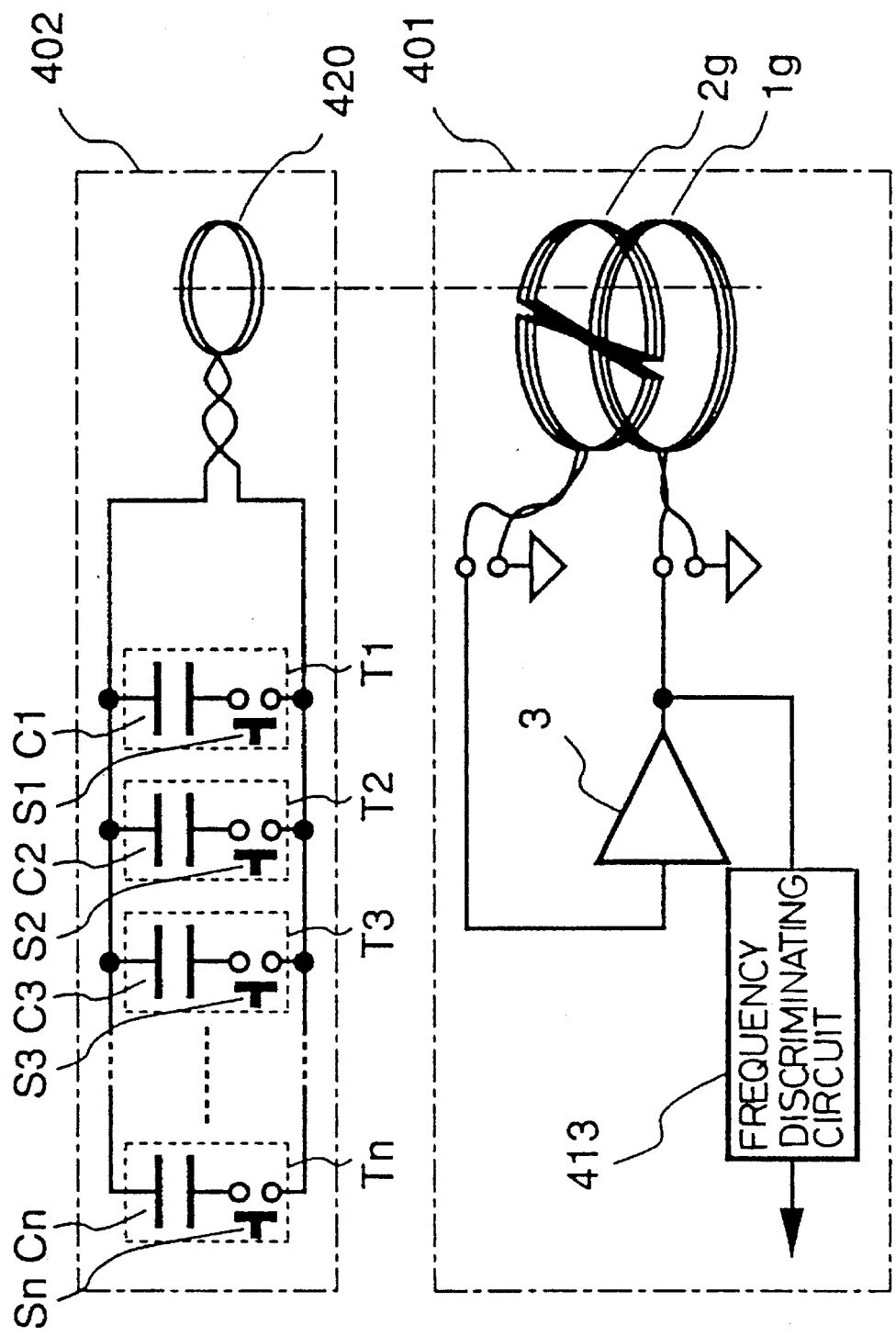
FIG. 38 is a block diagram of the key board apparatus disclosed by the embodiment of the present invention.

FIG. 38 is a block diagram showing a key board apparatus of the present invention. In FIG. 38, 401 is a key board detecting device, and is provided with an amplifier 3, a first coil 1g, a second coil 2g and a frequency discriminating circuit 413. 402 is a key board, and is provided with series circuits, T1 to Tn, which are composed of switches S1 to Sn and capacitors C1 to Cn respectively, and a third coil 420. Each of the series circuits T1 to Tn and the third coil 420 are coupled in parallel, and form the parallel resonant circuit of LC by closing any of the switches S1 to Sn respectively.

The first coil 1g and the second coil 2g have intensive electromagnetic coupling only when any of the switches S1 to Sn is closed and the parallel resonant circuit is constructed; when the switches S1 to Sn are not closed, they are not electromagnetically coupled or the coupling is extremely weak even if they are coupled. The first coil 1g and the second coil 2g shown in FIG. 38 are circular coils. And the second coil 2g is twisted at its diameter and the two coils are piled. In this case, even if some current flows through the first coil 1g and therefrom a magnetic field arises, two opposite magnetic fluxes are generated, which cross the second coil 2g at both sides of the diameter (right and left hands in the FIG. 38) and cancel each other because the second coil 2g is twisted at the diameter; therefore the first coil 1g and the second coil 2g are not directly coupled.

Next, operation of this embodiment will be explained. When the switches S1 to Sn of the key board 402 are not closed, the first coil 1g and the second coil 2g are not magnetically coupled to each other as mentioned above, and between the input and the output of the amplifier 3 a feedback is not formed and an oscillation does not arise, either. However, when any of the switches S1 to Sn is closed and the parallel resonant circuit is constructed, the first coil 1g and the second coil 2g, and a resonant circuit including the third coil 420 are electromagnetically coupled to each other respectively. Then, a positive feedback loop is constructed, which includes, as elements of a route, an output of the amplifier 3, the first coil 1g, the parallel resonant circuit including the third coil. 420, the second coil 2g, and an input of the amplifier 3, and thereby the oscillation at a resonant frequency of the parallel resonant circuit is generated.

As a condition of the oscillation, a sufficient gain of the amplifier 3 and a suitable phase condition are necessary. In this embodiment, the first coil 1g and the second coil 2g are provided so that in-phase signals are generated at the input and the output of the amplifier 3 when the third coil 420 is placed above and on the right of the second coil 2g, as shown in FIG. 38. Further, the oscillation is excited by noise made by the amplifier 3 or nature noise, which is a well known phenomenon in this type of oscillation action. When the resonance frequency of the resonant circuit is changed by one of the switches S1 to Sn, an oscillating frequency also changes according to the change similarly. Thereby, the frequency discriminating circuit 413 can detect frequency information on the oscillation frequency from an output signal of the amplifier 3 and detect the pushed switch, and then outputs switch information which is added with proper processings.

Though the frequency discriminating circuit 413 detects the frequency information from the output signal of the amplifier 3 in the above embodiment, it is also possible to detect it from an input signal of the amplifier 3. In this case, as the input signal of the amplifier 3 is a minute signal, it is necessary that the frequency discriminating circuit 413 has a function of amplifying a voltage to a predetermined voltage available for frequency detection as a preliminary processing.

Figure 39:
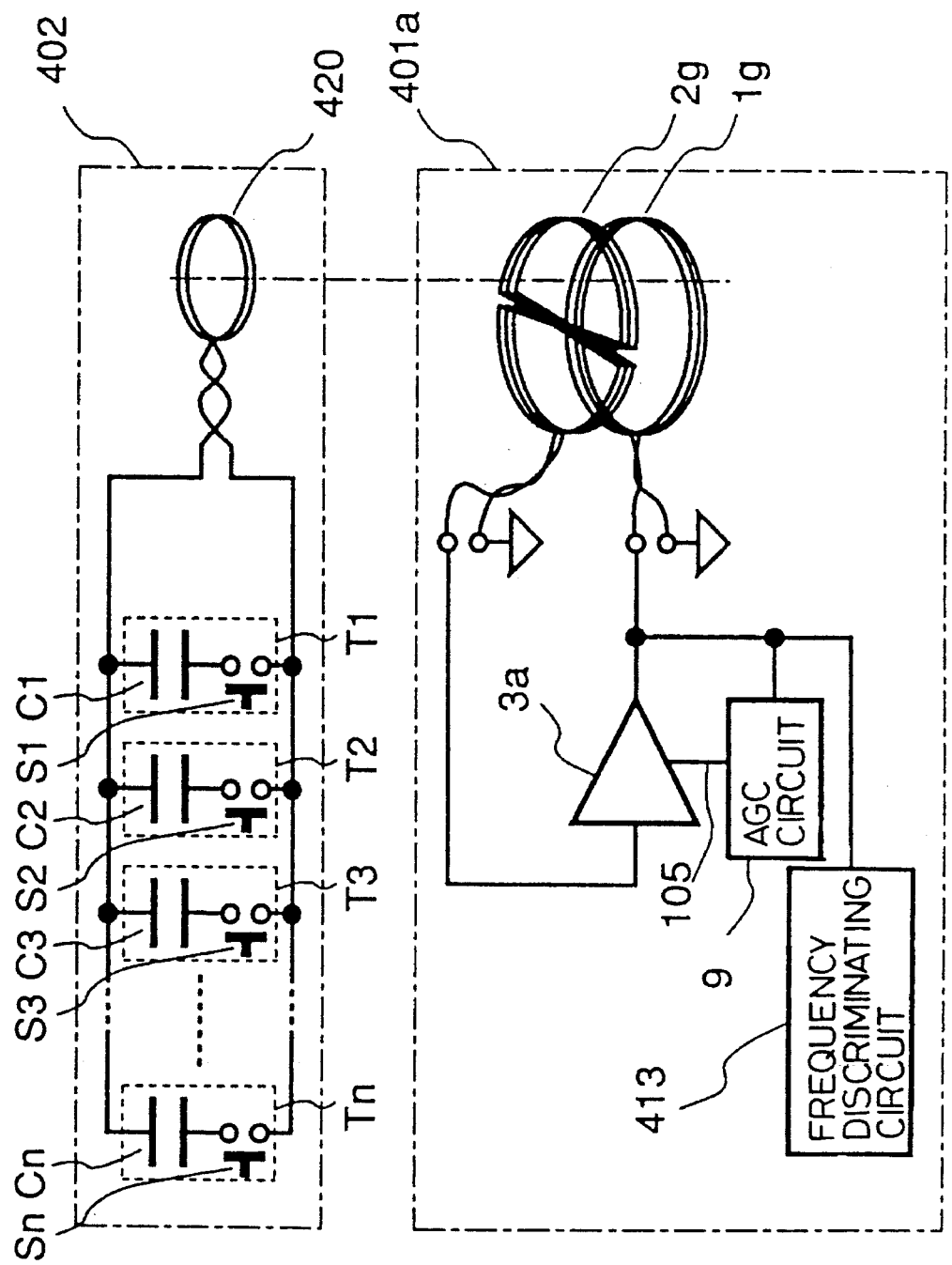
FIG. 39 is a block diagram of the second embodiment of the inventive key board apparatus.

Next, there will be described a second embodiment of the inventive key board apparatus referring to FIG. 39. In FIG. 39, elements with the same marks as those in FIG. 38 show the same elements with the corresponding marks in FIG. 38. 9 is an AGC circuit, which generates a control signal 105 from an output signal of the amplifier 3a, controls a gain of the amplifier 3a and obtains a constant output signal from the amplifier 3a. This type of AGC circuit is a well-known technology. Other construction are the same as those of the above embodiment shown in FIG. 38, and operations are also the same as the above embodiment. Because this embodiment is provided with the AGC circuit 9, a stable oscillating operation is available in a wider range of frequency compared with the above embodiment. Therefore, more switches can be detected. The number of switches which can be detected depends on a range of the oscillating frequency and a resolution of the frequency discriminating circuit 413. For instance, if the amplifier 3a is constructed by using TL026 of Texas Instruments as an amplifier, it is possible to obtain the oscillating frequency range from 100 kHz to 1 MHz by changing the resonance frequency of the resonant circuit in the key board 402. For instance, in order to detect twenty kinds of switches, a frequency range from 200 kHz to 500 kHz is divided into twenty portions, the divided frequency ranges are allocated respectively to the resonance frequencies of the resonant circuit in the key board 402 which are obtained when the respective switches are closed, and the frequency discriminating circuit 413 detects the frequency.

Figure 40:
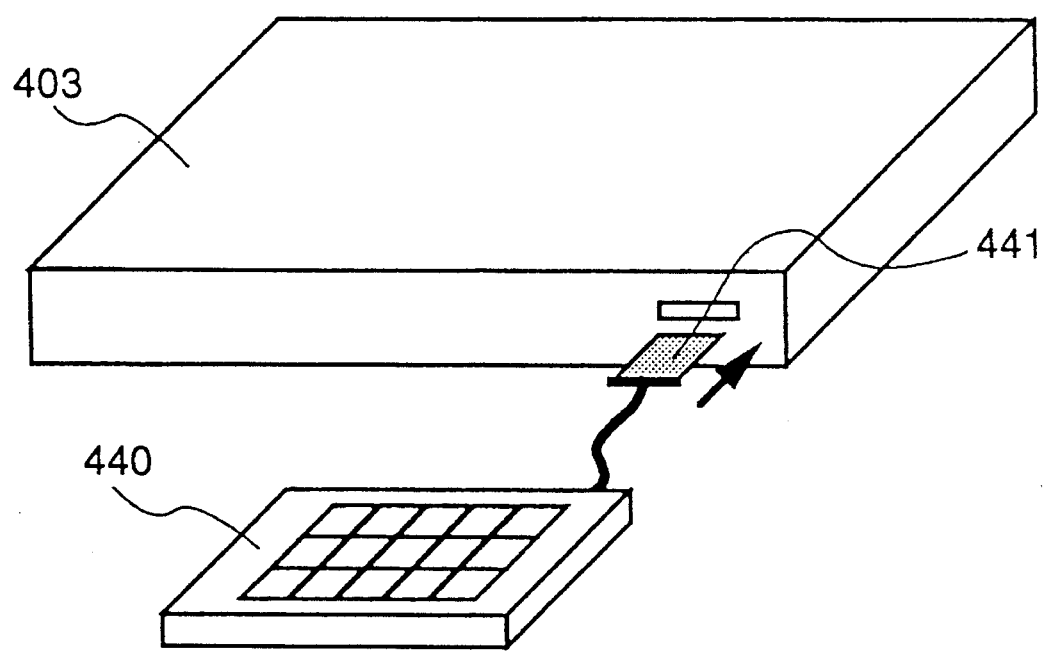
FIG. 40 is a perspective view showing the condition of the connection between the key board apparatus and the host system according to the present invention.
Figure 41:
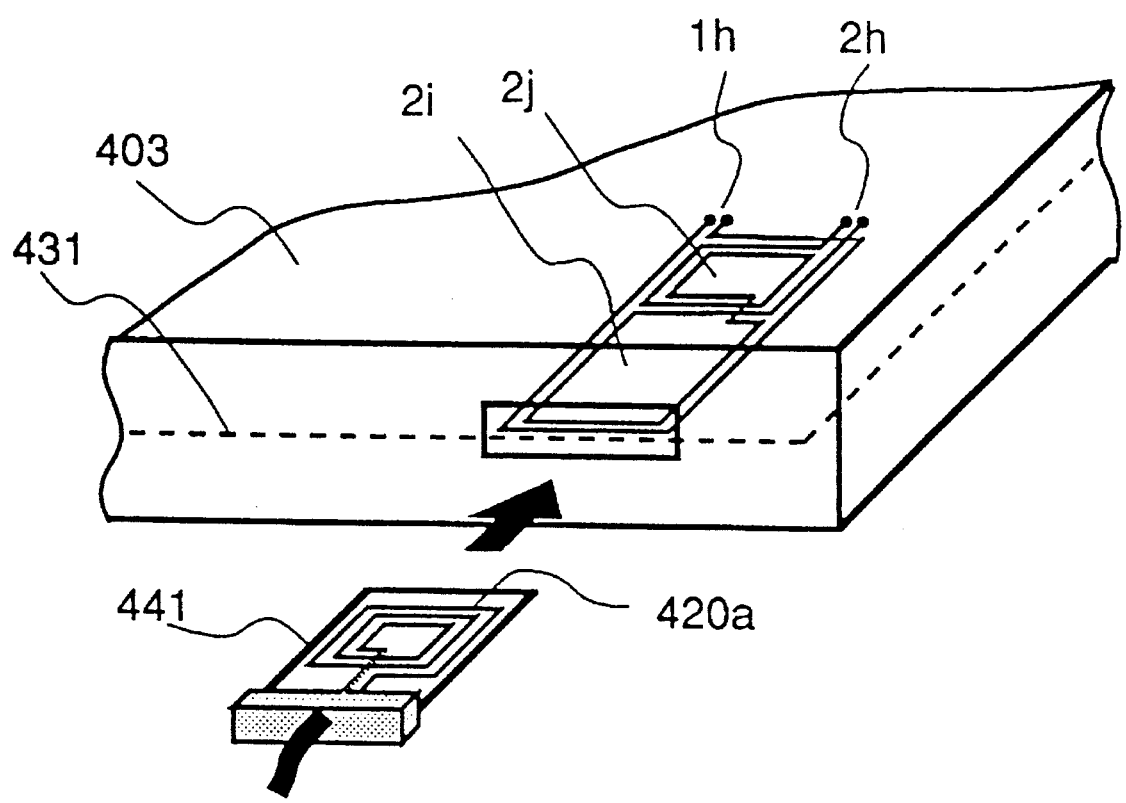
FIG. 41 is an explanatory diagram showing the connection between the key board apparatus and the host system according to the present invention.

Next, there will be described an embodiment in which the key board apparatus is connected to a host system referring to FIGS. 40 to 41. FIG. 40 is a perspective view showing a condition of the connection between the key board apparatus and the host system. In this Figure, 403 is the host system which includes a key board detecting device though it is not shown in the Figure. 440 is a key board of the key board apparatus, and a third coil is provided in a connection device 441. An example of the host system 403 is a system in which a CPU board and a display are integrated, called as a note computer, a book computer and so on. This embodiment is constructed so that a first coil and a second coil in the key board detecting device provided in the host system and a resonant circuit including a third coil of the key board are electromagnetically couple when the connection device 441 is plugged into the host system 403. FIG. 41 is an explanatory diagram showing the connection device connecting the key board apparatus and the host system, which explains the FIG. 40 in more detail. 420a is the third coil provided in the connection device 441 of the key board, and is connected in parallel to series circuits composed of a plurality of switches and capacitors as disclosed in the above embodiment. 431 is a substrate included in the host system. The first coil 1h and the second coil 2h placed inside the first coil are provided on the substrate 431 in patterns. These coils are connected to an input and an output of the amplifier respectively though they are not shown in the Figure.

The second coil 2h is composed of a coil portion 2i with one turn and a coil portion 2j with two turns. The two coil portions 2i and 2j are coiled in opposite directions and are laid so that the coil portion 2i is approximately twice as large in area as the coil portion 2j. Therefore, the first coil lh and the second coil 2h are not directly coupled. Coiling directions are predetermined so that an oscillation starts when the coil portion 2i of the second coil 2h is coupled to the third coil 420a. The oscillation is generated at a predetermined frequency, when the connection device 441 is plugged into the host system 403 and the third coil 420a is over the coil portion 2i of the second coil 2h, and thereby the switch of the key board is closed. Therefore, the connection device 441 can be made to be thinner and it is also possible to connect the key board and the key board detecting device with a small space on the key board detecting device.

In the above embodiments, a small opening is provided in the host system and the connection device is plugged into the opening. However, it is obvious from a principle of electromagnetic induction coupling disclosed by the present invention that it is possible to guide the connection device, for instance, to a bottom surface or a side of the host system and thereby couple the connection device to the coil of the key board detecting device without providing an opening. Further, a shape of the first, the second and the third coil is not limited to a circle and a rectangle mentioned above but other shapes are also available. Especially, as to the first and the second coil, there can be various deformed shapes which do not lead to coupling between the two coils, and it is needless to say that the coils in these shapes can be applied to the present invention.

INDUSTRIAL APPLICABILITY

The position reading apparatus applying the present invention is useful in inputting position coordinates on a drawing or a specified item of a menu sheet put on a tablet to an external equipment such as a computer. Especially the present invention is suitable for improving a wireless position reading apparatus which does not require a body of the detecting device and a position pointer to be connected with a signal wire.

Further,the key board apparatus applying the present invention is usefull in transferring switch information to a host system such as a computer. Especially the present invention is suitable for transferring the switch information without contact of the host system and the key board apparatus.

We claim:

1. A position reading apparatus comprising: an amplifier;
a first coupling means connected to an output of the amplifier;
a second coupling means connected to an input of the amplifier;
a position detecting means connected to the input or the output of the amplifier; and
a position pointer having a resonant circuit; wherein, when the resonant circuit is electromagnetically coupled to both the first coupling means and the second coupling means, the resonant circuit, the amplifier, the first coupling means and the second coupling means form a positive feedback loop which generates an oscillation signal at a resonant frequency of the resonant circuit; and the position detecting means obtains position information representative of the position of the position pointer relative to the first and second coupling means from amplitude information taken from the oscillation signal.

2. The position reading apparatus according to claim 1, wherein the first coupling means comprises a first sense line group including a plurality of first sense lines which are parallel to one of an x and a y coordinate rectangular axis and which are also arranged at equivalent intervals, and a first scanning circuit which is a circuit for selecting each of the first sense lines sequentially and which is connected to the output of the amplifier; the second coupling means comprises a second sense line group including a plurality of second sense lines which are parallel to another of the x and the y coordinate rectangular axis and which are also arranged at equivalent intervals, and a second scanning circuit which is a circuit for selecting each of the second sense lines sequentially and which is connected to the input of the amplifier; and the position detecting means obtains the position information on the position pointer from the amplitude information taken from the oscillation signal generated by the positive feedback loop which is obtained by scanning the first and the second scanning circuit.

3. The position reading apparatus according to claim 1, further comprising:
a status setting means for changing the resonant frequency of the resonant circuit; and
a status detecting means for detecting a status set by the status setting means from frequency information on the oscillation signal.

4. The position reading apparatus according to claim 2, further comprising:
a status setting means for changing the resonant frequency of the resonant circuit; and
a status detecting means for detecting a status set by the status setting means from frequency information on the oscillation signal.

5. A position reading apparatus comprising:
a body of a detecting device having an amplifier,
a first sense line being in a shape of a loop and connected to an output of the amplifier, and a second sense line being in the shape of the loop and connected to an input of the amplifier; and
a position pointer having a resonant circuit; wherein the first and the second sense line are laid with a part of the loops overlapped so that electromagnetic coupling between the sense lines is canceled; when the resonant circuit approaches the first and the second sense line and is electromagnetically coupled to the sense lines, the amplifier, the first and the second sense line and the resonant circuit form a positive feedback loop and a frequency oscillator is formed, and the frequency oscillator generates an oscillating signal; the body of detecting device obtains position information on a position pointed by the position pointer from amplitude information on the oscillating signal.

6. The position reading apparatus according to claim 5, wherein the position pointer further comprises a status setting means for changing the resonant frequency of the resonant circuit; and the body of the detecting device further comprises a status detecting means for detecting a status set by the status setting means from frequency information on the oscillation signal.

7. The position reading apparatus according to claim 5, wherein the body of the detecting device further comprises a gain control means for controlling a gain of the amplifier, and obtains the position information on the position pointed by the position pointer from the amplitude information taken from the oscillating signal which is obtained from a control signal output by the gain control means or an input signal of the amplifier.

8. The position reading apparatus according to claim 6, wherein the body of the detecting device further comprises a gain control means for controlling a gain of the amplifier, and obtains the position information on the position pointed by the position pointer from the amplitude information taken from the oscillating signal which is obtained from a control signal output by the gain control means or an input signal of the amplifier.

9. A position reading apparatus comprising:
a body of a detecting device having an amplifier;
a first sense line being in a shape of a loop and connected to an output of the amplifier, and a second sense line being in the shape of a loop and connected to an input of the amplifier; and
a position pointer having a resonant circuit;
wherein the first and the second sense lines are laid with a part of the loops overlapped so that electromagnetic coupling between the sense lines is canceled; when the resonant circuit approaches the first and the second sense lines and is electromagnetically coupled to the sense lines, the amplifier, the first and the second sense line and the resonant circuit form a positive feedback loop which generates an oscillating signal; and the body of the detecting device obtains position information on a position pointed by the position pointer from amplitude information taken from the oscillating signal.

10. The position reading apparatus according to claim 9 wherein the position pointer further comprises a status setting means for changing the resonant frequency of the resonant circuit; and the body of the detecting device further comprises a status detecting means for detecting a status set by the status setting means from frequency information taken from the oscillating signal.

11. The position reading apparatus according to claim 9, wherein the body of the detecting device further comprises a gain control means for controlling a gain of the amplifier, and obtains the position information on the position pointed by the position pointer from the amplitude information taken from the oscillating signal which is obtained from a control signal output by the gain control means or an input signal of the amplifier.

12. The position reading apparatus according to claim 10, wherein the body of the detecting device further comprises a gain control means for controlling a gain of the amplifier, and obtains the position information on the position pointed by the position pointer from the amplitude information taken from the oscillating signal which is obtained from a control signal output by the gain control means or an input signal of the amplifier.

13. A position reading apparatus comprising:
a body of a detecting device including
an amplifier,
a sense line group composed of a plurality of sense lines which are in a shape of a loop and are laid along a position detecting direction, all of the two adjacent sense lines among the sense line group being laid with a part of the loops overlapped so that electromagnetic coupling between the two adjacent sense lines is canceled,
a first scanning circuit connected to the sense line group for selecting a sense line of the sense line group and coupling the selected sense line to an output of the amplifier,
a second scanning circuit connected to the sense line group for selecting a sense line of the sense line group and coupling the selected sense line to an input of the amplifier, and
a control circuit for selecting and controlling the sense line group sequentially so as to select all of the two adjacent sense lines from the sense line group by turns with the first and the second scanning circuit and to couple the selected two adjacent lines to the input and the output of the amplifier by turns; and
a position pointer including a resonant circuit; wherein when the resonant circuit approaches the two sense lines selected from the sense line group and is electromagnetically coupled to these sense lines, the amplifier, the two selected sense lines and the resonant circuit form a positive feedback loop which generates an oscillating signal; position information on a position pointed by the position pointer is obtained from amplitude information taken from the oscillating signal.

14. The position reading apparatus according to claim 13 wherein the position pointer further comprises a status setting means for changing the resonant frequency of the resonant circuit; and the body of the detecting device further comprises a status detecting means for detecting a status set by the status setting means from frequency information taken from the oscillating signal.

15. The position reading apparatus according to claim 13, wherein the body of the detecting device further comprises a gain control means for controlling a gain of the amplifier, and obtains the position information on the position pointed by the position pointer from the amplitude information taken from the oscillating signal which is obtained from a control signal output by the gain control means or an input signal of the amplifier.

16. The position reading apparatus according to claim 14, wherein the body of the detecting device further comprises a gain control means for controlling a gain of the amplifier, and obtains the position information on the position pointed by the position pointer from the amplitude information taken from the oscillating signal which is obtained from a control signal output by the gain control means or an input signal of the amplifier.

17. A key board apparatus having a plurality of switches and transferring predetermined data with the switch being pushed comprising:
a key board detecting device including an amplifier, a first coil coupled to an output of the amplifier, a second coil coupled to an input of the amplifier, and a frequency discriminating circuit; and
a key board having a parallel resonant circuit, including a plurality of series circuits each of which is composed of a respective switch and a capacitor connected in series, and a third coil; wherein by being electromagnetically coupled to both the first coil and the second coil, the parallel resonant circuit forms a positive feedback loop together with the amplifier, the first coil and the second coil, the positive feedback loop generating an oscillation signal, and the frequency discriminating circuit obtains switch information from frequency information taken from the oscillation signal generated by the positive feedback loop.

18. The key board apparatus according to claim 17, wherein the key board detecting device further comprises a gain control means for controlling a gain of the amplifier, and the gain control means gives a control signal to the amplifier so that an amplitude of the oscillation signal at the output of the amplifier is constant.

19. The position reading apparatus according to claim 3, wherein the status setting means has a plurality of switches so that at least three resonant frequencies can be established.

20. The position reading apparatus according to claim 4, wherein the status setting means has a plurality of switches so that at least three resonant frequencies can be established.

21. The position reading apparatus according to claim 6, wherein the status setting means has a plurality of switches so that at least three resonant frequencies can be established.

22. The position reading apparatus according to claim 8, wherein the status setting means has a plurality of switches so that at least three resonant frequencies can be established.

23. The position reading apparatus according to claim 10, wherein the status setting means has a plurality of switches so that at least three resonant frequencies can be established.

24. The position reading apparatus according to claim 12, wherein the status setting means has a plurality of switches so that at least three resonant frequencies can be established.

25. The position reading apparatus according to claim 16, wherein the status setting means has a plurality of switches so that at least three resonant frequencies can be established.

26. The position reading apparatus according to claim 16, wherein the status setting means has a plurality of switches so that at least three resonant frequencies can be established.

27. The position reading apparatus according to claim 3, further comprising a plurality of the position pointers, each of said plurality of position pointers having a status setting means for changing the resonant frequency of the resonant circuit, and wherein the resonant frequency of each resonant circuit is different from the resonant frequency of every other resonant circuit.

28. The position reading apparatus according to claim 4, further comprising a plurality of the position pointers, each of said plurality of position pointers having a status setting means for changing the resonant frequency of the resonant circuit, and wherein the resonant frequency of each resonant circuit is different from the resonant frequency of every other resonant circuit.

29. The position reading apparatus according to claim 6, further comprising a plurality of the position pointers and wherein the resonant frequency of each resonant circuit, which is determined by the status setting means of each of the position pointers, is different from the resonant frequency of every other resonant circuit.

30. The position reading apparatus according to claim 8, further comprising a plurality of the position pointers and wherein the resonant frequency of each resonant circuit, which is determined by the status setting means of each of the position pointers, is different from the resonant frequency of every other resonant circuit.

31. The position reading apparatus according to claim 10, further comprising a plurality of the position pointers and wherein the resonant frequency of each resonant circuit, which is determined by the status setting means of each of the position pointers, is different from the resonant frequency of every other resonant circuit.

32. The position reading apparatus according to claim 12, further comprising a plurality of the position pointers and wherein the resonant frequency of each resonant circuit, which is determined by the status setting means of each of the position pointers, is different from the resonant frequency of every other resonant circuit.

33. The position reading apparatus according to claim 14, further comprising a plurality of the position pointers and wherein the resonant frequency of each resonant circuit, which is determined by the status setting means of each of the position pointers, is different from the resonant frequency of every other resonant circuit.

34. The position reading apparatus according to claim 16, further comprising a plurality of the position pointers and wherein the resonant frequency of each resonant circuit, which is determined by the status setting means of each of the position pointers, is different from the resonant frequency of every other resonant circuit.

35. A position reading apparatus comprising:

an amplifier having a controllable gain, a signal input, a signal output and a gain control input;

a first coupling means connected to the signal output of the amplifier;

a second coupling means connected to the signal input of the amplifier;

a gain control means for controlling the gain of the amplifier, said gain control means having an input connected to the signal output of the amplifier and an output connected to the gain control input of the amplifier;

a position detecting means connected to the signal input of the amplifier or the output of the gain control means; and a position pointer having a resonant circuit;

wherein, when the resonant circuit is electromagnetically coupled to both the first coupling means and the second coupling means, the resonant circuit, the amplifier, the first coupling means and the second coupling means form a positive feedback loop which generates an oscillation signal at a resonant frequency of the resonant circuit; and the position detecting means obtains position information representative of the position of the position pointer relative to the first and second coupling means from amplitude information taken from the oscillation signal.

* * * * *